United States Patent
Cunningham et al.

(10) Patent No.: US 12,189,783 B2
(45) Date of Patent: Jan. 7, 2025

(54) SECURITY ANALYTICS SYSTEM FOR PERFORMING A RISK ANALYSIS OPERATION TAKING INTO ACCOUNT SOCIAL BEHAVIOR PEER GROUPING

(71) Applicant: Forcepoint LLC, Austin, TX (US)

(72) Inventors: Margaret Cunningham, Austin, TX (US); Peter Lochlan Stewart, Rowlett, TX (US)

(73) Assignee: Forcepoint Federal Holdings LLC, Austin, TX (US)

( * ) Notice: Subject to any disclaimer, the term of this patent is extended or adjusted under 35 U.S.C. 154(b) by 249 days.

(21) Appl. No.: 17/991,022

(22) Filed: Nov. 21, 2022

(65) Prior Publication Data
US 2023/0214497 A1    Jul. 6, 2023

Related U.S. Application Data

(60) Provisional application No. 63/294,991, filed on Dec. 30, 2021.

(51) Int. Cl.
  *G06F 21/57* (2013.01)
  *G06F 21/55* (2013.01)

(52) U.S. Cl.
  CPC ...... *G06F 21/577* (2013.01); *G06F 2221/034* (2013.01)

(58) Field of Classification Search
  CPC . G06F 21/577; G06F 2221/034; G06F 21/552
  See application file for complete search history.

(56) References Cited

U.S. PATENT DOCUMENTS

| | | | |
|---|---|---|---|
| 10,084,809 B1* | 9/2018 | Rambo | G06F 16/24578 |
| 2009/0292743 A1* | 11/2009 | Bigus | G06F 21/316 |
| 2012/0047575 A1* | 2/2012 | Baikalov | G06F 21/604 726/21 |
| 2013/0097660 A1* | 4/2013 | Das | H04L 63/205 726/1 |
| 2013/0097701 A1* | 4/2013 | Moyle | H04L 63/1416 726/22 |
| 2013/0097709 A1* | 4/2013 | Basavapatna | H04L 63/1441 726/25 |
| 2015/0205954 A1* | 7/2015 | Jou | G06F 21/316 726/22 |
| 2017/0118236 A1* | 4/2017 | Devi Reddy | H04L 63/1425 |
| 2017/0286671 A1* | 10/2017 | Chari | G06F 21/552 |
| 2018/0191763 A1* | 7/2018 | Hillard | H04L 63/1416 |
| 2018/0336353 A1* | 11/2018 | Manadhata | G06F 16/3334 |
| 2019/0124117 A1* | 4/2019 | Swafford | H04L 63/1408 |
| 2019/0364055 A1* | 11/2019 | Ford | H04L 63/1408 |
| 2020/0177614 A1* | 6/2020 | Burns | H04L 63/20 |
| 2020/0334498 A1* | 10/2020 | Pan | G06F 17/15 |
| 2020/0382534 A1* | 12/2020 | Simanovsky | G06F 21/552 |
| 2021/0037027 A1* | 2/2021 | Brown | H04L 63/1416 |

\* cited by examiner

*Primary Examiner* — Darren B Schwartz
(74) *Attorney, Agent, or Firm* — Terrile, Cannatti & Chambers, LLP; Stephen A. Terrile

(57) ABSTRACT

A system, method, and computer-readable medium are disclosed for performing entity interaction risk analysis operation. The entity interaction risk analysis operation includes: monitoring an entity, the monitoring observing an electronically-observable data source; identifying an interaction between the entity and another entity based upon the monitoring; analyzing the interaction between the entity and the another entity; and, performing a security operation in response to the analyzing the interaction.

20 Claims, 23 Drawing Sheets

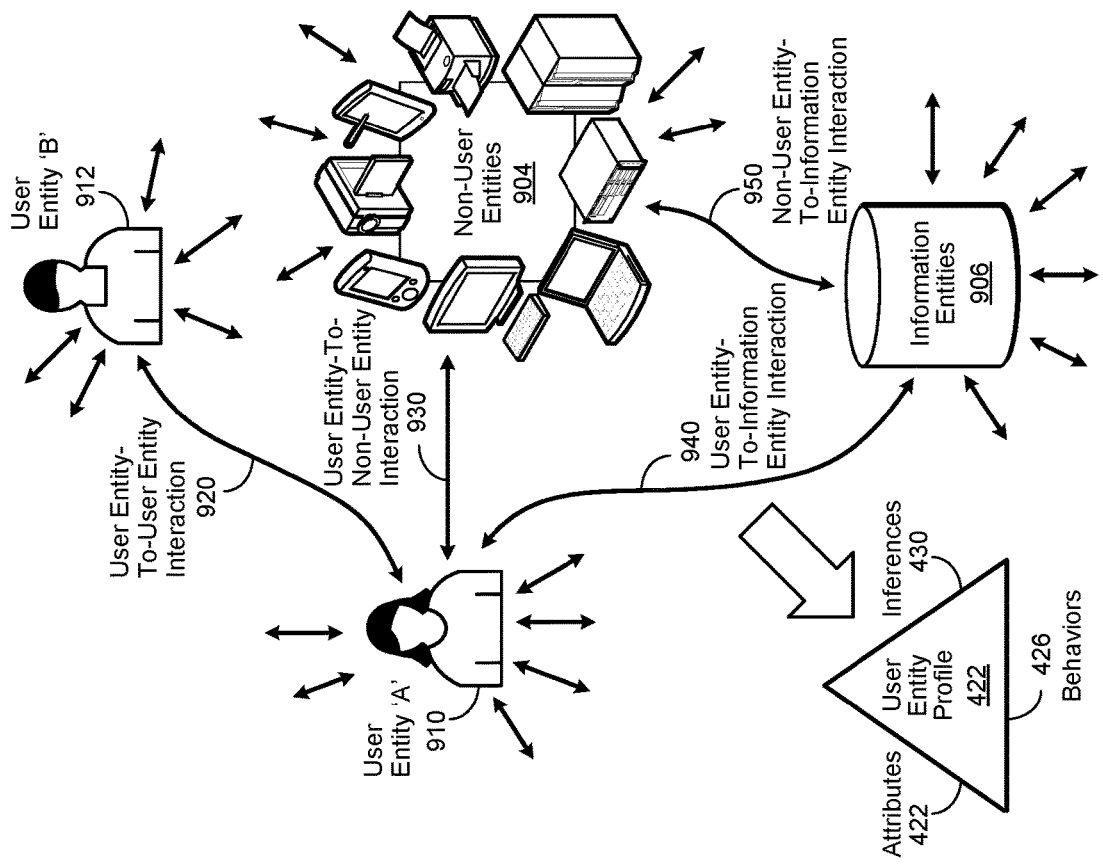
*FIGURE 9*
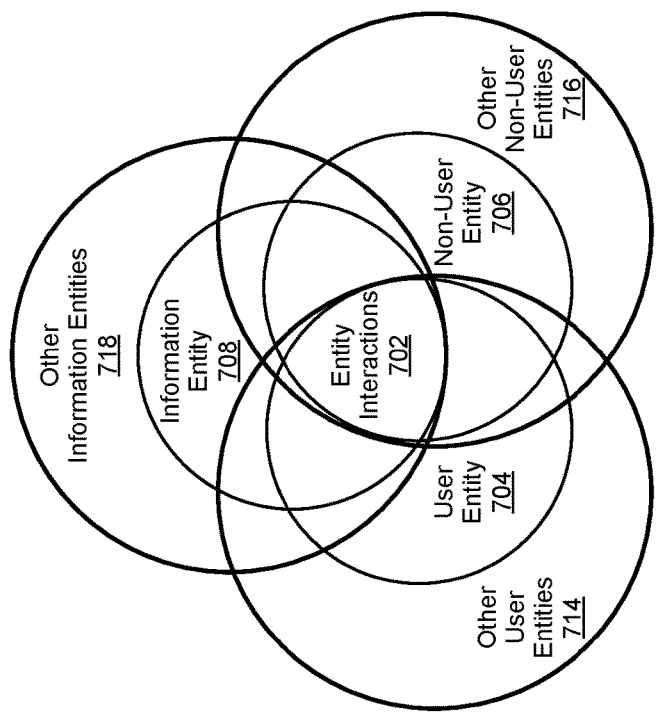
*FIGURE 7*
| Classification 808 | Enactment 802 | |
|---|---|---|
| | Non-Sanctioned 804 | Sanctioned 806 |
| Organizational 810 | Non-Sanctioned, Organizational 814 | Sanctioned, Organizational 816 |
| Personal 812 | Non-Sanctioned, Personal 818 | Sanctioned, Personal 820 |
*FIGURE 8*

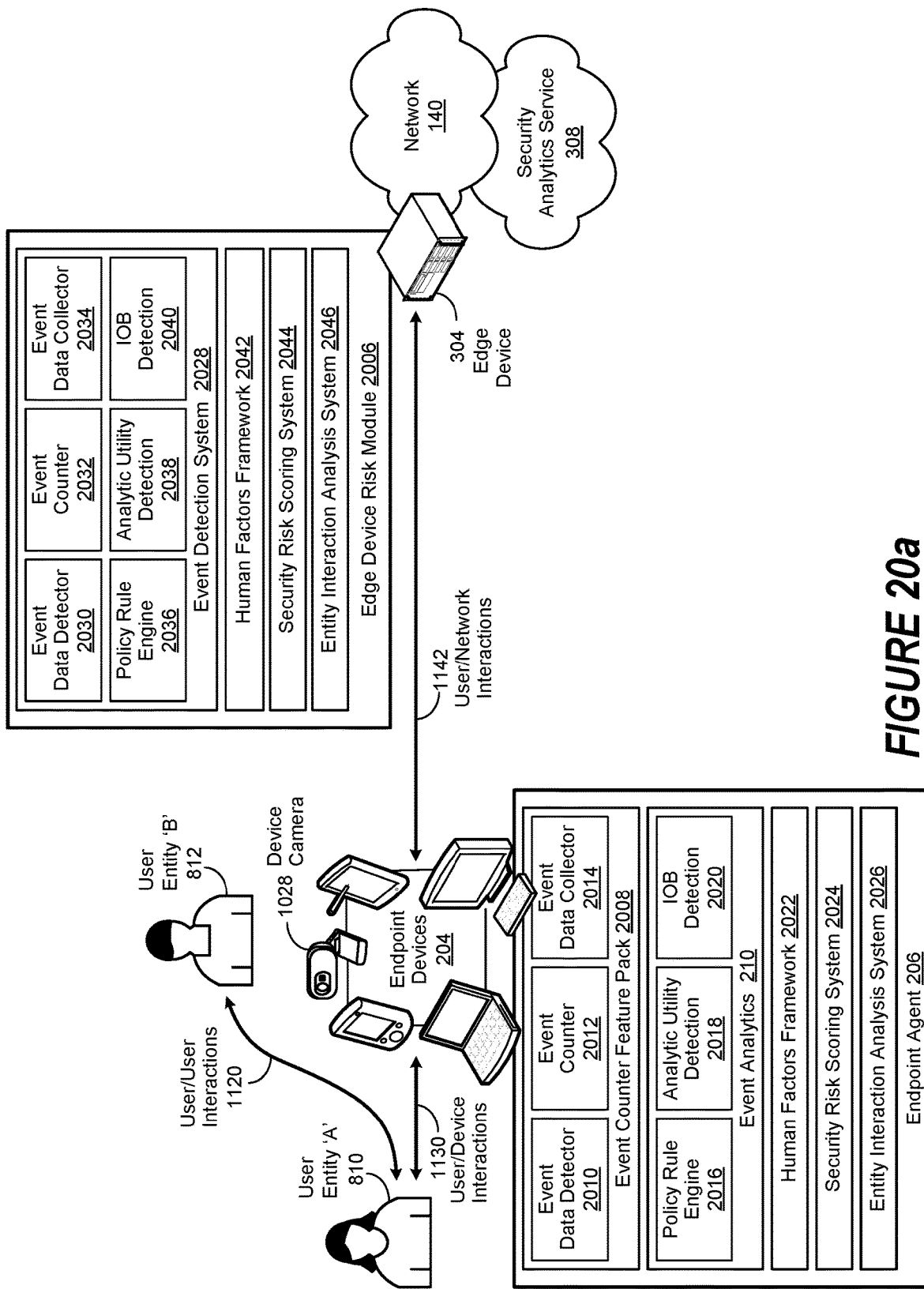

SECURITY ANALYTICS SYSTEM FOR PERFORMING A RISK ANALYSIS OPERATION TAKING INTO ACCOUNT SOCIAL BEHAVIOR PEER GROUPING

BACKGROUND OF THE INVENTION

Field of the Invention

The present invention relates in general to the field of computers and similar technologies, and in particular to software utilized in this field. Still more particularly, it relates to a method, system and computer-usable medium for performing an entity interaction risk analysis operation.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events can be difficult. In particular, ensuring that an entity is who they claim to be can be challenging.

As an example, a first user may attempt to pose as a second user to gain access to certain confidential information. In this example, the first user may be prevented from accessing the confidential information if it can be determined that they are illegitimately posing as the second user. More particularly, access to the confidential information may be prevented if the identity of the first user is resolved prior to the confidential information actually being accessed. Likewise, the first user's access to the confidential information may be prevented if their identity cannot be resolved to the identity of the second user.

SUMMARY OF THE INVENTION

In one embodiment the invention relates to a method for performing an entity interaction risk analysis operation, comprising: monitoring an entity, the monitoring observing an electronically-observable data source; identifying an interaction between the entity and another entity based upon the monitoring; analyzing the interaction between the entity and the another entity; and, performing a security operation in response to the analyzing the interaction.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring an entity, the monitoring observing an electronically-observable data source; identifying an interaction between the entity and another entity based upon the monitoring; analyzing the interaction between the entity and the another entity; and, performing a security operation in response to the analyzing the interaction.

In another embodiment the invention relates to a computer-readable storage medium embodying computer program code, the computer program code comprising computer executable instructions configured for: monitoring an entity, the monitoring observing an electronically-observable data source; identifying an interaction between the entity and another entity based upon the monitoring; analyzing the interaction between the entity and the another entity; and, performing a security operation in response to the analyzing the interaction.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 7 is a simplified Venn diagram showing entity interactions between a user entity, a non-user entity, and an information entity;

FIG. 8 is a table showing certain entity interaction classifications;

FIG. 9 shows the enactment of entity interactions between user entities, non-user entities, and information entities;

FIGS. 20a and 20b show a simplified block diagram of a distributed security analytics system environment.

DETAILED DESCRIPTION

A method, system and computer-usable medium are disclosed for performing an entity interaction risk analysis operation. Certain aspects of the invention reflect an appreciation that the existence of any entity, whether it is an individual user, a group of users, an organization, a device, a system, a network, an account, a domain, an operation, a process, a software application, a service, or a collection of information, represents some degree of security risk. Various aspects of the invention likewise reflect an appreciation that observation of certain entity interactions can often provide an indication of possible anomalous, abnormal, unexpected, or suspicious behavior, any or all of which may represent a security risk.

Likewise, various aspects of the invention reflect an appreciation that certain entity interactions can be characterized as concerning, and as such, their occurrence may likewise provide an indication of potential security risk. Accordingly, certain aspects of the invention reflect an appreciation that a particular entity can be assigned a measure of risk according to its respective interactions with various entities, whether they are a user entity, a non-user entity, or an information entity. Furthermore, certain aspects of the invention an appreciation that such interactions may be assigned an additional measure of risk if they are not sanctioned by an organization with which the entity is associated.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
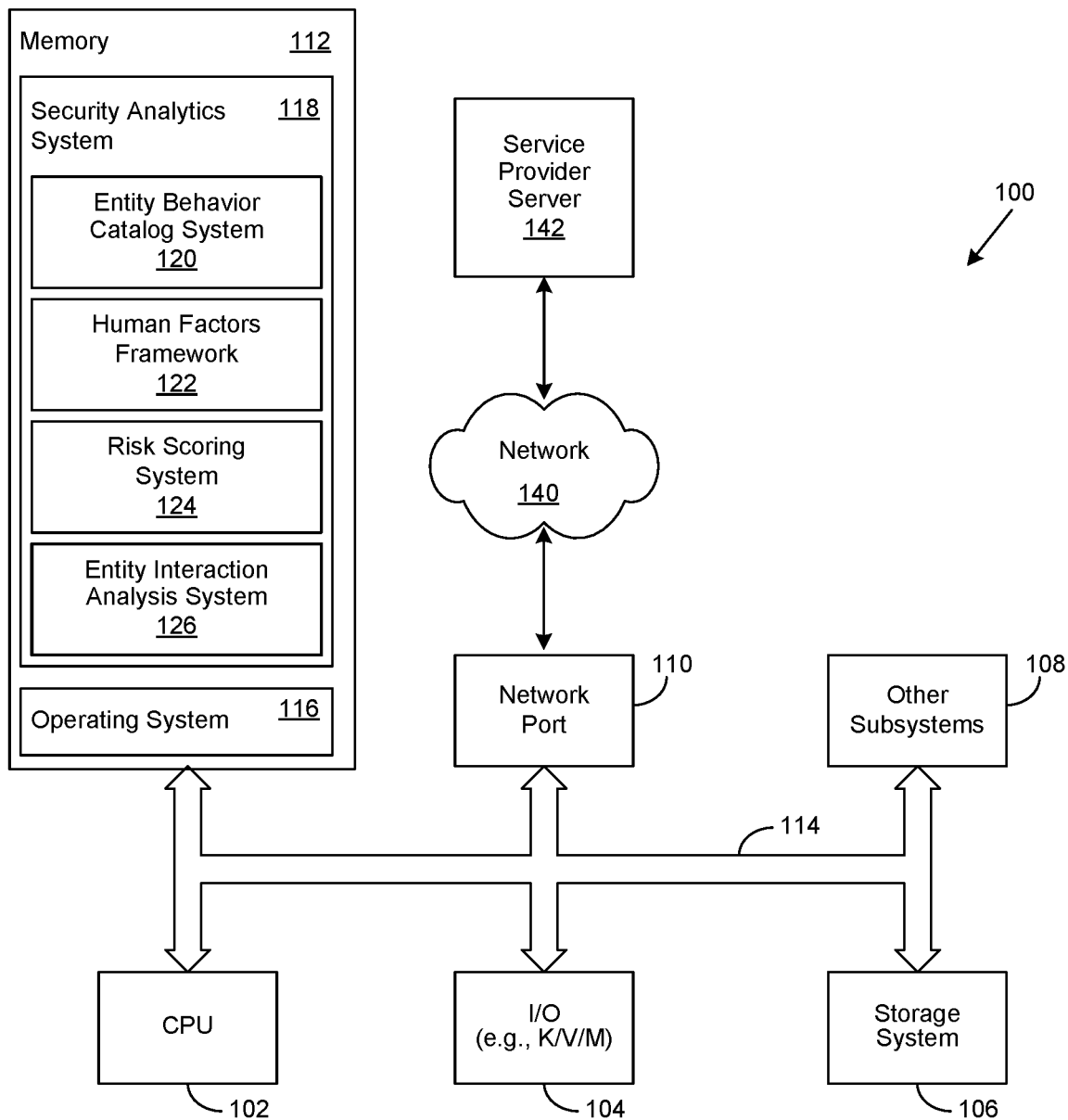
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 may be implemented to perform a security analytics operation, described in greater detail herein. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk.

In certain embodiments, the security analytics system 118 may be implemented to include an entity behavior catalog (EBC) system 120, a human factors framework 122, a risk scoring system 124, and an entity interaction analysis system 126, or a combination thereof. In certain embodiments, the EBC system 120 may be implemented to catalog entity behavior, as described in greater detail herein. In certain embodiments, the human factors framework 122 may be implemented to perform a human factors risk operation, as likewise described in greater detail herein. Likewise, as described in greater detail herein, the security risk scoring system 124 may be implemented in various embodiments to perform certain security risk scoring operations. In certain embodiments, as likewise described in greater detail herein, the entity interaction analysis system 126 may be implemented to perform an entity interaction risk analysis operation.

Figure 2:
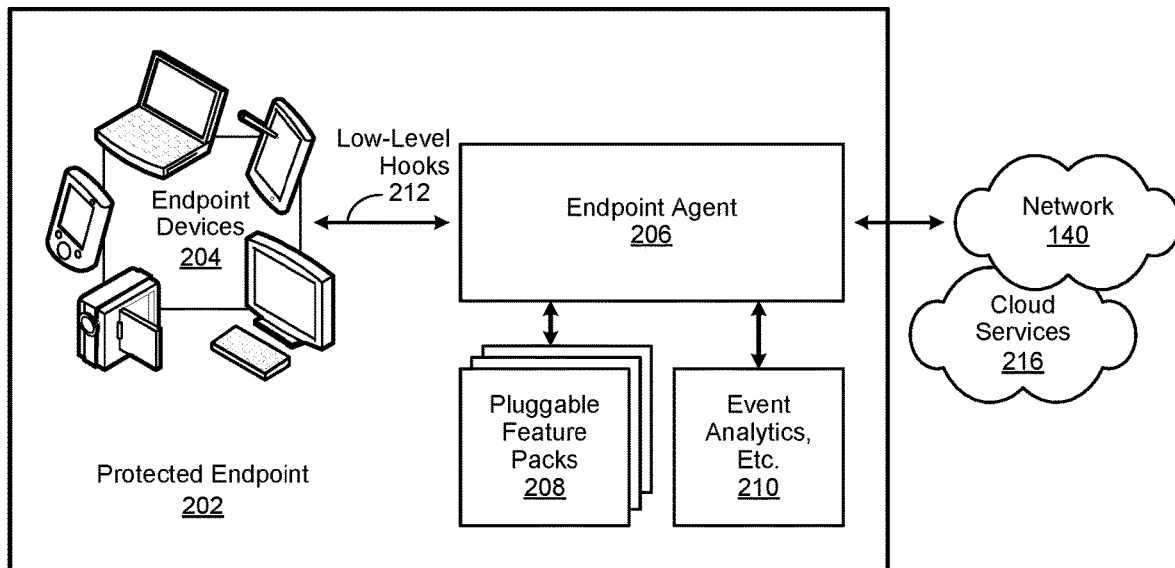
FIG. 2 is a simplified block diagram of an endpoint agent.

FIG. 2 is a simplified block diagram of an endpoint agent implemented in accordance with an embodiment of the invention. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of an entity. As likewise used herein, an entity broadly refers to something that exists as itself, whether physically or abstractly.

In certain embodiments, an entity may be a user entity, a non-user entity, an information entity, or a combination thereof. As used herein, a user entity broadly refers to an animate entity whose identity can be described by certain attributes and is capable of exhibiting or enacting certain user entity behaviors, as described in greater detail herein, but is incapable of exhibiting or enacting a non-user entity or information entity behavior. Examples of a user entity include an individual person, a group of people, an organization, or a government.

In various embodiments, a particular user entity may be associated with a corresponding class of user entities. In certain of these embodiments, a particular class of user entities may be segmented into two or more sub-classes of user entities. In certain embodiments, a sub-class of user entities may be further segmented into yet other sub-classes of user entities. As an example, a corporation may have an organization hierarchy. In this example, the corporation may be designated as a class of user entities, with the class being defined as user entities associated with the corporation. To continue the example, the class of user entities associated with the corporation may be segmented into subclasses of user entities corresponding to their respective departments, roles, titles, locations, and so forth.

As likewise used herein, a non-user entity broadly refers to an inanimate entity whose identity can be described by certain attributes and is capable of exhibiting or enacting certain non-user entity behaviors, as described in greater detail herein, but is incapable of exhibiting or enacting a user entity or information entity behavior. In certain embodiments, a non-user entity may embody a physical form. Examples of a non-user entity include an item, a device, such as endpoint 204 and edge devices, a network, a system, an operation, and a process. Other examples of a non-user entity include a resource, such as a geographical location or formation, a physical facility, a venue, a software application, and a service, such as a service operating in a cloud environment.

In various embodiments, a particular non-user entity may be associated with a corresponding class of non-user entities. In certain of these embodiments, a particular class of non-user entities may be segmented into two or more sub-classes of user entities. In certain embodiments, a sub-class of non-user entities may be further segmented into yet other sub-classes of non-user entities. As an example, an organization may have an extensive information technology (IT) infrastructure. In this example, the IT infrastructure may be segmented into classes of non-user entities, such as computers, networks, mobile devices, and so forth. To continue the example, the class of non-user entities that are computers may in turn be segmented into subclasses of non-user entities corresponding to servers, desktop computers, laptops, and so forth.

An information entity, as used herein, broadly refers to an inanimate entity that is a collection of data that can be described by certain attributes and is capable of exhibiting or enacting certain information entity behaviors, as described in greater detail herein, but is incapable of enacting a user entity or non-user entity behavior. In certain embodiments, an information entity may include some form of a digital instantiation of information. Examples of an information entity include an account, a user identifier (ID), a cryptographic key, a computer file, a text or email message, a web page or web page element, a social media post, an audio or video recording, a network address, and a domain. In certain embodiments, the identity of a particular entity may be known or unknown. An entity behavior, as likewise used herein, broadly refers to any behavior exhibited or enacted by an entity that can be electronically observed during the occurrence of an entity interaction. As used herein, an entity interaction broadly refers to the occurrence of an action associated with a first entity being influenced by another action associated with a second entity.

In various embodiments, an information entity may be associated with a corresponding class of information entities. In certain of these embodiments, a particular class of information entities may be segmented into two or more sub-classes of information entities. In certain embodiments, a sub-class of information entities may be further segmented into yet other sub-classes of information entities. As an example, a user entity associated with a corporation may have access to a variety of information entities. In this example, the class of information entities may be segmented into classes of information entities, such as corporate databases, email systems, external websites, social media platforms, and so forth. To continue the example, the class of information entities that are websites may in turn be segmented into subclasses of information entities corresponding to internal websites, competitor websites, news websites, search engines, and so forth.

In various embodiments, a particular entity interaction may have certain associated attributes, such as cadence, frequency, group characteristics, participants, duration, participation, access, sharing, attachments, content, and so forth. In certain of these embodiments, the values used to describe the cadence attribute of an entity interaction may include "impromptu," and "planned." In certain embodiments, the values used to describe the frequency attribute of an entity interaction may include "first occurrence," "occasional," "daily," "weekly," "monthly," and so on. Likewise, in certain embodiments, the values used to describe the group characteristics attribute of an entity interaction may include "one-on-one," "small," "large," "carbon copy," "blind copy," and so on.

In certain embodiments, the values used to describe the participants attribute of an entity interaction may include "internal-only," "external only," "mixed," "collaborative," "first," "last," and so on. In certain embodiments, the values used to describe the duration attribute of an entity interaction may include "short," "medium," and "long," and so on, while the values used to describe the participation attribute of an entity interaction may include "passive" and "active." Likewise, in certain embodiments, the values used to describe the access attribute of an entity interaction may include "private" (e.g., "invite-only," "locked," etc.).

In certain embodiments, the values used to describe the sharing or attachments attributes of an entity interaction may include "number," "size," "classification," "type," and so on. In various embodiments, the values used to describe the content attribute of an entity interaction may likewise include "personal," "professional," or by certain keywords, or a combination thereof. Those of skill in the art will recognize that many such entity interaction attributes are possible. Accordingly, the foregoing is not intended to limit the spirit, scope or intent of the invention.

In certain embodiments, an entity interaction may include the occurrence of at least one event enacted by one entity when interacting with another. In certain embodiments, an event associated with an entity interaction may include at least one entity attribute, described in greater detail herein, and at least one entity behavior, likewise described in greater detail herein. As an example, a user entity may perform an action, such as sending a text message to some other user entity who in turn replies with a response. In this example, the other user entity's action of responding is influenced by the user entity's action of sending the text message.

As another example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable.

In various approaches, a software agent may be autonomous or work in concert with another agent, or an entity, or a combination of the two, as described in greater detail herein. In certain of these approaches, the software agent may be implemented to autonomously decide if a particular action is appropriate for a particular event, or an observed entity behavior, or a combination of the two, as likewise described in greater detail herein. As used herein, an event broadly refers to the occurrence of at least one action performed by an entity. In certain embodiments, the action may be directly, or indirectly, associated with an entity behavior, described in greater detail herein. In certain embodiments, the entity behavior may include an entity's physical behavior, cyber behavior, or a combination thereof, as likewise described in greater detail herein.

As an example, a first user may attach a binary file infected with a virus to an email that is subsequently sent to a second user. In this example, the act of attaching the binary file to the email is directly associated with an entity behavior enacted by the first user. In certain embodiments, the action may be indirectly associated with an entity behavior. To continue the example, the recipient of the email may open the infected binary file, and as a result, infect their computer with malware. To further continue the example, the act of opening the infected binary file is directly associated with an entity behavior enacted by the second user. However, the infection of the email recipient's computer by the infected binary file is indirectly associated with the described entity behavior enacted by the second user.

An endpoint device 204, as likewise used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, such an endpoint device 204 may be implemented as a non-user entity. In certain embodiments, the communication of the data may take place in real-time or near-real-time. As used herein, real-time broadly refers to processing and providing information within a time interval brief enough to not be discernable by a user entity, described in greater detail herein. As an example, a cellular phone conversation may be used to communicate information in real-time, while an instant message (IM) exchange may be used to communicate information in near real-time.

In certain embodiments, the communication of the information may take place asynchronously. For example, an email message may be stored on an endpoint device 204 when it is offline. In this example, the information may be communicated to its intended recipient once the endpoint device 204 gains access to a network 140. In certain embodiments, the network 140 may be a private network (e.g., an enterprise network), a semi-public network (e.g., a service provider core network), or a public network (e.g., the Internet).

A protected endpoint 202, as likewise used herein, broadly refers to a policy-based approach to network security that typically requires an endpoint device 204 to comply with particular criteria before it is granted access to network resources. As an example, an endpoint device 204 may be required to have a particular operating system (OS), or version thereof, a Virtual Private Network (VPN) client, anti-virus software with current updates, and so forth. In certain embodiments, the protected endpoint 202 may be implemented to perform operations associated with providing real-time resolution of the identity of an entity at a particular point in time, as described in greater detail herein. In certain embodiments, the protected endpoint 202 may be implemented to provide temporal information associated with such operations.

As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence of an action enacted by, or associated with, an entity at a particular point in time.

Examples of such temporal events include making a phone call, sending a text or an email, using a device, such as an endpoint device 204, accessing a system, and entering a physical facility. Other examples of temporal events include uploading, transferring, downloading, modifying, or deleting data, such as data stored in a datastore, or accessing a service. Yet other examples of temporal events include entity interactions between two or more users, entity interactions between a user and a device, entity interactions between a user and a network, and entity interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the temporal event information may include metadata. In various embodiments, the metadata may include temporal event attributes, which in turn may include certain entity identifier types or classifications, described in greater detail herein.

In certain embodiments, the real-time resolution of the identity of an entity at a particular point in time may be based upon contextual information associated with a particular entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

Cyber behavior, as used herein, broadly refers to any behavior occurring in cyberspace, whether enacted by an individual entity, a group of entities, or a system acting at the behest of an individual entity, or a group of entities, as described in greater detail herein. More particularly, cyber behavior may include physical, social, or mental actions enacted by a user entity that can be objectively observed, or indirectly inferred, within cyberspace. As an example, a user may use an endpoint device 204 to access and browse a particular website on the Internet. In this example, the individual actions performed by the user to access and browse the website constitute a cyber behavior.

As another example, a user may use an endpoint device 204 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, makes them electronically-observable.

As likewise used herein, cyberspace broadly refers to a network 140 environment capable of supporting communication between two or more entities. In certain embodiments, the entity may be a user, an endpoint device 204, or various resources, described in greater detail herein. In certain embodiments, the entities may include various endpoint devices 204 or resources operating at the behest of an entity, such as a user. In certain embodiments, the communication between the entities may include audio, image, video, text, or binary data.

As described in greater detail herein, the contextual information may include an entity's authentication factors.

Contextual information may likewise include various temporal identity resolution factors, such as identification factors associated with the entity, the date/time/frequency of various entity behaviors, the entity's location, a user entity's role or position in an organization, their associated access rights, and certain user gestures employed by a user in the enactment of a user entity behavior. Other contextual information may likewise include various user entity interactions, whether the interactions are with a non-user entity, an information entity, or another user entity. In certain embodiments, user entity behaviors, and their related contextual information, may be collected at particular points of observation, and at particular points in time, described in greater detail herein. In certain embodiments, a protected endpoint 202 may be implemented as a point of observation for the collection of entity behavior and contextual information.

In certain embodiments, the endpoint agent 206 may be implemented to universally support a variety of operating systems, such as Apple Macintosh®, Microsoft Windows®, Linux®, Android® and so forth. In certain embodiments, the endpoint agent 206 may be implemented to interact with the endpoint device 204 through the use of low-level hooks 212 at the operating system level. It will be appreciated that the use of low-level hooks 212 allows the endpoint agent 206 to subscribe to multiple events through a single hook. Consequently, multiple functionalities provided by the endpoint agent 206 can share a single data stream, using only those portions of the data stream they may individually need. Accordingly, system efficiency can be improved and operational overhead reduced.

In certain embodiments, the endpoint agent 206 may be implemented to provide a common infrastructure for pluggable feature packs 208. In various embodiments, the pluggable feature packs 208 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 208 may be invoked as needed by the endpoint agent 206 to provide a given functionality. In certain embodiments, individual features of a particular pluggable feature pack 208 are invoked as needed. In certain embodiments, the individual features of a pluggable feature pack 208 may be invoked by the endpoint agent 206 according to the occurrence of a particular entity behavior. In certain embodiments, the individual features of a pluggable feature pack 208 may be invoked by the endpoint agent 206 according to the occurrence of a particular temporal event, described in greater detail herein. In certain embodiments, the individual features of a pluggable feature pack 208 may be invoked by the endpoint agent 206 at a particular point in time. In these embodiments, the method by which a particular entity behavior, temporal event, or point in time is selected is a matter of design choice.

In certain embodiments, the individual features of a pluggable feature pack 208 may be invoked by the endpoint agent 206 according to the context of a particular entity behavior. As an example, the context may be a user enacting a particular user entity behavior, their associated risk classification, which resource they may be requesting, the point in time the user entity behavior is enacted, and so forth. In certain embodiments, the pluggable feature packs 208 may be sourced from various cloud services 216. In certain embodiments, the pluggable feature packs 208 may be dynamically sourced from various cloud services 216 by the endpoint agent 206 on an as-needed basis.

In certain embodiments, the endpoint agent 206 may be implemented with additional functionalities, such as event analytics 210. In various embodiments, the event analytics 210 functionality may include analysis of certain entity behaviors, described in greater detail herein. Those of skill in the art will recognize that many such embodiments and examples are possible. Accordingly, the foregoing is not intended to limit the spirit, scope or intent of the invention.

Figure 3:
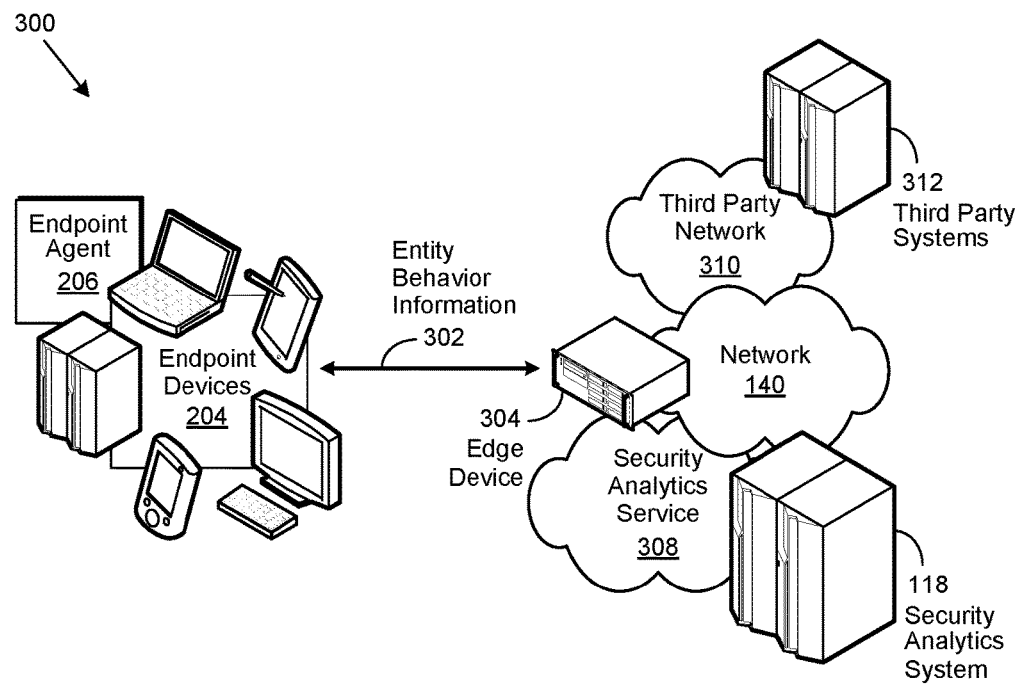
FIG. 3 is a simplified block diagram showing reference architecture components of a security analytics environment.

FIG. 3 is a simplified block diagram showing reference architecture components of a security analytics environment. In certain embodiments, the security analytics environment 300 may be implemented to include a security analytics system 118, an internal 306 network, one or more endpoint devices 204, and one or more edge devices 304. In various embodiments, the security analytics system 118 may be implemented to perform certain security analytics operations. As used herein, a security analytics operation broadly refers to any operation performed to determine a security risk corresponding to a particular event, or an entity behavior enacted by an associated entity, or a combination thereof.

In certain embodiments, the security analytics system 118 may be implemented as both a source and a sink of entity behavior information 302. As used herein, entity behavior information 302 broadly refers to any information related to the enactment of a behavior by an associated entity. In various embodiments, the security analytics system 118 may be implemented to serve requests for certain entity behavior information 302. In certain embodiments, the edge device 304 and the endpoint agent 206, individually or in combination, may provide certain entity behavior information 302 to the security analytics system 118, respectively using push or pull approaches familiar to skilled practitioners of the art.

As used herein, an edge device 304 broadly refers to a device providing an entry point into a network 140. Examples of such edge devices 304 include routers, routing switches, integrated access devices (IADs), multiplexers, wide-area network (WAN) access devices, network security appliances, and so forth. In certain embodiments, the edge device 304 may be implemented in a bridge, a firewall, or a passive monitoring configuration. In certain embodiments, the edge device 304 may be implemented as software running on an information processing system.

In certain embodiments, the edge device 304 may be implemented to provide access to the security analytics system 118 via a network 140. In certain embodiments, the edge device 304 may be implemented to provide access to and from the network 140, a third party 310 network, and a security analytics service 308, or a combination thereof. In certain embodiments, the network 140 and third party 310 networks may respectively be a private network (e.g., an enterprise network), a semi-public network (e.g., a service provider core network), or a public network (e.g., the Internet). In certain embodiments, the edge device 304 may be implemented to provide access to a third party system 312 via the third party network 310.

In certain embodiments, the edge device 304 may be implemented to provide support for a variety of generic services, such as directory integration, logging interfaces, update services, and bidirectional risk/context flows associated with various security analytics operations, described in greater detail herein. In certain embodiments, the edge device 304 may be implemented to provide temporal information, likewise described in greater detail herein, associated with the provision of such services. In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the edge device 304 may be implemented to receive network requests and context-sensitive entity behavior information 302, described in greater detail herein, from an endpoint agent 206. The edge device 304 may be implemented in certain embodiments to receive enriched entity behavior information 302 from the endpoint agent 206. In various embodiments, certain entity behavior information 302 may be enriched by an associated endpoint agent 206 attaching contextual information to a request.

In various embodiments, the contextual information may be embedded within a network request, which is then provided as enriched entity behavior information 302. In various embodiments, the contextual information may be concatenated, or appended, to a request, which in turn is provided as enriched entity behavior information 302. In certain of these embodiments, the enriched entity behavior information 302 may be unpacked upon receipt by the edge device 304 and parsed to separate the request and its associated contextual information. Those of skill in the art will recognize that one possible disadvantage of such an approach is that it may perturb certain Intrusion Detection System and/or Intrusion Detection Prevention (IDS/IDP) systems implemented on the network 140 or third party 310 network.

In various embodiments, new flow requests may be accompanied by a contextual information packet sent to the edge device 304. In certain of these embodiments, the new flow requests may be provided as enriched entity behavior information 302. In certain embodiments, the endpoint agent 206 may also send updated contextual information to the edge device 304 once it becomes available. As an example, an endpoint agent 206 may share a list of files that have been read by a current process at any point in time once the information has been collected. To continue the example, such a list of files may be used to determine which data the endpoint agent 206 may be attempting to exfiltrate.

In certain embodiments, such service requests may be associated with temporal event information, described in greater detail herein. Consequently, such requests can be enriched by the addition of contextual entity information (e.g., UserAccount, interactive/automated, data-touched, etc.). Accordingly, the edge device 304 can then use this information to manage the appropriate response to submitted requests. In certain embodiments, such requests may be associated with providing real-time resolution of the identity of an entity at a particular point in time.

In certain embodiments, point analytics processes executing on the edge device 304 may request a particular service. As an example, risk scores on a per-entity basis may be requested. In certain embodiments, the service may be requested from the security analytics system 118. In certain embodiments, the service may be requested from a security analytics service 308. In certain embodiments, the security analytics system 118 may be implemented to provide the security analytics service 308. In certain embodiments, hosting of the security analytics service 308 may be provided by a cloud infrastructure familiar to those of skill in the art.

In certain embodiments, the endpoint agent 206 may be implemented to update the security analytics system 118 with entity behavior information 302 and associated contextual information, thereby allowing an offload of certain analytics processing overhead. In various embodiments, this approach may be implemented to provide longitudinal risk scoring, which assesses security risk associated with certain entity behavior during a particular interval of time. In certain embodiments, the security analytics system 118 may be implemented to perform risk-adaptive operations to access risk scores associated with the same user entity, but accrued on different endpoint devices 204. Certain embodiments of the invention reflect an appreciation that such an approach may prove advantageous when an adversary is "moving sideways" through a network environment, using different endpoint devices 204 to collect information.

Certain embodiments of the invention reflect an appreciation that enriched entity behavior information 302 will likely not be available for provision to the edge device 304 if an endpoint agent 206 is not implemented for a corresponding endpoint device 204. However, the lack of such enriched entity behavior information 302 may be accommodated in various embodiments, albeit with reduced functionality associated with certain security analytics operations.

In certain embodiments, the edge device 304 may be implemented as a generic device configured to host various network communications, data processing, and security management capabilities. In certain embodiments, such capabilities may include the performance of operations associated with providing real-time resolution of the identity of an entity at a particular point in time. In certain embodiments, such operations may likewise include the provision of associated temporal information (e.g., time stamps).

In certain embodiments, the security analytics system 118 may be implemented in different operational configurations. In various embodiments, the security analytics system 118 may be implemented for use by the endpoint agent 206. In various embodiments, the security analytics system 118 may be implemented for use by the endpoint agent 206 and the edge device 304 in combination. In various embodiments, the security analytics service 308 may likewise be implemented for use by the endpoint agent 206, the edge device 304, and the security analytics system 118, individually or in combination. In certain of these embodiments, the security analytics system 118 may be primarily oriented to performing security risk assessment operations related to one or more entity's associated entity behaviors.

In certain embodiments, the security analytics system 118 may be primarily oriented to applying risk mitigations in a way that maximizes security effort return-on-investment (ROI). In certain embodiments, such approaches may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed.

To extend the example, the edge device 304 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified user entity's actions, at a particular time.

In certain embodiments, the security analytics system 118 may be primarily oriented to maximally leverage contextual information associated with various entity behaviors within the system. In certain embodiments, data flow tracking is performed by one or more endpoint agents 206, which allows the quantity and type of information associated with particular entities to be measured. In turn, this information may be used to determine how a particular edge device 304 handles requests. Skilled practitioners of the art will recognize that many such embodiments and examples are possible. Accordingly, the foregoing is not intended to limit the spirit, scope or intent of the invention.

Figure 4:
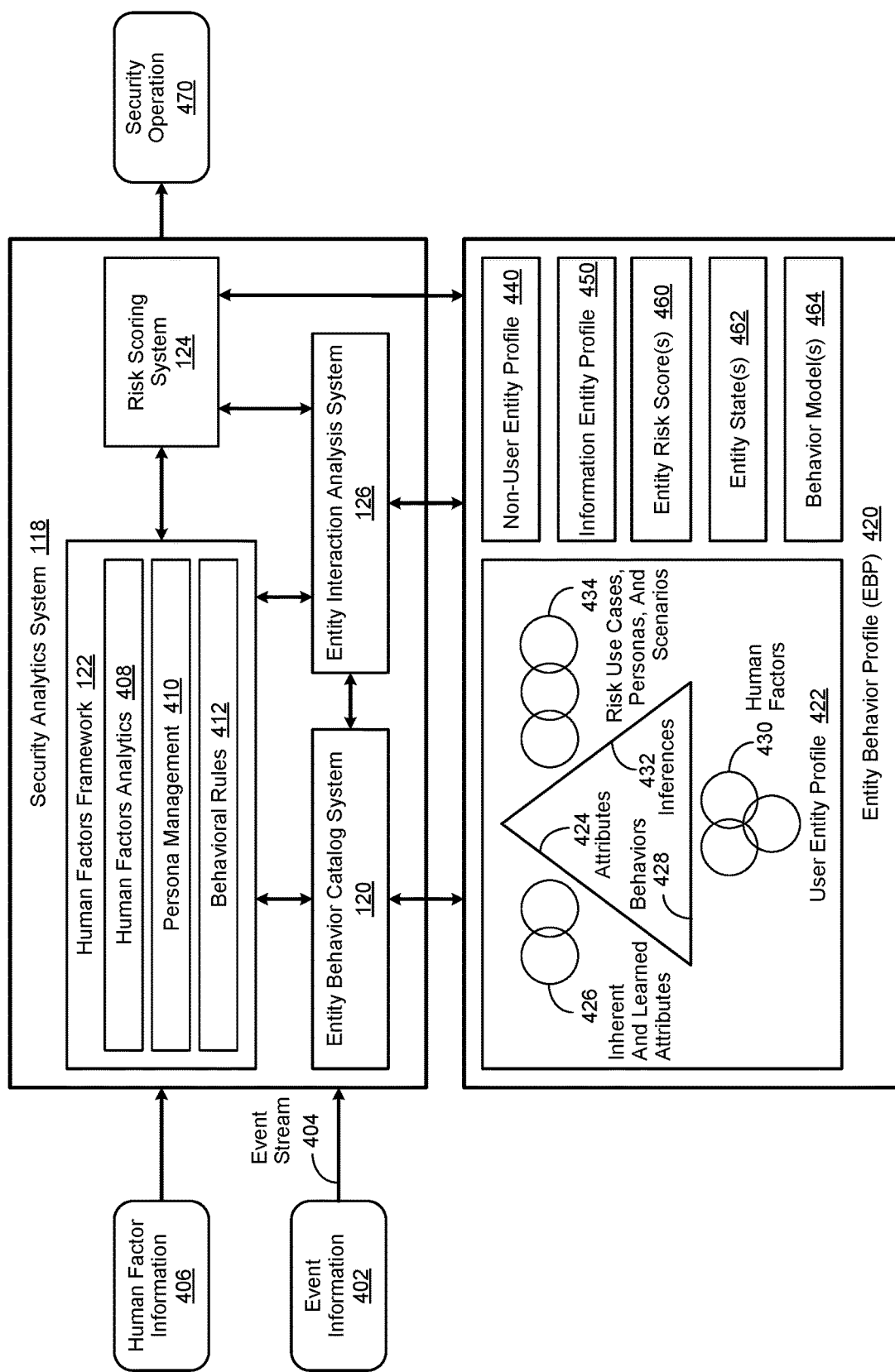
FIG. 4 is a simplified block diagram of the operation of a security analytics system used to process information stored in an entity behavior profile (EBP)

FIG. 4 is a simplified block diagram of the operation of a security analytics system implemented in accordance with an embodiment of the invention to process information stored in an entity behavior profile (EBP). In various embodiments, a security analytics system 118 may be implemented to use certain information stored in an EBP 420 to perform a security analytics operation, described in greater detail herein. As used herein, an entity behavior profile 420 broadly refers to a collection of information that uniquely describes a particular entity's identity and their associated behavior, whether the behavior occurs within a physical realm or cyberspace. In certain embodiments, the security analytics system 118 may be implemented to use certain event 402 and human factor 406 information in the performance of a particular security analytics operation.

In certain embodiments, the security analytics system 118 may be implemented with an entity behavior catalog (EBC) system 120, a human factors framework 122, a risk scoring system 124, and an entity interaction analysis system 126, or a combination thereof. In various embodiments, the human factors framework 122 may be implemented to receive and process certain human factor 406 information to generate one or more human factors 430. In certain embodiments, the EBC system 120 may be implemented to store the resulting human factors 430 in a user entity profile 422, described in greater detail herein.

As used herein, human factors 430 broadly refer to certain cardinal traits, emotional stressors, and organizational dynamics that individually, or in combination, may influence, one way or another, the entity behavior of an associated user entity. As an example, an employee experiencing financial stress may attempt to exfiltrate proprietary data in exchange for compensation from a competitor. As used herein, cardinal traits broadly refers to a user entity's consistent and enduring observed entity behavioral patterns. As likewise used herein, an emotional stressor broadly refers to any event involving an end user entity such that it may have an emotional influence upon, or otherwise affect, a user entity's behavior. An organizational dynamic, as likewise used herein, broadly refers to any event that occurs within an organization, or large group, that may have an operational influence upon, or otherwise affect, a user entity's behavior.

In various embodiments, the human factors framework 122 may be implemented with a human factors analytics 408 module, a contextual security risk persona management 410 module, and certain user entity behavioral rules 412, or a combination thereof. In certain embodiments, the human factors analytics 408 module may be implemented to perform a human factors analytics operation. As used herein, a human factors analytics operation broadly refers to any operation performed to analyze the effect that certain human factors, individually or in combination, may have on the security risk corresponding to an entity behavior enacted by an associated user entity. In certain embodiments, the security risk persona management 410 module may be implemented to create, revise, update, or otherwise manage a particular security risk persona, described in greater detail herein, associated with a particular user entity.

In various embodiments, the human factors framework 122 may be implemented to create, revise, update, or otherwise manage certain user behavioral rules 412 associated with a particular user entity. In certain embodiments, the user behavioral rules 412 may be implemented to determine whether a particular user entity behavior is anomalous, abnormal, unexpected, suspicious, or some combination thereof. In certain embodiments, the human factors framework 122 may be implemented to use the user behavioral rules 412 to determine whether certain user entity behaviors that are determined to be anomalous, abnormal, unexpected, suspicious, or some combination thereof, may likewise be considered to be a concerning behavior within a particular context.

In various embodiments, the EBC system 120 may be implemented to process a stream 404 of event 402 information to generate, revise, and otherwise manage certain information contained in an EBP 420. In certain embodiments, the EBP 420 may be implemented to include a user entity profile 422, a non-user entity profile 440, an information entity profile 450, one or more entity risk scores 460, one or more entity states 462, and one or more entity behavior models 464, or a combination thereof. As used herein, a user entity profile 422 broadly refers to a collection of information that uniquely identifies and describes a particular user entity identity and their associated entity behavior, whether the behavior occurs within a physical realm or cyberspace. As likewise used herein, a non-user entity profile 440 broadly refers to a collection of information that uniquely identifies and describes a particular non-user entity identity and its associated entity behavior, whether the behavior occurs within a physical realm or cyberspace. An information entity profile 450, as likewise used herein, broadly refers to a collection of information that uniquely identifies and describes a particular information entity, described in greater detail herein, and its associated entity behavior, whether the behavior occurs within a physical realm or cyberspace.

In various embodiments, the user entity profile 422 may be implemented to contain certain attribute 424, behavior 426, and inference 430 data related to a particular user entity. In certain embodiments, the attribute 424 data may include information associated with a particular user entity's inherent and learned 426 attributes. In certain embodiments, the attribute 424 data may be used by the human factors framework 122 to gain knowledge or insights about a particular user entity and their associated user entity behavior.

In certain embodiments, a user entity's inherent and learned attributes 426 may include known facts, such as their location and contact information, their job title and responsibilities, their peers and manager, and so forth. In certain embodiments, a user entity's inherent and learned attributes 426 may be derived through observation, as described in greater detail herein. Examples of such derived inherent and learned attributes 426 include which devices a user entity may typically use, their usual work hours and habits, their interactions with other entities, and so forth.

In certain embodiments, the behavior 428 data may include information associated with a particular user entity's human factors 430, described in greater detail herein. In certain embodiments, the behavior 428 data may include information associated with a particular user entity's interactions with other entities, likewise described in greater detail herein. In certain embodiments, the behavior 428 data may include information associated with a particular user entity's social behavior. As used herein, social behavior broadly refers to behavior exhibited by a user entity when interacting with another user entity during a user entity-to-user entity interaction, described in greater detail herein.

Various embodiments of the invention reflect an appreciation that a user entity's social behavior may reveal certain aspects of the closeness and appropriateness of a particular user entity's relationship with another user entity, including when such a relationship deteriorates. In certain embodiments, the analysis of a user entity's social behavior may assist in understanding when a user entity's behavior is anomalous, abnormal, unexpected, suspicious, or some combination thereof. In certain embodiments, a user entity's social behavior may be enacted over multiple channels, such as chat, email, phone calls, meetings, collaboration tools, and so forth.

In various embodiments, certain data associated with the enactment of a particular user entity's social behavior over such channels may be collected and then used by the entity interaction analysis system 126 in the performance of one or more entity interaction risk analysis operations. As used herein, an entity interaction risk analysis operation broadly refers to any operation performed to analyze certain entity behavior information associated with a particular interaction to determine its associated risk. In various embodiments, an entity interaction risk analysis operation may be performed to analyze the content of certain user entity communications, such as email messages, text messages, and videoconference recordings, associated with a particular user entity-to-user entity interaction. In certain of these embodiments, the content of such user entity communications may be analyzed for its sentiment and tone, as well whether the communication is classified as being associated with an organizational entity interaction or a personal entity interaction, both of which are described in greater detail herein.

In various embodiments, an entity interaction risk analysis operation may be performed to analyze certain structural characteristics of a particular user entity's social behavior. In certain embodiments, such structural characteristics may include the cadence and frequency of the user entity's interactions with other user entities. In various embodiments, such structural characteristics may likewise include the characteristics of certain groups of user entities that a particular user entity interacts with. Likewise, in certain of these embodiments, such structural characteristics may include whether the members of such a group are related professionally, or non-professionally, or a combination thereof. In various embodiments, such structural characteristics may include the duration of individual user entity-to-user entity interactions, whether the interaction is passive or active, public or active, and whether information is shared, such as in attachments to an email message.

In certain embodiments, the inference 432 data may include information associated with certain security risk use cases, security risk personas, and security vulnerability scenarios 434, or a combination thereof, related to a particular user entity. As used herein, a security risk use case broadly refers to a set of indicators of behavior that create a security risk narrative that can be used to adaptively draw inferences, described in greater detail herein, from entity behavior enacted by a particular entity. As used herein, an indicator of behavior (IOB) broadly refers to an abstracted description of the inferred intent of the enactment of one or more entity behaviors, described in greater detail herein, by an associated entity. In certain embodiments, information related to the enactment of a particular entity behavior may be stored in the form of an observable. As used herein, an observable broadly refers to certain event information corresponding to an electronically-observable behavior enacted by an entity. In certain embodiments, an IOB is derived from a group of associated observables corresponding to the enactment of a particular entity behavior.

As an example, a user entity may enact certain entity behavior that results in the occurrence of one or more operating system (OS) events, a cloud access security broker (CASB) event, a firewall access event, and a data file download event. In this example, the events are observables. To continue the example, an IOB of "user downloaded document" can be inferred from the observables.

Skilled practitioners of the art will be familiar with the concept of an indicator of compromise (IOC), which is an artifact on a system or network that indicate a malicious activity has occurred. Known examples of IOCs include file hashes, network addresses, domain names, and so forth. As such, IOCs are useful in identifying and preventing adversary attacks based upon unique signatures of malware or other tools used by an attacker. However, IOCs are less effective against insider threats, such as data exfiltration. Accordingly, certain embodiments of the invention reflect an appreciation that IOBs can provide a description of the approach an attack is taking as it is occurring, unlike an IOC, which provides evidence of an attack after it has taken place.

As likewise used herein, a security risk persona broadly refers to a descriptor characterizing an entity behavioral pattern exhibited by a user entity during the enactment of certain user entity behaviors. In certain embodiments, the security risk persona may directly or indirectly characterize, or otherwise reference, one or more user entity behaviors. As an example, a user entity may exhibit user entity behaviors typically associated with data stockpiling. In this example, the security risk persona for the user entity might be "Data Stockpiler," or "Stockpiler." Likewise, as used herein, a security vulnerability scenario broadly refers to a grouping of one or more security risk use cases that represent a particular class of security vulnerability.

In various embodiments, the human factors framework 122 may be implemented in combination with the EBC system 122 to store certain human factors information in the EBP 420 and retrieve it therefrom. In certain embodiments, the attribute 424, behavior 428, and inference 432 data stored in the user entity profile 422 may be used individually, or in combination, by the human factors framework 122 to perform a human factors risk operation. As used herein, a human factors risk operation broadly refers to any operation performed to identify a human factor 430, classify it into a corresponding human factor class, or determine the effect it may have on the security risk represented by an associated JOB, or a combination thereof.

In various embodiments, the security analytics system 118 may be implemented to use certain information stored in the EBP 420 to draw inferences 432 regarding the trustworthiness of a particular entity. In certain embodiments, as described in greater detail herein, the drawing of the inferences may involve comparing a new entity behavior to known past behaviors enacted by the entity. In certain embodiments, new entity behavior that is different from known past behaviors may represent entity behavior signifying an associated security risk.

In certain embodiments, the risk scoring system 124 may be implemented to use such inferences 432, and other information stored in the EBP 420 to generate one or more entity risk scores 460. In certain embodiments, the resulting entity risk scores 460 may be quantitative, qualitative, or combination of the two. In certain embodiments, the EBC system 120 may be implemented to manage information associated with such risk scores 460 in the EBP 420.

As used herein, entity state 462 broadly refers to the context of a particular event as it relates to an associated entity behavior. In certain embodiments, the entity state 462 may be a long-term entity state or a short-term entity state. As used herein, a long-term entity state 462 broadly relates to an entity state 462 that persists for an extended interval of time, such as six months or a year. As likewise used herein, a short-term entity state 462 broadly relates to an entity state 462 that occurs for a brief interval of time, such as a few minutes or a day. In various embodiments, the method by which an entity state's 462 associated interval of time is considered to be long-term or short-term is a matter of design choice.

As an example, a particular user entity may have a primary work location, such as a branch office, and a secondary work location, such as their company's corporate office. In this example, the user's primary and secondary offices respectively correspond to the user's location, whereas the presence of the user at either office corresponds to an entity state 462. To continue the example, the user may consistently work at their primary office Monday through Thursday, but at their company's corporate office on Fridays. To further continue the example, the user's presence at their primary work location may be a long-term entity state 462, while their presence at their secondary work location may be a short-term entity state 462. Consequently, the long-term user entity state 462 on Monday through Thursday will typically be "working at the branch office" and the short-term entity state 462 on Friday will likely be "working at the corporate office."

As used herein, an entity behavior model 464 broadly refers to a collection of information related to an entity's historical entity behavior over a particular period of time. In certain embodiments, an entity behavior model 464 may be used by the security analytics system 118 to gain insight into how unexpected a set of events may be. As an example, an entity behavior model 464 may include information related to where a particular user entity works, which devices they may use and locations they may login from, who they may communicate with, and so forth. Certain embodiments of the invention reflect an appreciation that such entity behavior models 464 can be useful when comparing currently observed entity behaviors to past observations in order to determine how unusual a particular entity behavior may be.

For example, a user may have multiple entity behavior models 464, each associated with a particular channel, which as used herein broadly refers to a medium capable of supporting the electronic observation of entity behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

In various embodiments, the security analytics system 118 may be implemented to perform a security operation 470. As used herein, a security operation 470 broadly refers to any action performed to mitigate an identified security risk. In certain embodiments, the security analytics system 118 may be implemented to identify the security risk. In various embodiments, the security analytics system 118 may be implemented to use certain information contained in the EBP 420 to either identify the security risk, or perform the security operation 470, or a combination of the two. In certain embodiments, the security system 118 may be implemented to perform the security operation 470 automatically or semi-automatically. Those of skill in the art will recognize that many such embodiments are possible. Accordingly, the foregoing is not intended to limit the spirit, scope, or intent of the invention.

Figure 5:
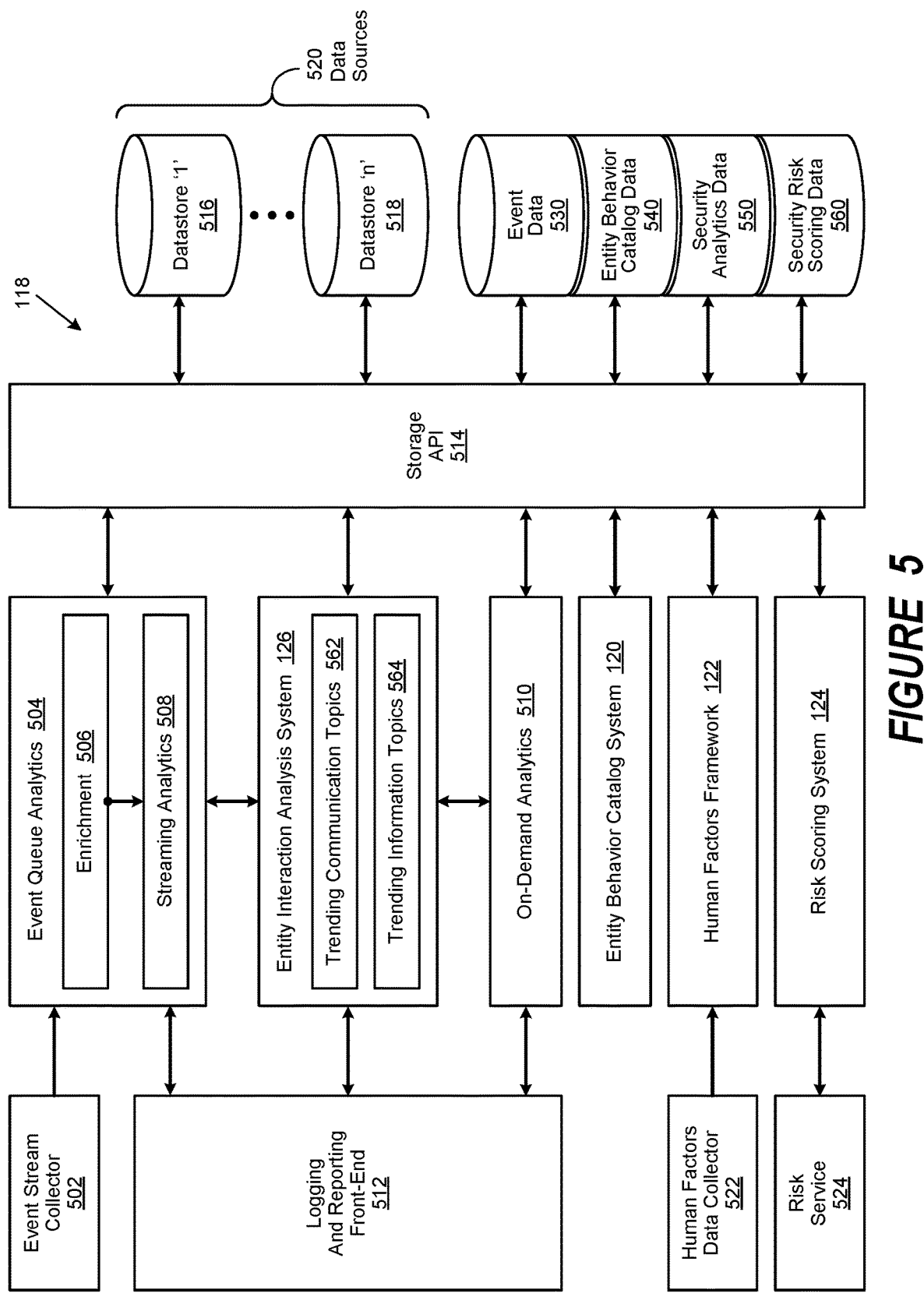
FIG. 5 is a simplified block diagram showing certain components of a security analytics system.

FIG. 5 is a simplified block diagram showing certain components of a security analytics system implemented in accordance with an embodiment of the invention. In certain embodiments, the security analytics system 118 shown in FIG. 5 may include an event queue analytics 504 sub-system, an entity interaction analysis 126 system, an on-demand analytics 510 sub-system, an entity behavior catalog (EBC) system 120, a human factors framework 122, and a risk scoring system 124, or a combination thereof. In certain embodiments, the event queue analytics 504 sub-system may be implemented to include an enrichment 506 module and a streaming analytics 508 module. In certain embodiments, the entity interaction analysis 126 system may be implemented to include a trending communications topics 562 module and a trending information topics 564 module.

In certain embodiments, the security analytics system 118 may be implemented to provide log storage, reporting, and analytics capable of performing streaming 508, entity interaction, and on-demand 510 analytics operations, or a combination thereof. In certain embodiments, such operations may be associated with defining and managing an entity behavior profile (EBP), described in greater detail herein. In certain embodiments, as likewise described in greater detail herein, an EBP may be implemented to detect entity behavior that may be anomalous, abnormal, unexpected, or suspicious, or a combination thereof.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time.

To continue the example, the fact that the information the user is attempting to access is proprietary, that it is stored in various locations, and the attempts are occurring in a brief period of time, in combination, may indicate the user entity behavior enacted by the user is suspicious. As another example, certain entity identifier information (e.g., a user name) associated with an entity may change over time. In this example, a change in the entity's user name, during a particular time period or at a particular point in time, may represent suspicious entity behavior.

In certain embodiments, the security analytics system 118 may be implemented to be scalable. In various embodiments, the security analytics system 118 may be implemented in a centralized location, such as a corporate data center. In certain of these embodiments, additional resources may be added to the security analytics system 118 as needs grow. In various embodiments, the security analytics system 118 may be implemented as a distributed system. In certain of these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 502 may be implemented to collect event and related contextual information, described in greater detail herein, associated with various entity behaviors. In these embodiments, the method by which the event and contextual information is selected to be collected by the event stream collector 502 is a matter of design choice. In certain embodiments, the event and contextual information collected by the event stream collector 502 may be processed by an enrichment module 506 to generate enriched entity behavior information. In certain embodiments, the enrichment may include certain contextual information related to a particular entity behavior or event. In various embodiments, the enrichment may include certain temporal information, such as timestamp information, related to a particular entity behavior or event.

In certain embodiments, enriched entity behavior information may be provided by the enrichment module 506 to a streaming analytics 508 module. As used herein, streaming analytics 508 broadly refers to analytics performed in near real-time on enriched entity behavior information as it is received. In certain embodiments, the streaming analytics 508 module may provide some or all of the enriched entity behavior information to the entity interaction analysis 126 system.

In certain embodiments, the entity interaction analysis 126 system may be implemented to provide the enriched entity behavior information to the trending communications topics 562 module, or the trending information 564 module, or both. In various embodiments, the trending communications topics 562 module may be implemented to use the enriched entity behavior information it receives to perform analytics operations to identify the trending of certain communication topics associated with one or more user entity interactions. Likewise, in various embodiments, the information topics 564 module may be implemented to use the enriched entity behavior information it receives to perform analytics operations to identify the trending of certain information topics associated with one or more information entity interactions.

In various embodiments, the entity interaction analysis system 126 may be implemented to provide certain entity interaction analytic information to the on-demand analytics 510 module. As likewise used herein, on-demand analytics 510 broadly refers herein to analytics performed, as they are requested, on enriched entity behavior information after it has been received. In certain embodiments, the enriched entity behavior information may be associated with a particular event. In certain embodiments, the enrichment 506 module, the entity interaction analytics 126 system, and the streaming analytics modules, or a combination thereof, may be implemented to perform event queue analytics 504 operations, as described in greater detail herein.

In certain embodiments, the on-demand 510 analytics may be performed on enriched entity behavior associated with a particular interval of, or point in, time. In certain embodiments, the streaming 508, entity interaction 126, or on-demand 510 analytics may be performed on enriched entity behavior associated with a particular user, group of users, one or more non-user entities, or a combination thereof. In certain embodiments, the streaming 408 or on-demand 510 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming analytics 508 module, the entity interaction analytics system 126, and the or on-demand analytics 510 subsystem, or a combination thereof, may be provided to a storage Application Program Interface (API) 514. In turn, the storage API 514 may be implemented to provide access to certain data sources 520, such as datastores '1' 516 through 'n' 518. In certain embodiments, the datastores '1' 516 through 'n' 518 may variously include a datastore of entity identifiers, temporal events, or a combination thereof. In certain embodiments, the storage API 514 may be implemented to provide access to repositories of event 530, entity behavior catalog (EBC) 540, security analytics 550, and security risk scoring 560 data, or a combination thereof. In various embodiments, the data stores '1' 516 through 'n' 518 may be implemented to store the results of certain security analytics operations.

In various embodiments, the security analytics system 118 may be implemented with a logging and reporting front-end 512, which in certain embodiments may be used to receive the results of analytics operations performed by the streaming analytics 508 module, the entity interaction analysis 126 system, and the on-demand analytics 510 sub-system, or a combination thereof. In certain embodiments, the human factors framework 122 may be implemented to receive human factors information, described in greater detail herein, from a human factors data collector 522. In various embodiments, the entity behavior catalog system 120 and the human factors framework 122 may respectively be implemented to use the storage API 514 to access certain data stored in the data sources 520, the repositories of event 530, entity behavior catalog (EBC) 540, security analytics 550, and security risk scoring 560 data, or a combination thereof.

In certain embodiments, the security analytics system 118 may include a risk scoring system 124 implemented to perform risk scoring operations, described in greater detail herein. In certain embodiments, functionalities of the risk scoring system 124 may be provided in the form of a risk management service 524. In various embodiments, the risk management service 524 may be implemented to perform certain operations associated with defining and managing an entity behavior profile (EBP), as described in greater detail herein. In certain embodiments, the risk management service 524 may be implemented to perform operations associated with detecting entity behavior that may be of analytic utility and adaptively responding to mitigate risk, as described in greater detail herein.

In certain embodiments, the risk management service 524 may be implemented to provide the results of various analytics operations performed by the streaming 506 or on-demand 508 analytics modules. In certain embodiments, the risk management service 524 may be implemented to use the storage API 514 to access various enhanced cyber behavior and analytics information stored on the data sources 520, the repositories of event 530, EBC 540, security analytics 550, and security risk scoring 560 data, or a combination thereof. Skilled practitioners of the art will recognize that many such embodiments are possible. Accordingly, the foregoing is not intended to limit the spirit, scope or intent of the invention.

Figure 6:
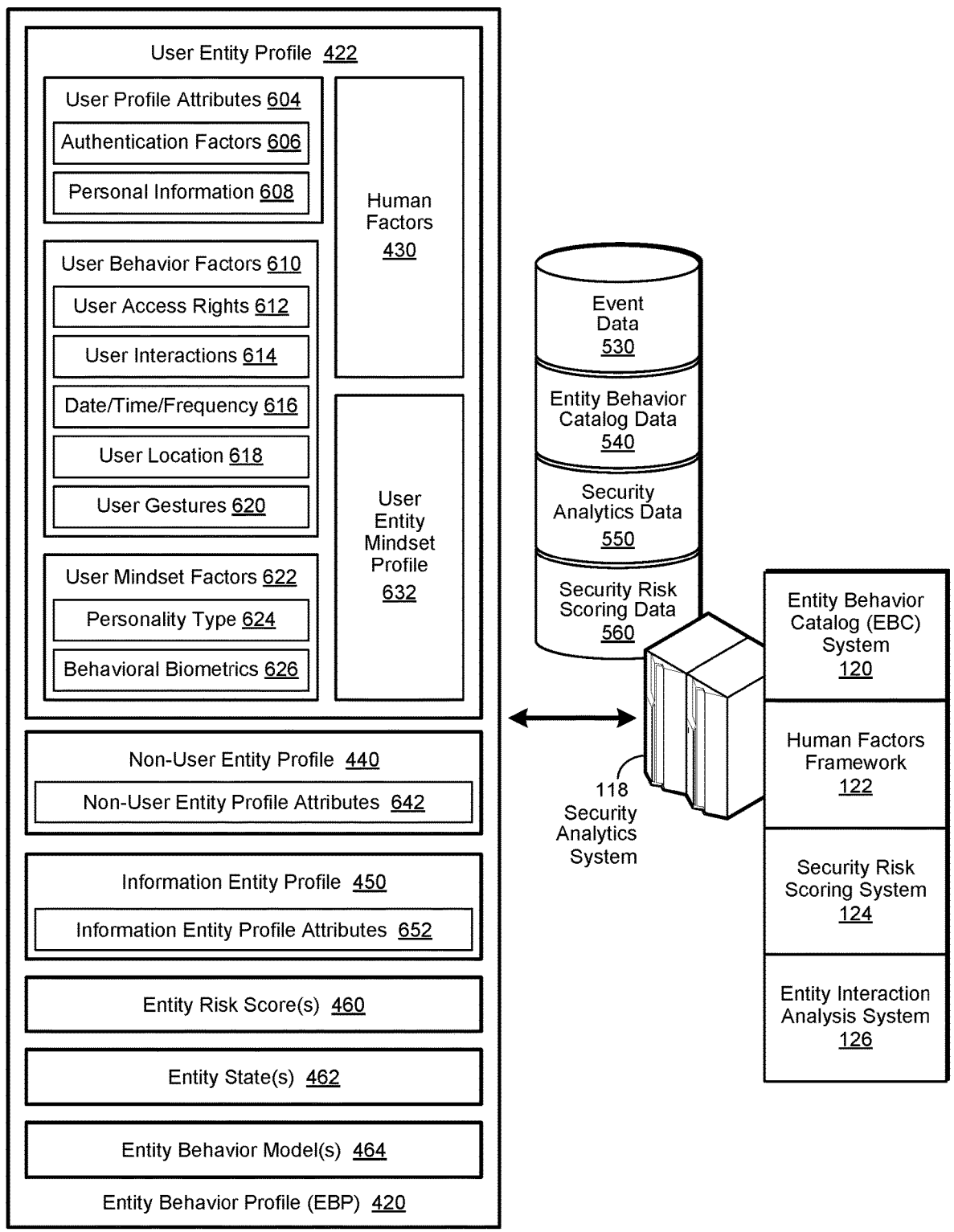
FIG. 6 shows a simplified block diagram of an entity behavior profile (EBP)

FIG. 6 shows a simplified block diagram of an entity behavior profile (EBP) implemented in accordance with an embodiment of the invention. In certain embodiments, a security analytics system 118, described in greater detail herein, may be implemented to include an entity behavior catalog (EBC) system 120, a human factors framework 122, a security risk scoring system 124, and an entity interaction analysis system 126, or a combination thereof. In certain embodiments, the security analytics system 118 may be implemented to access a repository of event 530, EBC 540, security analytics 550, and security risk scoring 560 data, or a combination thereof. In various embodiments, the security analytics system 118 may be implemented to use certain information stored in the repository of event 530, EBC 540, security analytics 550, and security risk scoring 560 data, or a combination thereof, to perform a security analytics operation, described in greater detail herein. In certain embodiments, the results of a particular security analytics operation may be stored in the repository of security analytics 550 data.

In certain embodiments, the EBC system 120 may be implemented to generate, manage, store, or some combination thereof, information related to the behavior of an associated entity. In certain embodiments, the information related to the behavior of a particular entity may be stored in the form of an entity behavior profile (EBP) 420. In certain embodiments, the EBC system 120 may be implemented to store the information related to the behavior of a particular entity in the repository of EBC 540 data. In various embodiments, the EBC system 120 may be implemented to generate certain information related to the behavior of a particular entity from event information associated with the entity, as described in greater detail herein. In certain embodiments, event information associated with a particular entity may be stored in the repository of event 530 data.

In various embodiments, the EBC system 120 may be implemented as a cyber behavior catalog. In certain of these embodiments, the cyber behavior catalog may be implemented to generate, manage, store, or some combination thereof, information related to cyber behavior, described in greater detail herein, enacted by an associated entity. In various embodiments, as likewise described in greater detail herein, the information generated, managed, stored, or some combination thereof, by such a cyber behavior catalog may be related to cyber behavior enacted by a user entity, a non-user entity, or an information entity, or a combination thereof.

In various embodiments, the EBC system 120 may be implemented to perform EBP 420 management operations to process certain entity behavior information, described in greater detail herein, and entity attribute information associated, with defining and managing an EBP 420. As used herein, entity attribute information broadly refers to information associated with a particular entity that can be used to uniquely identify the entity, and describe certain associated properties, or a combination thereof. In various embodiments, the entity attribute information may include certain types of content. In certain embodiments, such content may include text, unstructured data, structured data, graphical images, photographs, audio recordings, video recordings, biometric information, and so forth. In certain embodiments, the entity attribute information may include metadata. In certain embodiments, the metadata may include entity attributes, which in turn may include certain entity identifier types or classifications.

In certain embodiments, the entity attribute information may include entity identifier information. In various embodiments, the EBC system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In various embodiments, the entity identifier information may include certain user entity 422, non-user entity 440, and information entity 450 profile attributes, or a combination thereof.

In certain embodiments, the entity identifier information may include temporal information, described in greater detail herein. In various embodiments, the security analytics system 118 may be implemented to use certain aspects of the EBC system 120 and such temporal information to assess the risk associated with a particular entity, at a particular point in time, and respond with a corresponding security operation, likewise described in greater detail herein. In certain embodiments, the security analytics system 118 may be implemented to respond to such assessments in order to reduce operational overhead and improve system efficiency while maintaining associated security and integrity. In certain embodiments, the response to such assessments may be performed by a security administrator. Accordingly, certain embodiments of the invention may be directed towards assessing the risk associated with the affirmative resolution of the identity of an entity at a particular point in time in combination with its behavior and associated contextual information, such as human factors 430 information, described in greater detail herein. Consequently, the EBC system 120 may be more oriented in various embodiments to risk adaptation than to security administration.

In certain embodiments, an EBP 420 may be implemented to include a user entity profile 422, a non-user entity profile 440, an information entity profile 450, one or more entity risk scores 460, one or more entity states 462, and one or more entity behavior models 464, or a combination thereof. In various embodiments, the user entity profile 422 may include user entity profile attributes 604, user entity behavior factors 610, user entity mindset factors 622, certain human factors 430, and a user entity mindset profile 632, or a combination thereof. In various embodiments, the user entity profile attributes 604 may include certain user entity authentication factors 606, described in greater detail herein, and personal information 608.

As used herein, a user entity profile attribute 604 broadly refers to data or metadata that can be used, individually or in combination with other user entity profile attributes 604, user entity behavior factors 610, or user entity mindset factors 622, to ascertain the identity of a user entity. In various embodiments, certain user entity profile attributes 604 may be uniquely associated with a particular user entity. In certain embodiments, the personal information 608 may include non-sensitive personal information associated with a user entity, such as their name, title, position, role, and responsibilities.

In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user entity authentication factors 606, such as biometrics, user identifiers and passwords, and personal identification numbers (PINs). In certain embodiments, the SPI may include information considered by an individual user, a group of users, or an organization (e.g., a company, a government or non-government organization, etc.), to be confidential or proprietary.

As used herein, a user entity behavior factor 610 broadly refers to information associated with a user entity's behavior, whether the behavior occurs within a physical realm or cyberspace. In certain embodiments, user behavior factors entity 610 may include the user entity's access rights 612, the user entity's interactions 614, and the date/time/frequency 616 of when the interactions 614 are enacted. In certain embodiments, the user entity behavior factors 610 may likewise include the user entity's location 618, and the gestures 620 used by the user entity to enact the interactions 614.

In certain embodiments, the user entity gestures 620 may include key strokes on a keypad, a cursor movement, a mouse movement or click, a finger swipe, tap, or other hand gesture, an eye movement, or some combination thereof. In certain embodiments, the user entity gestures 620 may likewise include the cadence of the user's keystrokes, the motion, force and duration of a hand or finger gesture, the rapidity and direction of various eye movements, or some combination thereof. In certain embodiments, the user entity gestures 620 may include various audio or verbal commands performed by the user.

As used herein, user entity mindset factors 622 broadly refer to information used to make inferences regarding the mental state of a user entity at a particular point in time, during the occurrence of an event, or an enactment of a user behavior, or a combination thereof. Certain embodiments of the invention reflect an appreciation that human attitudes are generally considered to have three primary components. The first of these is affect, which as used herein, broadly refers to human feelings, emotions, moods, and so forth. The second is behavior, which as used herein, broadly refers to goal-directed and other types of behavior familiar to skilled practitioners of the art. The third is cognition, which as used herein, broadly refers to human beliefs and knowledge, which forms the way in which a human thinks.

Skilled practitioners of the art will be aware that human attitudes vary in importance, with some of the most important linked to social identification, group membership, self-interest, and personal value. Furthermore, strongly held attitudes, especially those with personal relevance, drive human behaviors. These behaviors may be positive, such as those related to maintaining a person's health, or negative, such as engaging in violent protests, retaliating against an employer or co-workers, and so forth. Accordingly, certain embodiments of the invention reflect an appreciation that understanding strongly held attitudes may provide an avenue for identifying individuals who may pose a behavioral risk to an organization.

Certain embodiments of the invention likewise reflect an appreciation that the words people use to communicate with one another, especially about personal topics of interest, can provide a rich source of data for identifying both attitude and attitude strength. Likewise, the words that people read, engage with, and share can be representative of topics of interest, or belief systems, or both. Certain embodiments of the invention likewise reflect an appreciation that individuals tend to create, seek out, and consume information that aligns with their existing beliefs. Likewise, certain embodiments of the invention reflect an appreciation that communication data exchanged between individuals may also be used to determine peer groups, or group membership, which can indicate a person's social alignment and strongly held beliefs.

In various embodiments, as described in greater detail herein, these human behaviors may be electronically observable, as described in greater detail herein. In certain of these embodiments, electronically observable behaviors may be processed to identify the mindset of a particular user entity, at a particular point in time. In various embodiments, the mindset of a user entity, at a particular point in time, may be inferred from the correlation of certain associated events, likewise described in greater detail herein. In certain embodiments, the electronically observed behavior of a particular user entity may be used to infer the mindset of a group of other user entities associated with the user entity.

As likewise used herein, mental state broadly refers to a hypothetical state corresponding to the way a user entity may be thinking or feeling. In certain embodiments, the user entity mindset factors 622 may include a personality type 624. Examples of known approaches for determining a personality type 624 include Jungian types, Myers-Briggs type indicators, Keirsey Temperament Sorter, Socionics, Enneagram of Personality, and Eyseneck's three-factor model.

In certain embodiments, the user entity mindset factors 622 may include various behavioral biometrics 626. As used herein, a behavioral biometric 628 broadly refers to a physiological indication of a user entity's mental state. Examples of behavioral biometrics 626 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user entity behavior factors 610, such as user entity gestures 620, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 620 may provide certain indications of the mental state of a particular user entity, they may not provide the reason for the user entity to be in a particular mental state. As an example, aggressive, forceful keystrokes combined with an increased heart rate may indicate normal behavior for a particular user when composing end-of-month performance reviews. In various embodiments, certain user entity behavior factors 610, such as user entity gestures 620, may be correlated with certain contextual information, as described in greater detail herein.

Likewise, certain embodiments of the invention include an appreciation that certain user entity gestures 620 and behavioral biometrics 626 are reflective of an individual user's personality type 624. In various embodiments, the EBC system 120 may be implemented to use certain human factors 430, described in greater detail herein, in combination with other information contained in the user entity profile 422, and a particular entity state 462, described in greater detail herein, to generate an associated user entity mindset profile 632. As used herein, a user entity mindset profile 632 broadly refers to a collection of information that reflects an inferred mental state of a user entity at a particular time during the occurrence of an event, an enactment of an associated user entity behavior, or a combination of the two. As an example, certain information may be known about a user entity, such as their name, their title and position, and so forth, all of which are user entity profile attributes 604. Likewise, it may be possible to observe a user entity's associated user entity behavior factors 610, such as their interactions with various systems, when they log-in and log-out, when they are active at the keyboard, the rhythm of their keystrokes, and which files they typically use.

Certain embodiments of the invention reflect an appreciation these user entity behavior factors 610 may change, a little or a lot, from day to day. These changes may be benign, such as when a user entity begins a new project and accesses new data, or they may indicate something more concerning, such as a user entity who is actively preparing to steal data from their employer. In certain embodiments, the user entity behavior factors 610 may be implemented to ascertain the identity of a user entity. In certain embodiments, the user entity behavior factors 610 may be uniquely associated with a particular user entity.

In certain embodiments, observed user entity behaviors may be used to build a user entity profile 422 for a particular user entity. In addition to creating a model of a user entity's various attributes and observed behaviors, these observations can likewise be used to infer things that are not necessarily explicit. Accordingly, in certain embodiments, observed user entity behaviors may be used in combination with an EBP 420 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry that afternoon.

In various embodiments, the non-user entity profile 440 may be implemented to include certain non-user entity profile attributes 642. As used herein, a non-user profile attribute 642 broadly refers to data or metadata that can be used, individually or in combination with other non-user entity profile attributes 642, to ascertain the identity of a non-user entity. In various embodiments, certain non-user entity profile attributes 642 may be uniquely associated with a particular non-user entity, described in greater detail herein.

In certain embodiments, the non-user profile attributes 642 may be implemented to include certain identity information, such as a non-user entity's associated network, Media Access Control (MAC), physical address, serial number, associated configuration information, and so forth. In various embodiments, the non-user profile attributes 642 may be implemented to include non-user entity behavior information associated with interactions between certain user entities, non-user entities, and data entities, the type of those interactions, the data exchanged during the interactions, the date/time/frequency of such interactions, and certain services accessed or provided.

In various embodiments, the information entity profile 450 may be implemented to include certain information entity profile attributes 652. As used herein, an information profile attribute broadly refers to data or metadata that can be used, individually or in combination with other information entity profile attributes 652, to ascertain the identity of an information entity. In various embodiments, certain information entity profile attributes 652 may be uniquely associated with a particular information entity, described in greater detail herein.

In certain embodiments, the information entity profile attributes 652 may be implemented to include certain identity information, such as a file name, a hash value, time and date stamps, size and type of the data (e.g., structured, binary, etc.), a digital watermark familiar to those of skill in the art, and so forth. In various embodiments, the information entity profile attributes 652 may be implemented to include information behavior information associated with entity interactions between the information entity and certain user and non-user entities, the type of those interactions, modifications to data during a particular interaction, and the date/time/frequency of such interactions.

In various embodiments, the EBC system 120 may be implemented to use certain data associated with an EBP 420 to provide a probabilistic measure of whether a particular electronically-observable event is of analytic utility. As used herein, an event of analytic utility broadly refers to any information associated with a particular event deemed to be relevant in the performance of a security analytics operation, described in greater detail herein. In certain embodiments, an electronically-observable event that is of analytic utility may be determined to be anomalous, abnormal, unexpected, or suspicious. In certain embodiments, an electronically-observable event determined to be anomalous, abnormal, unexpected, or suspicious may be associated with an operation performed by a particular entity that is likewise considered to be concerning, as described in greater detail herein.

To continue the prior example, a user may typically work out of their company's corporate office on Fridays. Furthermore, various user entity mindset factors 622 within their associated user entity profile 422 may indicate that the user is typically relaxed and methodical when working with customer data. Moreover, the user's associated user entity profile 422 indicates that such user entity interactions 614 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 462 of dealing with customer data in general. More particularly, downloading customer data late at night on a day the user is generally not in their primary office results in an entity state 462 that is likewise inconsistent with the user's typical user behavior. As a result, the EBC system 120 may infer that the user's behavior may represent a security threat. Those of skill in the art will recognize that many such embodiments and examples are possible. Accordingly, the foregoing is not intended to limit the spirit, scope or intent of the invention.

Certain embodiments of the invention reflect an appreciation that the quantity, and relevancy, of information contained in a particular EBP 420 may have a direct bearing on its analytic utility when attempting to determine the trustworthiness of an associated entity and whether or not they represent a security risk. As used herein, the quantity of information contained in a particular EBP 420 broadly refers to the variety and volume of EBP elements it may contain, and the frequency of their respective instances, or occurrences, related to certain aspects of an associated entity's identity and behavior. As likewise used herein, information of analytic utility contained in an EBP 420 broadly refers to any information deemed to be relevant in the performance of a security analytics operation, described in greater detail herein. Likewise, as used herein, an EBP element broadly refers to any data element stored in an EBP 420, as described in greater detail herein. In various embodiments, an EBP element may be used to describe a particular aspect of an EBP, such as certain user entity profile attributes 604, user entity behavior factors 610, user entity mindset factors 622, user entity mindset profile 632, non-user entity profile attributes 642, information entity profile attributes 652, an entity risk score 460, an entity state 462, and an entity behavior model 464.

In certain embodiments, statistical analysis may be performed on the information contained in a particular EBP 420 to determine the trustworthiness of its associated entity and whether or not they represent a security risk. For example, a particular user entity authentication factor 606, such as a biometric, may be consistently used by a user entity for authenticating their identity to their endpoint device. To continue the example, a user ID and password may be used by the same, or a different user entity, in an attempt to access the endpoint device. As a result, the use of a user ID and password may indicate a security risk due to its statistical infrequency. As another example, a user entity may consistently access three different systems on a daily basis in their role as a procurement agent. In this example, the three systems may include a financial accounting system, a procurement system, and an inventory control system. To continue the example, an attempt by the procurement agent to access a sales forecast system may appear suspicious if never attempted before, even if the purpose for accessing the system is legitimate.

As likewise used herein, the relevancy of information contained in a particular EBP 420 broadly refers to the pertinence of the EBP elements it may contain to certain aspects of an associated entity's identity and behavior. To continue the prior example, an EBP 420 associated with the procurement agent may contain certain user entity profile attributes 604 related to their title, position, role, and responsibilities, all or which may be pertinent to whether or not they have a legitimate need to access the sales forecast system. In certain embodiments, the user entity profile attributes 604 may be implemented to include certain job description information. To further continue the example, such job description information may have relevance when attempting to determine whether or not the associated entity's behavior is suspicious. In further continuance of the example, job description information related to the procurement agent may include their responsibility to check sales forecast data, as needed, to ascertain whether or not to procure certain items. In these embodiments, the method by which it is determined whether the information contained in a particular EBP 420 is of sufficient quantity and relevancy is a matter of design choice.

Various embodiments of the invention likewise reflect an appreciation that accumulating sufficient information in an EBP 420 to make such a determination may take a certain amount of time. Likewise, various embodiments of the invention reflect an appreciation that the effectiveness or accuracy of such a determination may rely upon certain entity behaviors occurring with sufficient frequency, or in identifiable patterns, or a combination thereof, during a particular period of time. As an example, there may not be sufficient occurrences of a particular type of entity behavior to determine if a new entity behavior is inconsistent with known past occurrences of the same type of entity behavior. Accordingly, various embodiments of the invention reflect an appreciation that a sparsely-populated EBP 420 may result in exposure to certain security vulnerabilities.

In certain embodiments, the human factors framework 122 may be implemented to perform a human factors risk operation, likewise described in greater detail herein. In various embodiments, as likewise described in greater detail herein, the human factors framework 122 may be implemented to use certain event information stored in the repositories of event 530, EBC 540, security analytics 550, and security risk scoring 560 data, or a combination thereof, to perform the human factors risk operation. In certain embodiments, the human factors risk operation may be performed to assess the risk of an event associated with a particular user entity.

FIG. 7 is a simplified Venn diagram showing entity interactions implemented in accordance with an embodiment of the invention between a user entity, a non-user entity, and an information entity. As shown in FIG. 7, entity interactions 702, described in greater detail herein, may occur in certain embodiments between a user entity 704, a non-user entity 706, or an information entity 708. Likewise, entity interactions 702 may respectively occur in certain embodiments between a user entity 704, a non-user entity 706, or an information entity 708 and other user entities 714, other non-user entities 716, or other information entities 718. Skilled practitioners of the art will recognize that many such examples of entity interactions 702 are possible. Accordingly, the foregoing is not intended to limit the spirit, scope, or intent of the invention.

FIG. 8 is a table showing certain entity interaction classifications implemented in accordance with an embodiment of the invention. In various embodiments, one or more entity interaction classification operations, described in greater detail herein, may be performed to classify 808 a particular entity interaction, likewise described in greater detail herein, as an organizational 810 entity interaction or a personal 812 entity interaction. As used herein, an organizational 810 entity interaction broadly refers to an entity interaction enacted by an entity in furtherance of, or relating to, one or more objectives of an organization with which they are associated. As likewise used herein, a personal 812 entity interaction broadly refers to an entity interaction enacted by an entity in furtherance of, or relating to, one or more private objectives, and is not related to any organization with which the entity may be associated.

In various embodiments, one or more entity interaction classification operations, may be performed to determine whether the enactment 802 of a particular entity interaction is non-sanctioned 804 or sanctioned 806. As used herein, a non-sanctioned 804 entity interaction broadly refers to an entity interaction whose enactment does not comply with one or more policies instituted by an organization associated with an entity involved in the enactment of the entity interaction. Conversely, as likewise used herein, a sanctioned entity interaction broadly refers to an entity interaction whose enactment complies with one or more policies instituted by an organization associated with an entity involved in the enactment of the entity interaction.

In various embodiments, a particular entity interaction between two entities may be deemed to be a non-sanctioned 804 entity interaction by the organization associated with one of the entities, but deemed a sanctioned 806 entity interaction by the organization associated with the other entity. Accordingly, in certain of these embodiments, the determination of what is considered to be a non-sanctioned 804, or sanctioned 806, entity interaction by an organization associated with a particular entity involved in the enactment of the entity interaction, and the method by which such a determination is made, is a matter of design choice. Certain embodiments of the invention reflect an appreciation that a particular non-sanctioned 804 entity interaction may be enacted with malicious intent, or innocently, by an associated entity.

In various embodiments, as shown in FIG. 8, a particular entity interaction may be a non-sanctioned, organizational 814 entity interaction, a sanctioned, organizational 816 entity interaction, a non-sanctioned, personal 818 entity interaction, or a sanctioned, personal 820 entity interaction. One example of a non-sanctioned, organizational 814 entity interaction would be an employee posting a derogatory comment about their employer on a social media site during working hours. Another example of a non-sanctioned, organizational 814 entity interaction would be a member of an organization accessing a web site the organization believes contains content that may include misinformation, or disinformation, or both. Yet another example of a non-sanctioned, organizational 814 entity interaction would be a sales manager sharing sensitive sales forecast information with another employee that is not authorized to receive it.

One example of a sanctioned, organizational 816 entity interaction would be an employee responding to a meeting request from another employee via an email message. Another example of a sanctioned, organizational 816 entity interaction would be an employee in the marketing department of an organization reading an article published by an online industry news agency. Yet another example of a sanctioned, organizational 816 entity interaction would be a member of an organization updating certain content on the organization's web site if that is one of their responsibilities. One example of a non-sanctioned, personal 818 entity interaction would be a member of an organization using objectionable profanity in a personal text message to another member of the organization. Another example of a non-sanctioned, personal 818 entity interaction would be an employee posting a racist comment on a social media site. Yet another example of a non-sanctioned, personal 818 entity interaction would be an employee browsing a web site deemed inappropriate by their employer during work hours.

One example of a sanctioned, personal 820 entity interaction would be an employee sending an email message during work hours to a group of co-workers inviting them to a dinner party at their home. Another example of a sanctioned, personal 820 entity interaction would be a member of an organization reading an article related to current events in the world from a reputable online news source. Yet another example of a sanctioned, personal 820 entity interaction would be an employee receiving an email containing the results of a fantasy football pool from another employee. Skilled practitioners of the art will recognize that many such examples of non-sanctioned, organizational 814, sanctioned, organizational 816, non-sanctioned, personal 818, and sanctioned, personal 820 entity interactions are possible. Accordingly, the foregoing is not intended to limit the spirit, scope, or intent of the invention.

FIG. 9 shows the enactment of entity interactions implemented in accordance with embodiment of the invention between user entities, non-user entities, and data entities. In various embodiments, a user entity-to-user entity 920 interaction may occur between a first user entity, such as user entity 'A' 910, and a second user entity, such as user entity 'B' 912. In various embodiments, a user entity-to-non-user entity 930 interaction may occur between a user entity, such as user entity 'A' 910 and certain non-user entities 904, described in greater detail herein. In various embodiments, a user entity-to-information entity 940 interaction may occur between a user entity, such as user entity 'A' 910, and certain information entities 906. In various embodiments, a non-user entity-to-information entity 950 interaction may occur between certain non-user entities 904 and certain information entities 906. In certain embodiments (not shown), a non-user entity-to-non-user entity interaction may occur between certain non-user entities 904.

In various embodiments, certain information associated with user entity-to-user entity 920, user entity-to-non-user entity 930, and user entity-to-information entity 940 interactions may be stored within a user entity profile 420, described in greater detail herein. In various embodiments, such information stored in the user entity profile 422 may include certain attribute 422, behavior 426, and inference 430, or a combination thereof, as likewise described in greater detail herein. Those of skill in the art will recognize that many such embodiments are possible. Accordingly, the foregoing is not intended to limit the spirit, scope, or intent of the invention.

Figure 10A:
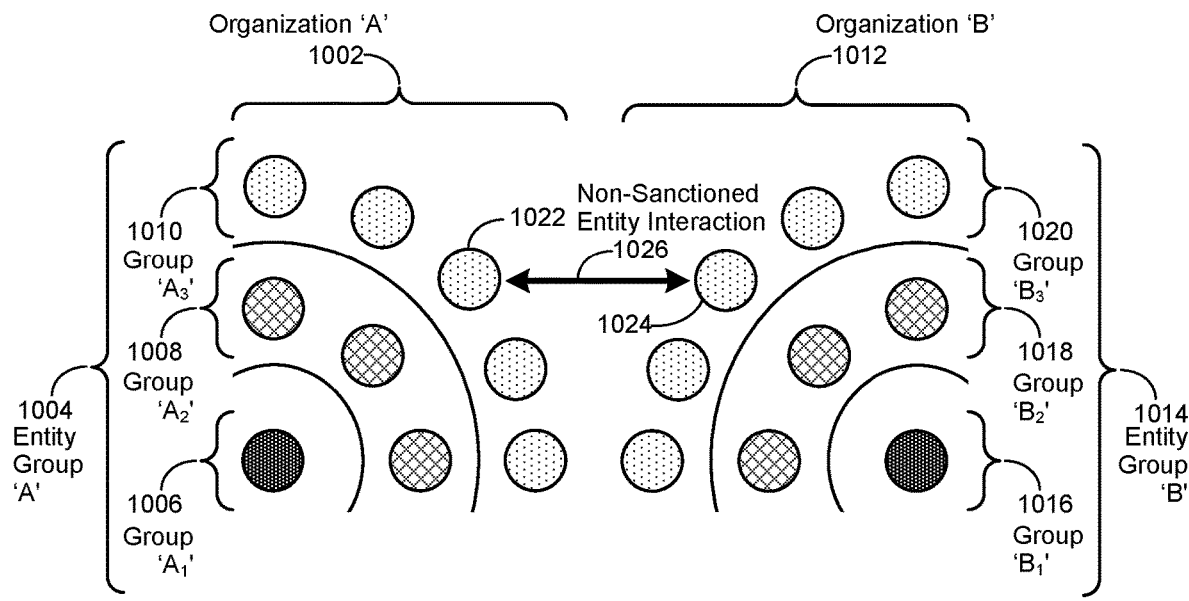
FIGS. 10a through 10d show example non-sanctioned entity interactions enacted between certain entities.

FIGS. 10a through 10d show example non-sanctioned entity interactions enacted in accordance with an embodiment of the invention between certain entities. In various embodiments, certain sanctioned entity interactions, described in greater detail herein, may be enacted by entities associated with a particular entity group. As used herein, an entity group broadly refers to a group of entities that share a common association with both one another, and the same organization, and interact amongst themselves to achieve a particular goal. For example, as shown in FIG. 10a, entity groups 'A' 1004 and 'B' 1014 are respectively associated with organizations 'A' 1002 and 'B' 1012.

In certain embodiments, the organizations may be part of a larger organization. As an example, organization 'A' 1002 may be a sales organization for a corporation while organization 'B' 1012 may be the corporation's information technology (IT) organization. Likewise, in certain embodiments, the organizations may be separate and independent of each other. For example, organization 'A' 1002 may be a manufacturer of certain computer hardware and organization 'B' 1012 may be a competitor.

In certain embodiments, an entity group may be implemented to include two or more entity sub-groups. For example, as shown in FIG. 10*a*, collaboration group 'A' 1002 may include entity sub-groups $A_1$ 1004, $A_2$ 1006, and $A_3$ 1008 and entity group 'B' 1012 may include entity sub-groups $B_1$ 1004, $B_2$ 1006, and $B_3$ 1008. In certain embodiments, the entity sub-groups may be organized as a hierarchy.

As an example, entity sub-groups $A_1$ 1004 and $B_1$ 1014 may respectively have a single member entity. In this example, the single member entities associated with entity sub-groups $A_1$ 1004 and $B_1$ 1014 may respectively enact sanctioned entity interactions with certain subordinate entities within entity sub-groups $A_2$ 1006 and $B_2$ 1016. Likewise, individual entities respectively associated with entity sub-groups $A_2$ 1006 and $B_2$ 1016 may enact sanctioned entity interactions with one another.

To continue the example, individual entities associated with entity sub-groups $A_2$ 1006 and $B_2$ 1016 may respectively enact sanctioned entity interactions with certain subordinate entities within entity sub-groups $A_3$ 1008 and $B_3$ 1018. Likewise, as before, individual entities respectively associated with entity sub-groups $A_3$ 1008 and $B_3$ 1018 may enact sanctioned entity interactions with one another. In certain embodiments, an entity, such as entity 1022, associated with a first entity group, such as entity group 'A' 1004, may enact a non-sanctioned entity interaction 1026 with an entity, such as entity 1024, associated with a second entity group, such as entity group 'B' 1014.

Figure 10B:
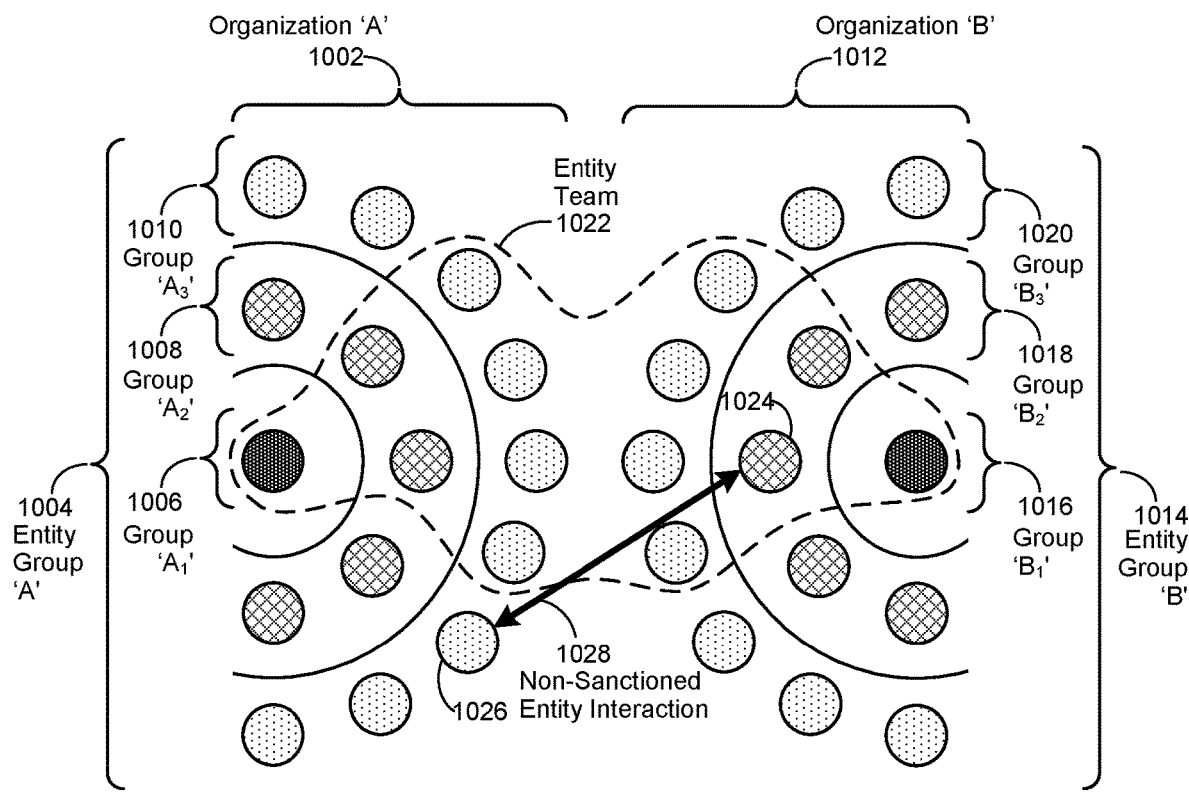

Referring now to FIG. 10*b*, certain sanctioned entity interactions may be enacted in various embodiments by entities associated with a particular entity team 1022. As used herein, an entity team 1022 broadly refers to a certain group of entities that share a common association with one another, but are respectively associated with one of two or more different organizations, and interact amongst themselves to achieve a particular goal. For example, the entity team 1022 shown in FIG. 10*b* includes entities that are respectively associated with entity groups 'A' 1004 and 'B' 1014, which in turn are respectively associated with organizations 'A' 1002 and 'B' 1012.

In certain embodiments, the organizations may be part of a larger organization. To continue a prior example, organization 'A' 1002 may be a sales organization for a corporation while organization 'B' 1012 may be the corporation's information technology (IT) organization. In this example, the entity team 1022 may have been formed to implement a new customer relationship management (CRM) system, and accordingly, enact sanctioned entity interactions amongst themselves to do so.

Likewise, in certain embodiments, the organizations may be separate and independent of each other. For example, organization 'A' 1002 may be a manufacturer of certain computer hardware and organization 'B' 1012 may be a competitor. In this example, the entity team 1022 may have been formed to define new industry standards, and accordingly, enact sanctioned entity interactions amongst themselves to do so.

In certain embodiments, an entity that is associated with a particular entity team 1022 may enact a non-sanctioned interaction with an entity that is not. For example, as shown in FIG. 10*b*, the entity team 1022 includes various entities respectively associated with organizations 'A' 1002 and 'B' 1012. In this example, a first entity 1024 is associated with both organization 'B' 1012 and the entity team 1022. Likewise, a second entity 1026 is associated with organization 'A' 1002, but not the entity team 1022. Accordingly, an entity interaction enacted between the first entity 1024 and the second entity 1026 may be a non-sanctioned entity interaction 1028.

Figure 10C:
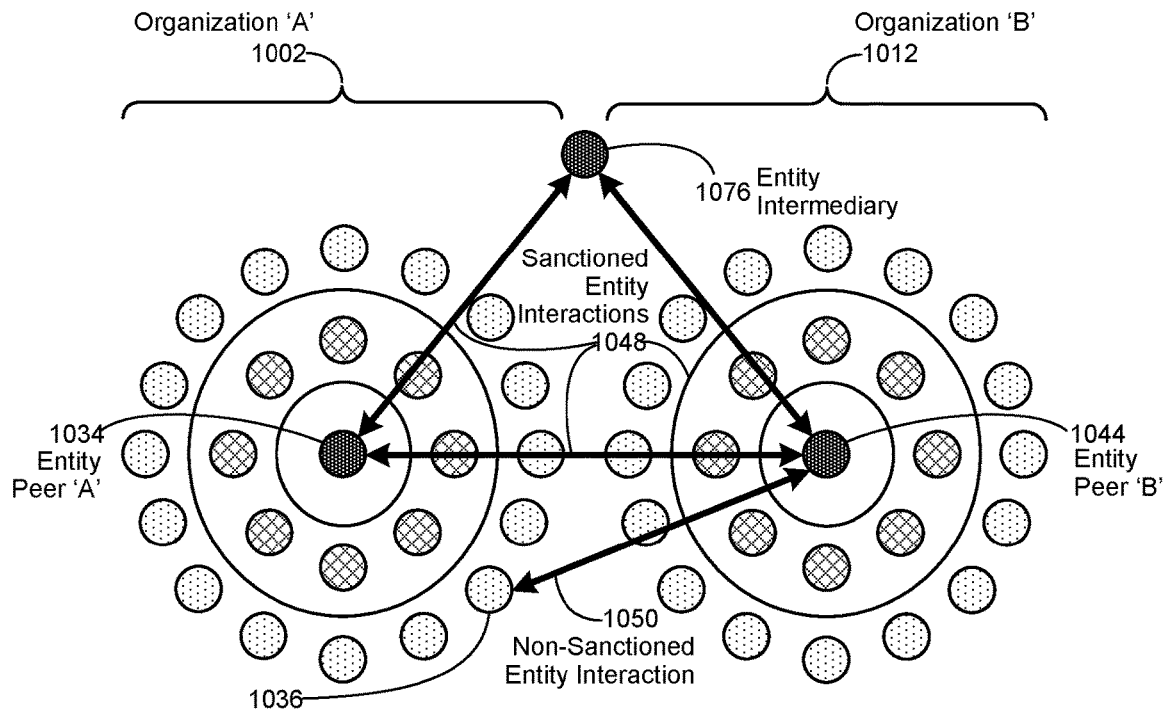
Figure 10D:
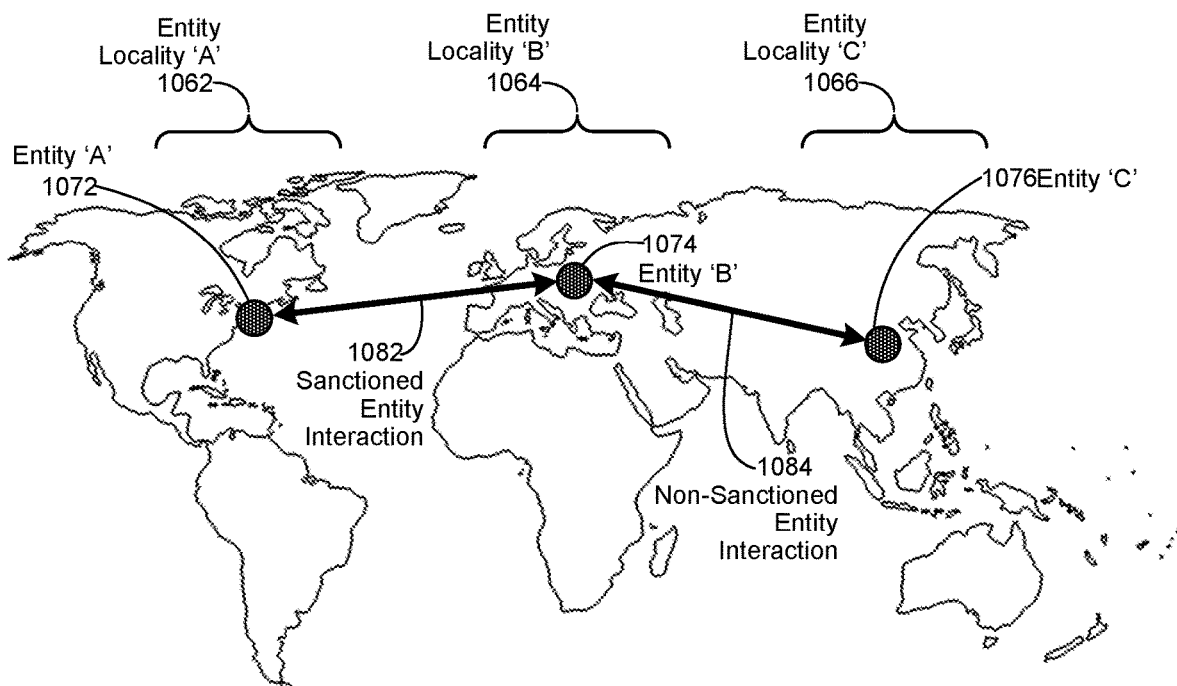

Referring now to FIG. 10*c*, certain sanctioned entity interactions 1048 may be enacted in various embodiments by entities that are peers, such as entity peer 'A' 1034 and 'B' 1044, respectively associated with a particular organization, such as organizations 'A' 1002 and 'B' 1012, or an intermediary entity 1076. As used herein, an entity peer broadly refers to an entity, such as entity peers 'A' 1034 and 'B' 1044, that substantively share the same title, position, role, responsibilities, characteristics, attributes, or capabilities, or a combination thereof, as another entity in their respective organizations.

In certain embodiments, an intermediary entity 1076 may act as a conduit of information between two or more entity peers, such as entity peers 'A' 1034 and 'B' 1044. As likewise used herein, an entity intermediary 1076 broadly refers to an entity that can respectively enact a sanctioned entity interaction 1048 with two or more entity peers, such as entity peers 'A' 1034 and 'B' 1044. As an example, entity peer 'A' 1034 may enact a sanctioned entity interaction 1048 with an intermediary entity 1076. In this example, entity peer 'A' 1034 may provide certain information, such as production statistics for a particular product, to the entity intermediary 1076. To continue the example, the entity intermediary 1076 may then enact a sanctioned entity interaction 1048 with entity peer 'B' 1044 to provide the information previously received from entity peer 'A' 1034.

As another example, entity peer 'A' 1034 may enact one or more sanctioned entity interactions 1048 to provide the same information to the intermediary 1076 and entity peer 'B' 1044. In this example, entity peer 'B' 1044 may analyze the information it has received, and then enact one or more sanctioned entity interactions 1048 to provide the resulting analysis of the information to the entity intermediary 1076 and entity peer 'A' 1034. To continue the example, the entity intermediary 1076 may in turn enact one or more sanctioned entity interactions 1048 to provide an assessment of the analysis to entity peers 'A' 1034 and 'B' 1044.

In certain embodiments, an entity peer may enact a non-sanctioned interaction with an entity that is not an entity peer. For example, as shown in FIG. 10*c*, a particular entity 1036 may be associated with organization 'A' 1002, but is subordinate to entity peer 'A' 1034. Consequently, it is not a peer of entity peers 'A' 1034 or 'B' 1044. Accordingly, enactment of an entity interaction between the subordinate entity 1036 and entity peer 'B' 1044 may constitute a non-sanctioned entity interaction 1050.

In various embodiments, an entity interaction may be enacted by an entity associated with a particular entity locality. As used herein, a locality broadly refers to a location that has certain attributes that can be described, or referenced, or both, in the context of an entity interaction. Accordingly, as likewise used herein, an entity locality broadly refers to a particular locality associated with a corresponding entity.

In certain embodiments, the entity locality may refer to a physical location, such as the address of an apartment in an apartment building, a venue, such as an office building, or a geographical designation, such as a city, state, or nation, or a combination thereof. In certain embodiments, a entity locality may refer to a virtual location, such as a network address, a Media Access Control (MAC) address associated with a non-user entity, a domain, a Uniform Resource Locator (URL) associated with an information entity, an email or text address associated with a user entity, and so forth. As an example, as shown in FIG. 9d, entity locality 'A' 1062 may correspond to a location in New York City, the United States of America, entity locality 'B' 1064 may correspond to a location in Berlin, Germany, and entity locality 'C' 1066 may correspond to a location in Beijing, China.

In this example, entities 'A' 1072, 'B' 1074, and 'C' 1076 are respectively associated with entity localities 'A' 1062, 'B' 1064, and 'C' 1066. To continue the example, entity 'A' 1072 may enact a sanctioned entity interaction 1082 to provide proprietary information to entity 'B' 1074. To continue the example further, entity 'B' 1074 may then enact a non-sanctioned entity interaction 1084 to maliciously provide the proprietary information to entity 'C' 1076. Skilled practitioners of the art will recognize that many such embodiments of an entity locality are possible. Accordingly, the foregoing is not intended to limit the spirit, scope, or intent of the invention.

Figure 11A:
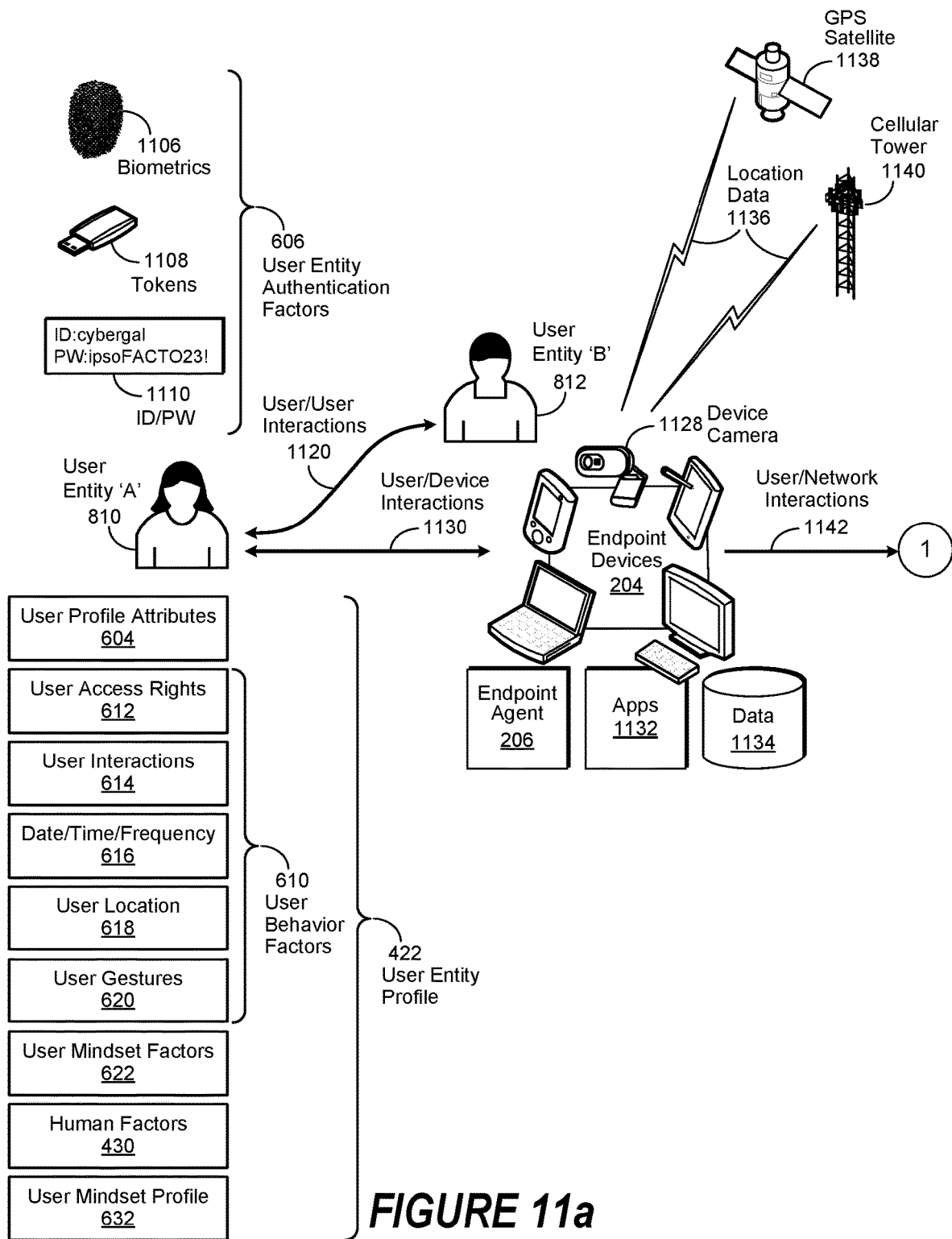
FIGS. 11a and 11b are a simplified block diagram of a security analytics environment.
Figure 11B:
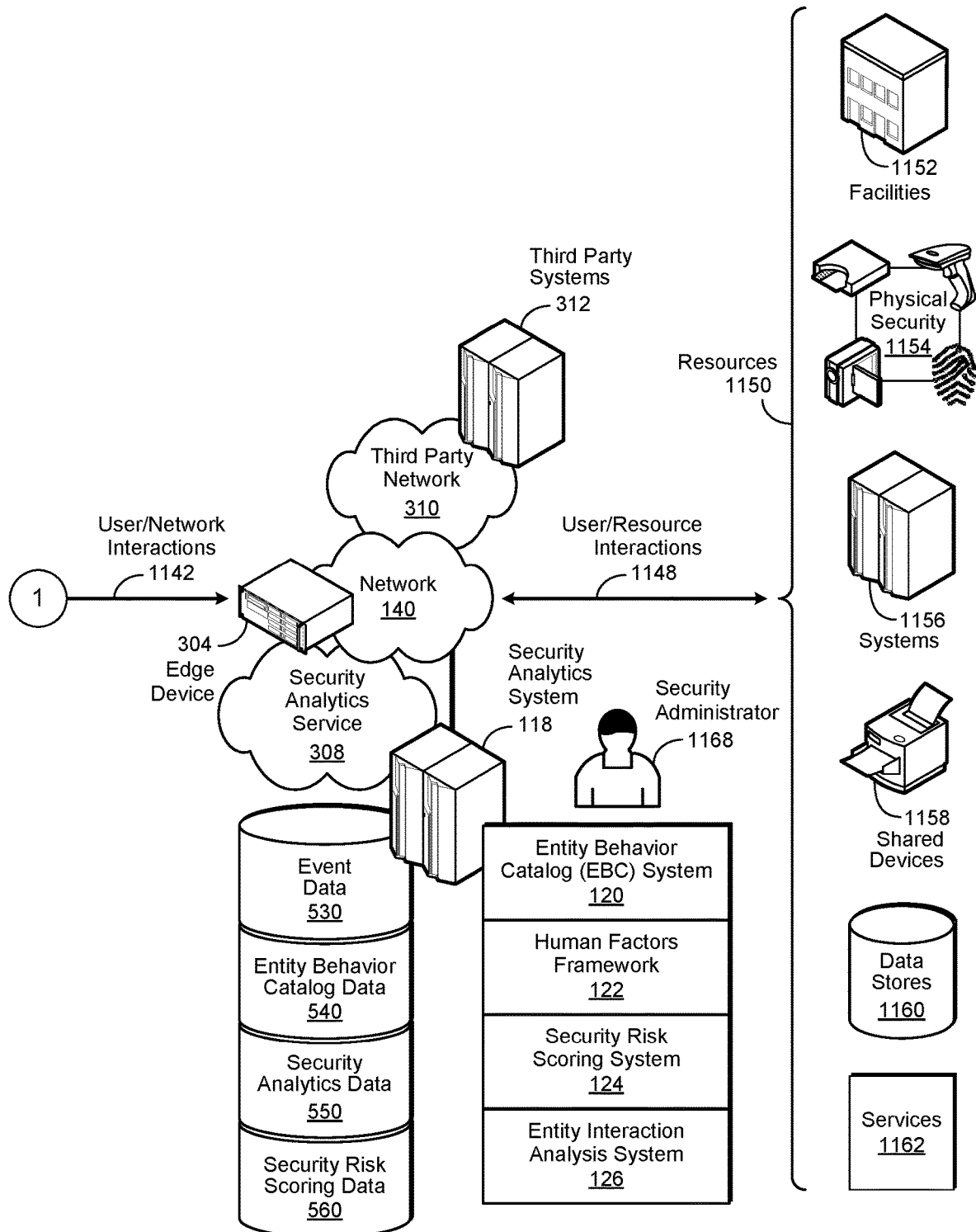

FIGS. 11a and 11b show a block diagram of a security analytics environment implemented in accordance with an embodiment of the invention. In certain embodiments, a security analytics system 118 may be implemented with an entity behavior catalog (EBC) system 120, a human factors framework 122, a security risk scoring system 124, and an entity interaction analysis system 126, or a combination thereof. In certain embodiments, analyses performed by the security analytics system 118 may be used to identify behavior associated with a particular entity that may be of analytic utility.

In certain embodiments, as likewise described in greater detail herein, the EBC system 120, the human factors framework 122, the security risk scoring system 124, and the entity interaction analysis system 126, or a combination thereof, may be used in combination with the security analytics system 118 to perform such analyses. In various embodiments, certain data stored in repositories of event 530, EBC catalog 540, security analytics 550, and security risk scoring 560 data, or a combination thereof, may be used by the security analytics system 118 to perform the analyses. As likewise described in greater detail herein, the security analytics system 118, the EBC system 120, the human factors framework 122, the security risk scoring system 124, and the entity interaction analysis system 126, or a combination thereof, may be used in combination with one another in certain embodiments to perform an entity interaction risk analysis operation, described in greater detail herein. Likewise, certain data stored in the repositories of event 530, EBC catalog 540, security analytics 550, and security risk scoring 560 data, or a combination thereof, may be used in various embodiments to perform the entity interaction risk analysis operation.

In certain embodiments, a user entity may be an individual user, such as user entity 'A' 810 or 'B' 812, a group, an organization, or a government. In certain embodiments, a non-user entity may likewise be an item, or a device, such as endpoint 204 and edge 304 devices, or a network, such as a network 140 or a third party network 306 network. In certain embodiments, a non-user entity may be a resource 1150, such as a geographical location or formation, a physical facility 1152, such as a venue, various physical security devices 1154, a system 1156, shared devices 1158, such as printer, scanner, or copier, a data store 1160, or a service 1162, such as a service operating in a cloud environment. In various embodiments, the information entity may be certain data 1134 stored on an endpoint device 204, such as a data element, a data file, or a data store known to those of skill in the art.

In various embodiments, certain user entity authentication factors 606 may be used to authenticate the identity of a user entity. In certain embodiments, the user entity authentication factors 606 may be used to ensure that a particular user entity, such as user entity 'A' 810 or 'B' 812, is associated with their corresponding user entity profile 422, rather than a user entity profile 422 associated with another user. In certain embodiments, the user entity authentication factors 606 may include a user's biometrics 1106 (e.g., a fingerprint or retinal scan), tokens 1108 (e.g., a dongle containing cryptographic keys), user identifiers and passwords (ID/PW) 1110, and personal identification numbers (PINs).

In certain embodiments, information associated with such user entity behavior may be stored in a user entity profile 422, described in greater detail herein. In certain embodiments, the user entity profile 422 may be stored in a repository of entity behavior catalog (EBC) data 540. In various embodiments, as likewise described in greater detail herein, the user entity profile 422 may include user entity profile attributes 604, user entity behavior factors 610, user entity mindset factors 622, certain human factors 430, and a user entity mindset profile 632, or a combination thereof. As used herein, a user entity profile attribute 604 broadly refers to data or metadata that can be used, individually or in combination with other user entity profile attributes 604, user entity behavior factors 610, or user entity mindset factors 622, to ascertain the identity of a user entity. In various embodiments, certain user entity profile attributes 604 may be uniquely associated with a particular user entity.

As likewise used herein, a user entity behavior factor 610 broadly refers to information associated with a user's behavior, whether the behavior occurs within a physical realm or cyberspace. In certain embodiments, the user entity behavior factors 610 may include the user entity's access rights 612, the user entity's interactions 614, and the date/time/frequency 616 of those interactions 614. In certain embodiments, the user entity behavior factors 610 may likewise include the user entity's location 618 when the interactions 614 are enacted, and the user entity gestures 620 used to enact the interactions 614.

In various embodiments, certain date/time/frequency 616 user entity behavior factors 610 may be implemented as ontological or societal time, or a combination thereof. As used herein, ontological time broadly refers to how one instant in time relates to another in a chronological sense. As an example, a first user entity behavior enacted at 12:00 noon on May 17, 2017 may occur prior to a second user behavior enacted at 6:39 PM on May 18, 2018. Skilled practitioners of the art will recognize one value of ontological time is to determine the order in which various entity behaviors have been enacted.

As likewise used herein, societal time broadly refers to the correlation of certain user entity profile attributes 604, user entity behavior factors 610, user entity mindset factors 622, or a combination thereof, to one or more instants in time. As an example, user entity 'A' 810 may access a particular system 1156 to download a customer list at 3:47 PM on Nov. 3, 2017. Analysis of their entity behavior profile indicates that it is not unusual for user entity 'A' 810 to download the customer list on a weekly basis. However, examination of their user behavior profile also indicates that user entity 'A' 810 forwarded the downloaded customer list in an email message to user entity 'B' 812 at 3:49 PM that same day. Furthermore, there is no record in their associated entity behavior profile that user entity 'A' 810 has ever communicated with user entity 'B' 812 in the past. Moreover, it may be determined that user entity 'B' 812 is employed by a competitor. Accordingly, the correlation of user entity 'A' 810 downloading the customer list at one point in time, and then forwarding the customer list to user entity 'B' 812 at a second point in time shortly thereafter, is an example of societal time.

In a variation of the prior example, user entity 'A' 810 may download the customer list at 3:47 PM on Nov. 3, 2017. However, instead of immediately forwarding the customer list to user entity 'B' 812, user entity 'A' 810 leaves for a two week vacation. Upon their return, they forward the previously-downloaded customer list to user entity 'B' 812 at 9:14 AM on Nov. 20, 2017. From an ontological time perspective, it has been two weeks since user entity 'A' 810 accessed the system 1156 to download the customer list. However, from a societal time perspective, they have still forwarded the customer list to user entity 'B' 812, despite two weeks having elapsed since the customer list was originally downloaded.

Accordingly, the correlation of user entity 'A' 810 downloading the customer list at one point in time, and then forwarding the customer list to user entity 'B' 812 at a much later point in time, is another example of societal time. More particularly, it may be inferred that the intent of user entity 'A' 810 did not change during the two weeks they were on vacation. Furthermore, user entity 'A' 810 may have attempted to mask an intended malicious act by letting some period of time elapse between the time they originally downloaded the customer list and when they eventually forwarded it to user entity 'B' 812. From the foregoing, those of skill in the art will recognize that the use of societal time may be advantageous in determining whether a particular entity behavior is of analytic utility. As used herein, user entity mindset factors 622 broadly refer to information used to infer the mental state of a user entity at a particular point in time, during the occurrence of an event, an enactment of a user entity behavior, or combination thereof.

In certain embodiments, the security analytics system 118 may be implemented to process certain entity attribute information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain entity behavior elements to resolve the identity of an entity at a particular point in time. An entity behavior element, as used herein, broadly refers to a discrete element of an entity's behavior during the performance of a particular action, or operation, in a physical realm, cyberspace, or a combination thereof. In certain embodiments, such entity behavior elements may be associated with a user/device 1130, a user/network 1142, a user/resource 1148, a user/user 1120 interaction, or a combination thereof. In certain embodiments, a user/device 1130, user/network 1142, and user/resource 1148 interactions are all examples of a user entity-to-non-user entity interaction, described in greater detail herein. In certain embodiments, a user/user 1120 interaction is one example of a user entity-to-user entity interaction, likewise described in greater detail herein.

As an example, user entity 'A' 810 may use an endpoint device 204 to browse a particular web page on a news site on an external system 1176. In this example, the individual actions performed by user entity 'A' 810 to access the web page are entity behavior elements that constitute an entity behavior, described in greater detail herein. As another example, user entity 'A' 810 may use an endpoint device 204 to download a data file from a particular system 1156. In this example, the individual actions performed by user entity 'A' 810 to download the data file, including the use of one or more user entity authentication factors 606 for user authentication, are entity behavior elements that constitute an entity behavior. In certain embodiments, the user/device 1130 interactions may include an interaction between a user, such as user entity 'A' 810 or 'B' 812, and an endpoint device 204.

In certain embodiments, the user/device 1130 interaction may include interaction with an endpoint device 204 that is not connected to a network at the time the interaction occurs. As an example, user entity 'A' 810 or 'B' 812 may interact with an endpoint device 204 that is offline, using applications 1132, accessing data 1134, or a combination thereof, it may contain. Those user/device 1130 interactions, or their result, may be stored on the endpoint device 204 and then be accessed or retrieved at a later time once the endpoint device 204 is connected to the network 140 or third party network 310. In certain embodiments, an endpoint agent 206 may be implemented to store the user/device 1130 interactions when the user device 204 is offline.

In certain embodiments, an endpoint device 204 may be implemented with a device camera 1128. In certain embodiments, the device camera 1128 may be integrated into the endpoint device 204. In certain embodiments, the device camera 1128 may be implemented as a separate device configured to interoperate with the endpoint device 204. As an example, a webcam familiar to those of skill in the art may be implemented receive and communicate various image and audio signals to an endpoint device 204 via a Universal Serial Bus (USB) interface.

In certain embodiments, the device camera 1128 may be implemented to capture and provide user/device 1130 interaction information to an endpoint agent 206. In various embodiments, the device camera 1128 may be implemented to provide surveillance information related to certain user/device 1130 or user/user 1120 interactions. In certain embodiments, the surveillance information may be used by the security analytics system 118 to detect entity behavior associated with a user entity, such as user entity 'A' 810 or 'B' 812, that may be of analytic utility.

In certain embodiments, the endpoint device 204 may be used to communicate data through the use of a network 140, or a third party network 310, or a combination of the two. In certain embodiments, the network 140 and the third party network 310 may respectively include a public network, such as the Internet, a physical private network, a virtual private network (VPN), or any combination thereof. In certain embodiments, the network 140 and third party network 310 may likewise include a wireless network, including a personal area network (PAN), based upon technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G, and 5G technologies.

In certain embodiments, the user/user 1120 interactions may include interactions between two or more user entities, such as user entity 'A' 810 and 'B' 812. In certain embodiments, the user/user interactions 1120 may be physical, such as a face-to-face meeting, via a user/device 1130 interaction, a user/network 1142 interaction, a user/resource 1148 interaction, or some combination thereof. In certain embodiments, the user/user 1120 interaction may include a face-to-face verbal exchange. In certain embodiments, the user/user 1120 interaction may include a written exchange, such as text written on a sheet of paper. In certain embodiments, the user/user 1120 interaction may include a face-to-face exchange of gestures, such as a sign language exchange.

In certain embodiments, temporal event information associated with various user/device 1130, user/network 1142, user/resource 1148, or user/user 1120 interactions may be collected and used to provide real-time resolution of the identity of an entity at a particular point in time. Those of skill in the art will recognize that many such examples of user/device 1130, user/network 1142, user/resource 1148, and user/user 1120 interactions are possible. Accordingly, the foregoing is not intended to limit the spirit, scope or intent of the invention.

In various embodiments, the security analytics system 118 may be implemented to process certain contextual information in the performance of a particular security analytic operation. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 204 or edge 304 device, a physical security device 1154, a system 1156, a shared device 1158, etc.), computer instructions (e.g., a software application), or a combination thereof.

In certain embodiments, the contextual information may include location data 1136. In certain embodiments, the endpoint device 204 may be configured to receive such location data 1136, which is used as a data source for determining the user entity's location 618. In certain embodiments, the location data 1136 may include Global Positioning System (GPS) data provided by a GPS satellite 1138. In certain embodiments, the location data 1136 may include location data 1136 provided by a wireless network, such as from a cellular network tower 1140. In certain embodiments (not shown), the location data 1136 may include various Internet Protocol (IP) or other network address information assigned to the endpoint 204 or edge 304 device. In certain embodiments (also not shown), the location data 1136 may include recognizable structures or physical addresses within a digital image or video recording.

In certain embodiments, the endpoint devices 204 may include an input device (not shown), such as a keypad, magnetic card reader, token interface, biometric sensor, and so forth. In certain embodiments, such endpoint devices 204 may be directly, or indirectly, connected to a particular facility 1152, physical security device 954, system 1156, or shared device 1158. As an example, the endpoint device 204 may be directly connected to an ingress/egress system, such as an electronic lock on a door or an access gate of a parking garage. As another example, the endpoint device 204 may be indirectly connected to a physical security device 1154 through a dedicated security network (not shown).

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring individual entity behaviors, assess the corresponding risk they may represent, individually or in combination, and respond with an associated response. In certain embodiments, such responses may be based upon contextual information, described in greater detail herein, associated with a particular entity behavior.

In various embodiments, certain information associated with a user entity profile 420, likewise described in greater detail herein, may be used to perform the risk-adaptive protection operations. In certain embodiments, the user entity profile 422 may include user entity profile attributes 604, user entity behavior factors 610, user entity mindset factors 622, or a combination thereof. In these embodiments, the information associated with a user entity profile 422 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 308. In certain embodiments, the security analytics service 308 may be implemented in a cloud environment familiar to those of skill in the art. In various embodiments, the security analytics system 118 may use data stored in a repository of event 530, entity behavior catalog 540, security analytics 550, or security risk 560 data, or a combination thereof, in the performance of certain security analytics operations, described in greater detail herein. Those of skill in the art will recognize that many such embodiments are possible. Accordingly, the foregoing is not intended to limit the spirit, scope or intent of the invention.

Figure 12:
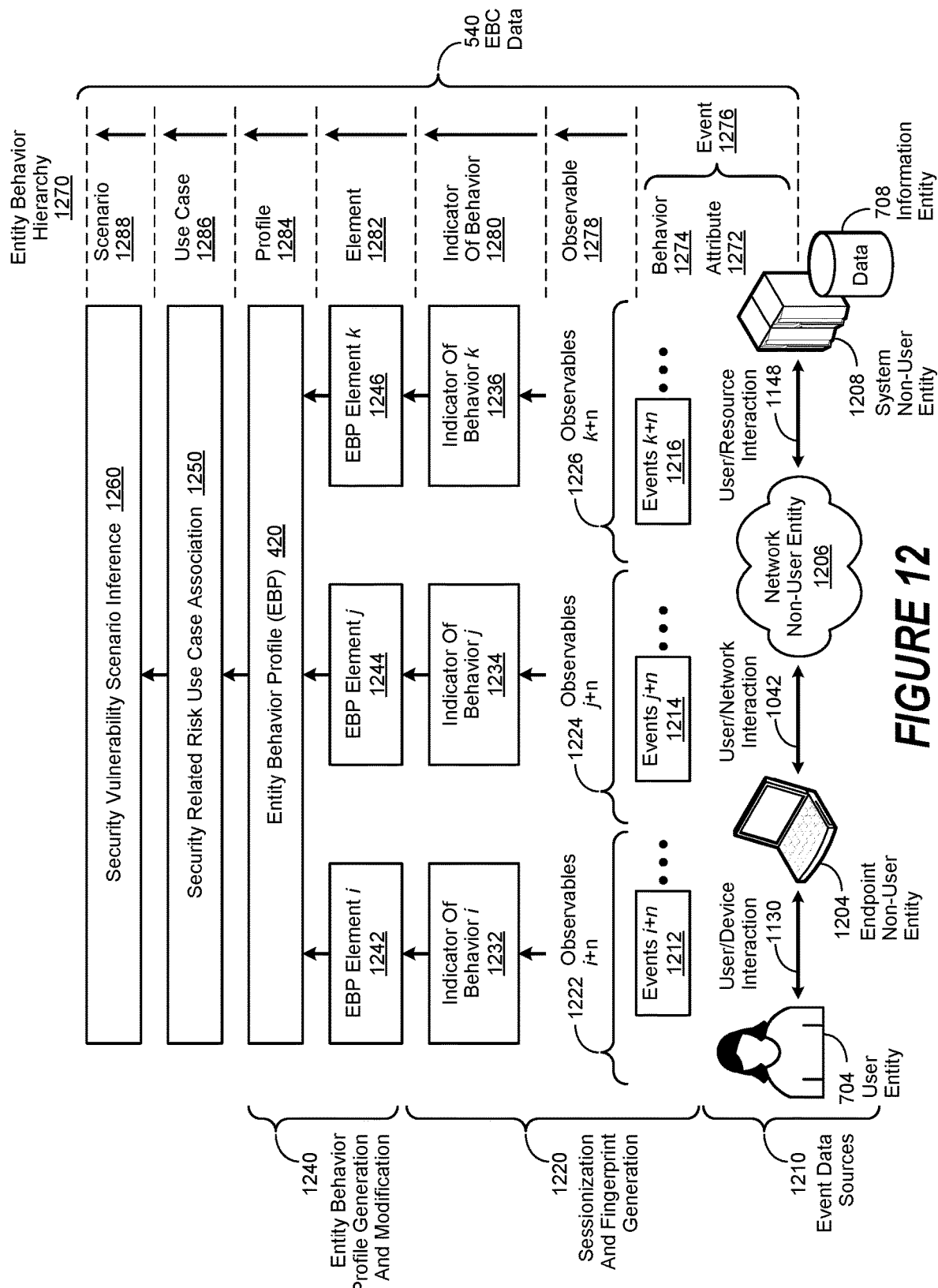
FIG. 12 is a simplified block diagram showing the mapping of an event to a security vulnerability scenario.

FIG. 12 is a simplified block diagram showing the mapping of an event to a security vulnerability scenario implemented in accordance with an embodiment of the invention. In certain embodiments, an entity behavior catalog (EBC) system may be implemented to identify an indicator of behavior (IOB), described in greater detail herein. In certain embodiments, the IOB may be based upon one or more observables, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 1210 shown in FIG. 12.

In certain embodiments, as likewise described in greater detail herein, the EBC system may be implemented to identify a particular event of analytic utility by analyzing an associated JOB. In certain embodiments, the EBC system may be implemented to generate entity behavior catalog data based upon an identified event of analytic utility associated with a particular JOB. In various embodiments, the EBC system may be implemented to associate certain entity behavior data it may generate with a predetermined abstraction level, described in greater detail herein.

In various embodiments, the EBC system 120 may be implemented to use certain EBC data and an associated abstraction level to generate a hierarchical set of entity behaviors 1270, described in greater detail herein. In certain embodiments, the hierarchical set of entity behaviors 1270 generated by the EBC system may represent an associated security risk, likewise described in greater detail herein. Likewise, as described in greater detail herein, the EBC system may be implemented in certain embodiments to store the hierarchical set of entity behaviors 1270 and associated abstraction level information within a repository of EBC data. In certain embodiments, the repository of EBC data 540 can be implemented to provide an inventory of entity behaviors for use when performing a security operation, likewise described in greater detail herein.

Referring now to FIG. 12, the EBC system may be implemented in various embodiments to receive certain event information, described in greater detail herein, corresponding to an event associated with an entity interaction, likewise described in greater detail herein. As used herein, event information broadly refers to any information directly or indirectly related to an event, described in greater detail herein.

In certain embodiments, information associated with an entity attribute, likewise described in greater detail herein, and an entity behavior may be respectively abstracted to an entity attribute 1272 and an entity behavior 1274 abstraction level. In certain embodiments, an entity attribute 1272 and an entity behavior 1274 abstraction level may then be associated with an event 1276 abstraction level. In certain embodiments, the entity attribute 1272, entity behavior 1274, and event 1276 abstraction levels may in turn be associated with a corresponding entity behavior hierarchy 1270, as described in greater detail herein.

In various embodiments, the event information may be received from certain event data sources 1210, such as a user entity 704, an endpoint 1204 non-user entity, a network 1206 non-user entity, a system 1208 non-user entity, or an information entity 708. In certain embodiments, one or more events may be associated with a particular entity interaction. As an example, as shown in FIG. 12, one or more events i+n 1212 may be associated with a user/device 1130 interaction between a user 704 entity and an endpoint 1204 non-user entity. Likewise, one or more events j+n 1214 may be associated with a user/network 1242 interaction between a user entity 704 and a network 1206 non-user entity. As likewise shown in FIG. 12, one or more events k+n 1216 may be associated with a user/resource 1148 interaction between a user entity 704 and a system 1208 non-user entity, or a data entity 708, or a combination of the two.

In certain embodiments, details of an event, such as events i+n 1212, j+n 1214, and k+n 1216, may be included in their associated event information. In various embodiments, as described in greater detail herein, analytic utility detection operations may be performed on such event information to identify events of analytic utility. In various embodiments, certain event information associated with an event determined to be of analytic utility may be used to derive a corresponding observable.

As an example, the details contained in the event information respectively corresponding to events i+n 1212, j+n 1214, and k+n 1216 may be used to derive observables i+n 1222, j+n 1224, and k+n 1226. In certain embodiments, the resulting observables i+n 1222, j+n 1224, and k+n 1226 may then be respectively associated with a corresponding observable 1278 abstraction level. In certain embodiments, the observable 1278 abstraction level may in turn be associated with a corresponding entity behavior hierarchy 1270, as described in greater detail herein.

In certain embodiments, the resulting observables may in turn be processed to generate an associated IOB. For example, observables i+n 1222, j+n 1224, and k+n 1226 may in turn be processed to generate corresponding IOBs i 1232, j 1234, and k 1236. In certain embodiments, the resulting IOBs, i 1232, j 1234, and k 1236 may then be respectively associated with a corresponding IOB 1280 abstraction level. In certain embodiments, the IOB 1280 abstraction level may in turn be associated with a corresponding entity behavior hierarchy 1270, as described in greater detail herein.

In various embodiments, sessionization and fingerprint generation operations 1220, described in greater detail herein, may be performed to associate certain events, observables, and security related activities, or a combination thereof, with a corresponding session, likewise described in greater detail herein. As an example, events i+n 1212, j+n 1214, k+n 1216, observables i+n 1222, j+n 1224, k+n 1226, and IOBs 1232, j 1234, k 1236 may be associated with corresponding sessions. In certain embodiments, an IOB may be processed with associated contextual information, described in greater detail herein, to generate a corresponding EBP element.

For example, IOBs i 1232, j 1234, and k 1236 may be processed with associated contextual information to generate corresponding EBP elements i 1242, j 1244, and k 1246. In various embodiments, the resulting EBP elements i 1242, j 1244, and k 1246 may then be associated with a corresponding EBP element 1282 abstraction level. In certain embodiments, the EBP element 1282 abstraction level may in turn be associated with a corresponding entity behavior hierarchy 1270, as described in greater detail herein.

In certain embodiments, EBP generation and management 1240 operations may be performed to associate one or more EBP elements with a particular EBP 420. As an example, EBP elements i 1242, j 1244, and k 1246 may be associated with a particular EBP 420, which may likewise be respectively associated with the various entities involved in the user/device 1130, user/network 1142, or user/resource 1148 interactions. In these embodiments, the method by which the resulting EBP elements i 1242, j 1244, and k 1246 are associated with a particular EBP 420 is a matter of design choice. In certain embodiments, the EBP 420 may likewise be associated with an EBP 1284 abstraction level. In certain embodiments, the EBP 1284 abstraction level may in turn be associated with a corresponding entity behavior hierarchy 1270, as described in greater detail herein.

In various embodiments, the resulting EBP 420 may be used in the performance of security risk use case association 1250 operations to identify one or more security risk use cases that match certain entity behavior information stored in the EBP 420. In certain of these embodiments, the entity behavior information may be stored within the EBP 420 in the form of an EBP element. In certain embodiments, identified security risk use cases may then be associated with a security risk use case 1286 abstraction level. In certain embodiments, the security risk use case 1286 abstraction level may in turn be associated with a corresponding entity behavior hierarchy 1270, as described in greater detail herein.

In certain embodiments, the results of the security risk use case association 1250 operations may in turn be used to perform security vulnerability scenario inference 1260 operations to associate one or more security risk use cases with one or more security vulnerability scenarios, described in greater detail herein. In certain embodiments, the associated security vulnerability scenarios may then be associated with a security vulnerability scenario 1288 abstraction level. In certain embodiments, the security vulnerability scenario 1288 abstraction level may in turn be associated with a corresponding entity behavior hierarchy 1270, as described in greater detail herein.

In various embodiments, certain event information associated with events i+n 1212, j+n 1214, and k+n 1216 and certain observable information associated with observables i+n 1222, j+n 1224, and k+n 1226 may be stored in a repository of EBC data. In various embodiments, certain IOB information associated with security related activities i 1232, j 1234, and k 1236 and EBP elements i 1242, j 1244, and k 1246 may likewise be stored in the repository of EBC data. Likewise, in various embodiments, certain security risk use case association and security vulnerability scenario association information respectively associated with the performance of security risk use case association 1250 and security vulnerability scenario inference 1260 operations may be stored in the repository of EBC data.

Figure 13:
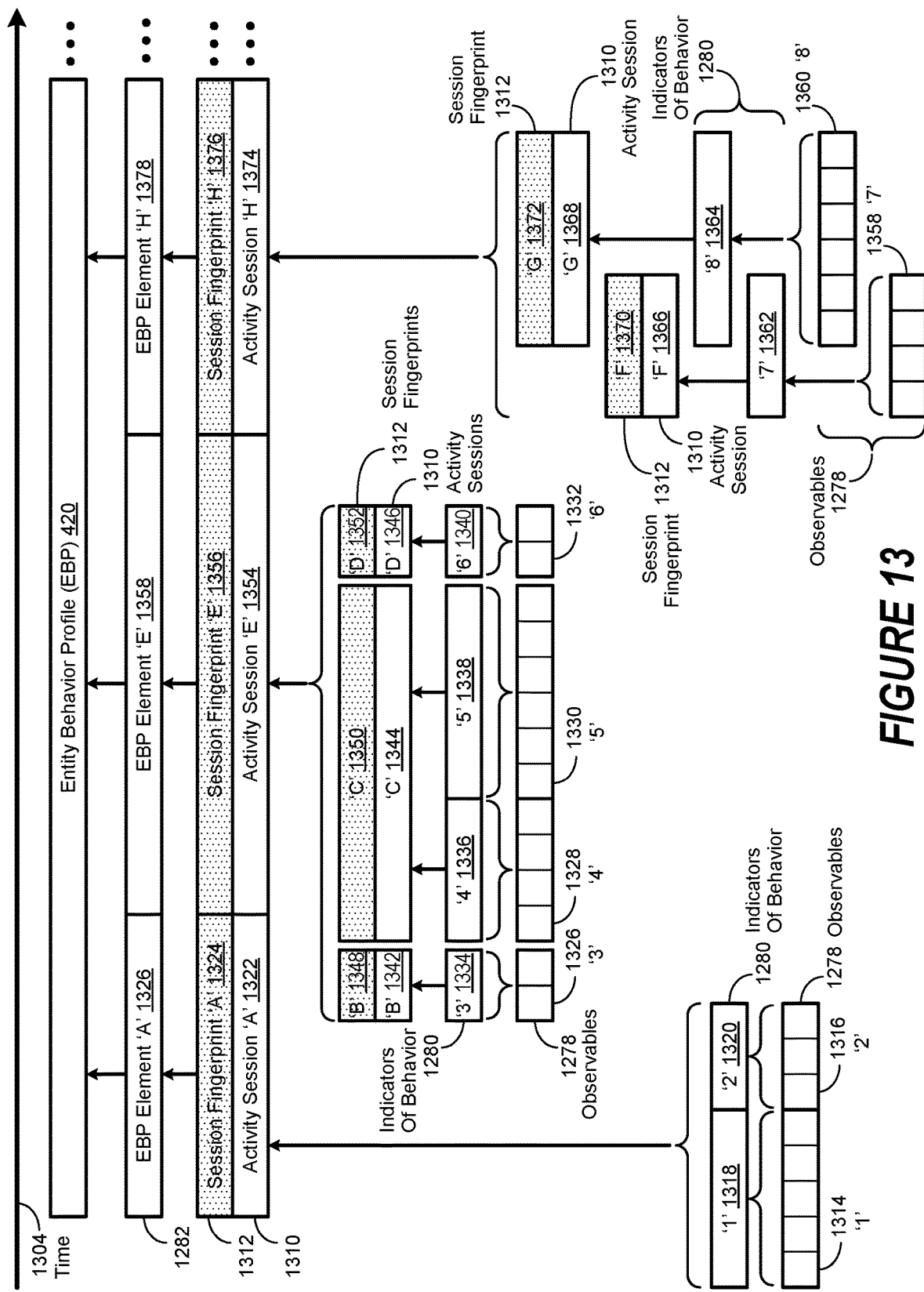
FIG. 13 is a simplified block diagram of the generation of a session and a corresponding session-based.

FIG. 13 is a simplified block diagram of the generation of a session and a corresponding session-based fingerprint implemented in accordance with an embodiment of the invention. In certain embodiments, an observable 1278 may be derived from an associated event, as described in greater detail herein. In certain embodiments, one or more observables 1278 may be processed to generate a corresponding indicator of behavior (IOB) 1280, as likewise described in greater detail herein.

In certain embodiments, one or more IOBs 1280 may then be respectively processed to generate a corresponding activity session 1310. In turn, the session 1310 may be processed in certain embodiments to generate a corresponding session fingerprint 1312. In certain embodiments, the resulting activity session 1310 and its corresponding session fingerprint 1312, individually or in combination, may then be associated with a particular entity behavior profile (EBP) element 1282. In certain embodiments the EBP element 1282 may in turn be associated with an EBP 420.

In certain embodiments, intervals in time 1304 respectively associated with various IOBs 1280 may be contiguous. For example, as shown in FIG. 13, the intervals in time 1204 associated with observables 1278 '1' 1314 and '2' 1316 may be contiguous. Accordingly, the intervals in time 1304 associated with IOBs 1280 '1' 1318 and '2' 1320 respectively generated from observables 1278 '1' 1314 and '2' 1316 would likewise be contiguous.

As likewise shown in FIG. 13, the resulting IOBs 1280 '1' 1318 and '2' 1320 may be processed to generate an associated activity session 'A' 1322, which then may be processed to generate a corresponding session fingerprint 'A' 1324. In certain embodiments, activity session 'A' 1322 and its corresponding session fingerprint 'A' 1324 may be used to generate a new entity behavior profile (EBP) element 1282 'A' 1326. In certain embodiments, EBP element 1282 'A' 1326 generated from activity session 1310 'A' 1322 and its corresponding session fingerprint 1312 'A' 1325 may be associated with an existing EBP 420.

To provide an example, a user may enact various observables 1278 '1' 1314 to update sales forecast files, followed by the enactment of various observables 1278 '2' 1316 to attach the updated sales forecast files to an email, which is then sent to various co-workers. In this example, the enactment of observables 1278 '1' 1314 and '2' 1316 result in the generation of IOBs 1280 '1' 1318 and '2' 1320, which in turn are used to generate activity session 1310 'A' 1322. In turn, the resulting activity session 1310 'A' 1322 is then used to generate its corresponding session-based fingerprint 1312 'A' 1324. To continue the example, activity session 1310 'A' 1322 is associated with security related activities 1280 '1' 1318 and '2' 1320, whose associated intervals in time 1304 are contiguous, as they are oriented to the updating and distribution of sales forecast files via email.

Various aspects of the invention reflect an appreciation that a user may enact certain entity behaviors on a recurring basis. To continue the preceding example, a user may typically update sales forecast files and distribute them to various co-workers every morning between 8:00 AM and 10:00 AM. Accordingly, the activity session 1310 associated with such a recurring activity may result in a substantively similar session fingerprint 1312 week-by-week. However, a session fingerprint 1312 for the same session 1310 may be substantively different should the user happen to send an email with an attached sales forecast file to a recipient outside of their organization. Consequently, a session fingerprint 1312 that is inconsistent with session fingerprints 1312 associated with past activity sessions 1310 may indicate anomalous, abnormal, unexpected or suspicious behavior.

In certain embodiments, two or more activity sessions 1310 may be noncontiguous, but associated. In certain embodiments, an activity session 1310 may be associated with two or more sessions 1310. In certain embodiments, an activity session 1310 may be a subset of another activity session 1310. As an example, as shown in FIG. 13, the intervals in time 1304 respectively associated with observables 1278 '3' 1314 and '6' 1332 may be contiguous. Likewise, the intervals in time 1304 associated with observables 1278 '4' 1336 and '5' 1338 may be contiguous.

Accordingly, the intervals in time 904 associated with the IOBs 1280 '4' 1336 and '5' 1338 respectively generated from observables 1278 '4' 1328 and '5' 1330 would likewise be contiguous. However, the intervals in time 1304 associated with IOBs 1280 '4' 1336 and '5' 1338 would not be contiguous with the intervals in time respectively associated with IOBs 1280 '3' 1334 and '6' 1340.

As likewise shown in FIG. 13, the resulting IOBs 1280 '3' 1334 and '6' 1340 may be respectively processed to generate corresponding sessions 'B' 1342 and 'D' 1346, while IOBs 1280 '4' 1336 and '5' 1338 may be processed to generate activity session 1310 'C' 1344. In turn, activity sessions 1310 'B' 1342, 'C' 1344, and 'D' 1346 are then respectively processed to generate corresponding session-based fingerprints 1312 'B' 1348, 'C' 1350 and 'D' 1352.

Accordingly, the intervals of time 1304 respectively associated with activity sessions 1310 'B' 1342, 'C' 1344, and 'D' 1346, and their corresponding session fingerprints 1312 'B' 1348, 'C' 1350 and 'D' 1352, are not contiguous. Furthermore, in this example activity sessions 1310 'B' 1342, 'C' 1344, and 'D' 1346, and their corresponding session fingerprints 1312 'B' 1348, 'C' 1350 and 'D' 1352, are not associated with the EBP 420. Instead, as shown in FIG. 13, activity sessions 1310 'B' 1342, 'C' 1344, and 'D' 1346 are processed to generate activity session 1310 'E' 1354 and session fingerprints 1312 'B' 1348, 'C' 1350 and 'D' 1352 are processed to generate session fingerprint 1312 'E' 1356. In certain embodiments, activity session 'E' 1354 and its corresponding session fingerprint 'E' 1356 may be used to generate a new EBP element 1282 'E' 1358. In certain embodiments, EBP element 1282 'E' 1358 generated from activity session 1310 'E' 1354 and its corresponding session fingerprint 1312 'E' 1356 may be associated with an existing EBP 420.

Accordingly, activity session 1310 'E' 1354 is associated with activity sessions 1310 'B' 1342, 'C' 1344, and 'D' 1346. Likewise, activity sessions 1310 'B' 1342, 'C' 1344, and 'D' 1346 are subsets of activity session 1310 'E' 1354. Consequently, while the intervals of time respectively associated with activity sessions 1310 'B' 1342, 'C' 1344, and 'D' 1346, and their corresponding session fingerprints 1312 'B' 1348, 'C' 1350 and 'D' 1352 may not be contiguous, they are associated as they are respectively used to generate activity session 1310 'E' 1354 and its corresponding session fingerprint 1312 'E' 1356.

To provide an example, a user plans to attend a meeting scheduled for 10:00 AM at a secure facility owned by their organization to review a project plan with associates. However, the user wishes to arrive early to prepare for the meeting. Accordingly, they arrive at 9:00 AM and use their security badge to authenticate themselves and enter the facility. In this example, the enactment of observables 1278 '3' 1326 may correspond to authenticating themselves with their security badge and gaining access to the facility. As before, observables 1278 '3' 1326 may be used to generate a corresponding IOB 1280 '3' 1334. In turn, the IOB 1280 '3' 1334 may then be used to generate session 1310 'B' 1342, which is likewise used in turn to generate a corresponding session fingerprint 1312 'B' 1348.

The user then proceeds to a conference room reserved for the meeting scheduled for 10:00 AM and uses their time alone to prepare for the upcoming meeting. Then, at 10:00 AM, the scheduled meeting begins, followed by the user downloading the current version of the project plan, which is then discussed by the user and their associate for a half hour. At the end of the discussion, the user remains in the conference room and spends the next half hour making revisions to the project plan, after which it is uploaded to a datastore for access by others.

In this example, observables 1278 '4' 1328 may be associated with the user downloading and reviewing the project plan and observables 1278 '5' 1330 may be associated with the user making revisions to the project plan and then uploading the revised project plan to a datastore. Accordingly, observables 1278 '4' 1328 and '5' 1330 may be respectively used to generate IOBs 1280 '4' 1336 and '5' 1338. In turn, IOBs 1280 '4' 1336 and '5' 1338 may then be used to generate activity session 1310 'C' 1344, which may likewise be used in turn to generate its corresponding session fingerprint 1312 'C' 1350.

To continue the example, the user may spend the next half hour discussing the revisions to the project plan with a co-worker. Thereafter, the user uses their security badge to exit the facility. In continuance of this example, observable 1278 '6' 1332 may be associated with the user using their security badge to leave the secure facility. Accordingly, observable 1278 '6' 1332 may be used to generate a corresponding IOB 1280 '6' 1340, which in turn may be used to generate a corresponding activity session 1310 'D' 1346, which likewise may be used in turn to generate a corresponding session fingerprint 1312 'D' 1352.

In this example, the intervals of time 1304 respectively associated with activity sessions 1310 'B' 1342, 'C' 1344, and 'D' 1346, and their corresponding session fingerprints 1312 'B' 1348, 'C' 1350, and 'D' 1352, are not contiguous. However they may be considered to be associated as their corresponding observables 1278 '3' 1326, '4' 1328, '5' 1330, and '6' 1332 all have the common attribute of having been enacted within the secure facility. Furthermore, security related activities 1280 '4' 1326 and '5' 1338 may be considered to be associated as their corresponding observables 1278 have the common attribute of being associated with the project plan.

Accordingly, while the intervals of time 1304 respectively associated with activity sessions 1310 'B' 1342, 'C' 1344, and 'D' 1346, and their corresponding session fingerprints 1312 'B' 1348, 'C' 1350, and 'D' 1352, may not be contiguous, they may be considered to be associated. Consequently, activity sessions 1310 'B' 1342, 'C' 1344, and 'D' 1346 may be considered to be a subset of activity session 1310 'E' 1354 and session fingerprints 1312 'B' 1348, 'C' 1350, and 'D' 1352 may be considered to be a subset of session fingerprint 1312 'E' 1356.

In certain embodiments, the interval of time 1304 corresponding to a first activity session 1310 may overlap an interval of time 1304 corresponding to a second activity session 1310. For example, observables 1278 '7' 1358 and '8' 1360 may be respectively processed to generate IOBs 1280 '7' 1362 and '8' 1364. In turn, the resulting IOBs 1280 '7' 1362 and '8' 1364 are respectively processed to generate corresponding activity sessions 1310 'F' 1366 and 'G' 1368. The resulting activity sessions 1310 'F' 1366 and 'G' 1368 are then respectively processed to generate corresponding session fingerprints 1312 'F' 1370 and 'G' 1372.

However, in this example activity sessions 1310 'F' 1366 and 'G' 1368, and their corresponding session fingerprints 1312 'F' 1370 and 'G' 1372, are not associated with the EBP 420. Instead, as shown in FIG. 13, activity sessions 1310 'F' 1366 and 'G' 1368 are processed to generate activity session 1310 'E' 1354 and session fingerprints 1312 'F' 1370 and 'G' 1372 are processed to generate session fingerprint 1312 'H' 1376. In certain embodiments, activity session 'H' 1374 and its corresponding session fingerprint 'H' 1376 may be used to generate a new EBP element 1282 'H' 1378. In certain embodiments, EBP element 1282 'H' 1378 generated from activity session 1310 'E' 1374 and its corresponding session fingerprint 1312 'E' 1376 may be associated with an existing EBP 420.

Accordingly, the time 1304 interval associated with activity session 1310 'F' 1366 and its corresponding session fingerprint 1312 'F' 1370 overlaps with the time interval 1304 associated with activity session 1310 'G' 1368 and its corresponding session fingerprint 1312 'G' 1372. As a result, activity sessions 1310 'F' 1366 and 'G' 1368 are subsets of activity session 1310 'H' 1374. Consequently, while the intervals of time respectively associated with activity sessions 1310 'F' 1366 and 'G' 1368, and their corresponding session fingerprints 1312 'F' 1370 and 'G' 1372 may overlap, they are associated as they are respectively used to generate activity session 1310 'H' 1374 and its corresponding session fingerprint 1312 'H' 1376.

To provide an example, a user may decide to download various images for placement in an online publication. In this example, observables 1278 '7' 1358 may be associated with the user iteratively searching for, and downloading, the images they wish to use in the online publication. However, the user may not begin placing the images into the online publication until they have selected and downloaded the first few images they wish to use.

To continue the example, observables 1278 '8' 1364 may be associated with the user placing the downloaded images in the online publication. Furthermore, the placement of the downloaded images into the online publication may begin a point in time 1304 subsequent to when the user began to download the images. Moreover, the downloading of the images may end at a point in time 1304 sooner than when the user completes the placement of the images in the online publication.

In continuance of the example, observables 1278 '7' 1358 and '8' 1360 may be respectively processed to generate IOBs 1280 '7' 1362 and '8' 1364, whose associated intervals of time 1304 overlap one another. Accordingly, the intervals in time 1304 associated with activity sessions 1310 'F' 1366 and 'G' 1368 will likewise overlap one another as they are respectively generated from IOBs 1280 '7' 1362 and '8' 1364.

Consequently, while the intervals of time 1304 respectively associated with activity sessions 1310 'F' 1366 and 'G' 1368, and their corresponding session fingerprints 1312 'F' 1370 and 'G' 1372, may overlap, they may be considered to be associated as they both relate to the use of images for the online publication. Accordingly, activity sessions 1310 'F' 1366 and 'G' 1368 may be considered to be a subset of activity session 1310 'H' 1374 and session fingerprints 1312 'F' 1370 and 'G' 1372 may be considered to be a subset of session fingerprint 1312 'H' 1276.

Figure 14:
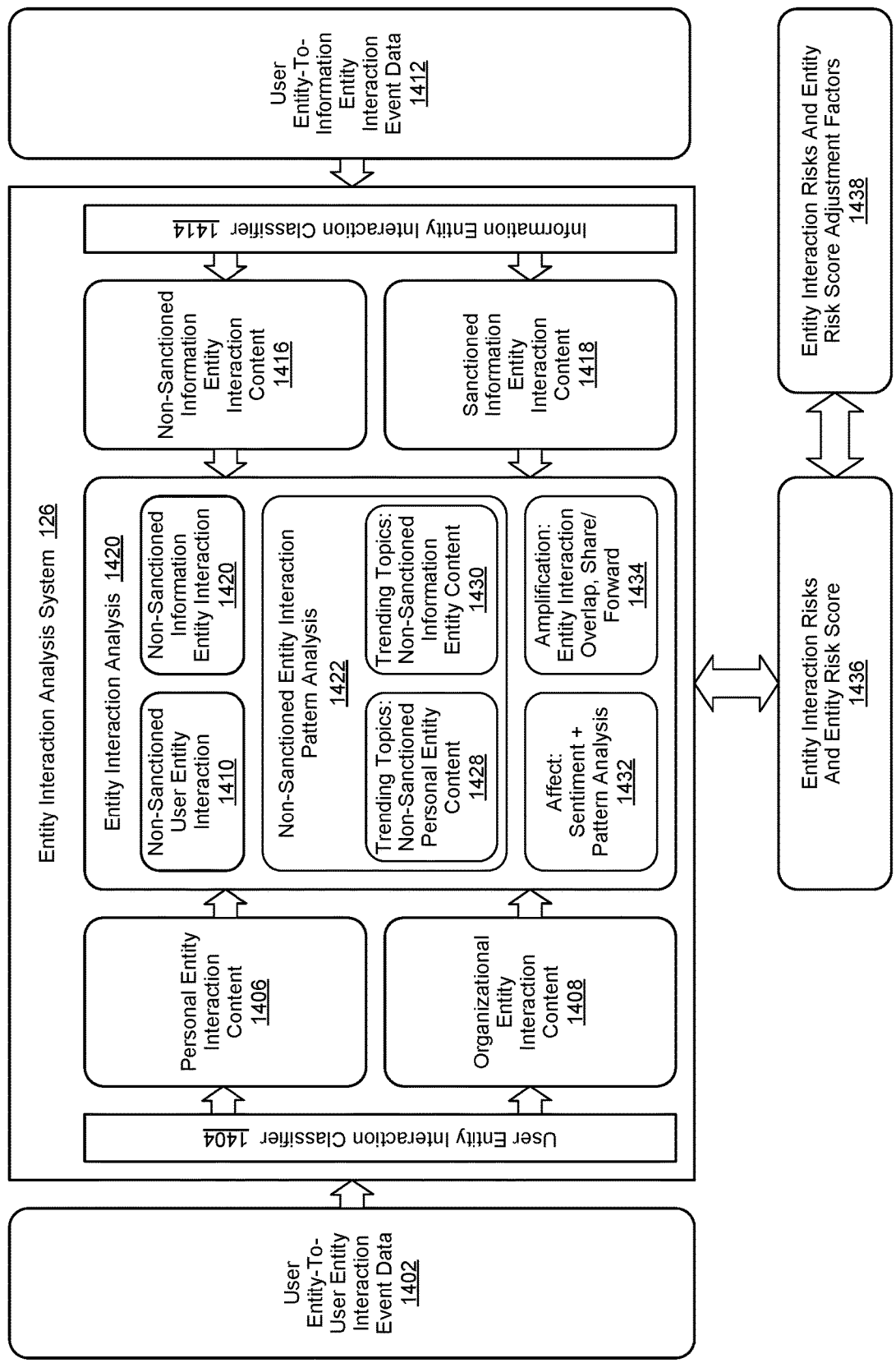
FIG. 14 is a simplified block diagram of the performance of an entity interaction risk analysis operation.

FIG. 14 is a simplified block diagram of the performance of an entity interaction risk analysis operation implemented in accordance with an embodiment of the invention. In certain embodiments, an entity interaction analysis system 126 may be implemented to include a user entity interaction classifier 1404 module, or an information entity interaction classifier 1414 module, or both. In various embodiments, certain event data 1402, described in greater detail herein, associated with a particular user entity-to-user entity interaction, likewise described in greater detail herein, may be received by the entity interaction analysis system 126.

In various embodiments, the user entity interaction classifier 1404 module may be implemented to perform a user entity interaction classifier operation. As used herein, a user entity interaction classifier operation broadly refers to any operation that may be used to classify a particular user entity-to-user entity interaction as either an organizational entity interaction, or a personal entity interaction, both of which are described in greater detail herein. In various embodiments, the user entity interaction classifier 1404 module may be implemented to process certain content, such as the text of an email message, associated with a particular user entity-to-user entity interaction to determine whether it is personal entity interaction content 1406 or organizational entity interaction content 1408.

As an example, a particular user entity may enact a user entity-to-user entity interaction by sending a text message to another user entity, who is a personal friend. In this example, neither user entity is associated with the same organization. Accordingly, once processed by the user entity interaction classifier 1404, the text message would be determined to contain personal entity interaction content 1406. As another example, a particular user entity may enact a user entity-to-user entity interaction by sending an email message to another user entity, who is a co-worker. In this example, both user entities are associated with the same organization. Accordingly, once processed by the entity interaction classifier 1404, the email message would be determined to contain organizational entity interaction content 1408.

In various embodiments, a user entity interaction classifier operation may be implemented to include a grammatical analysis operation. As used herein, a grammatical analysis operation broadly refers to any operation performed to identify one or more grammar characteristics associated with certain personal entity interaction content 1406 associated with a user entity-to-user entity interaction enacted by a particular user entity. Skilled practitioners of the art will be familiar with grammar characteristics, which generally relate to usage of the various parts of speech (e.g., verbs, nouns, pronouns, adjectives, adverbs, prepositions, conjunctions, and interventions), diction, which is the proper use of words, style, which includes sentence structure and spelling, and proper punctuation.

In various embodiments, a user entity interaction classifier operation may be implemented to include a phrase analysis operation. As used herein, a phrase analysis operation broadly refers to any operation performed to identify certain phrases and acronyms commonly used in an organization in furtherance of, or relating to, one or more of its objectives. In various embodiments, a user entity interaction classifier operation may be implemented to generate a classification score for one or more components of the personal entity interaction content 1406 it classifies.

In certain embodiments, the user entity interaction classifier operation may be implemented to use the one or more classification scores to determine whether they exceed a predetermined threshold value. In certain embodiments, the user entity interaction classifier operation may be implemented to use the threshold value to classify a particular user entity-to-user entity interaction as a personal entity interaction or an organizational entity interaction.

For example, the threshold value in the following user entity interaction classifier code is set to a value of '5':

```
{
    "bad_grammar_to_token_ratio": 0.4,
    "indicators": {
        "all_caps_chat": 3,
        "all_caps_email": 3,
        "bad_grammar_chat": 2,
        "bad_grammar_email": 2,
        "emoji_use_chat": 3,
        "emoji_use_email": 3,
        "phrase_presence_chat": -3,
        "phrase_presence_email": -5,
        "profanity_use_chat": 13,
        "profanity_use_email": 13,
        "sender_receiver_ratio_chat": 5,
        "sender_receiver_ratio_email": 0
    },
    "professional_phrases": [
        "FYSA",
        "FYI",
        "Action Required",
        "Please respond",
        "Meeting Invitation",
        "Update needed"
    ],
    "threshold": 5
}
```

In certain embodiments, the classification scores for various components of the personal entity interaction content 1406 a user entity interaction classifier operation classifies, and the threshold metric, may be changed, as shown in the following entity interaction classifier code:

```
{
    "bad_grammar_to_token_ratio": 0.99,
    "indicators": {
        "all_caps_chat": -3,
        "all_caps_email": -3,
        "bad_grammar_chat": 2,
        "bad_grammar_email": 2,
        "emoji_use_chat": -3,
        "emoji_use_email": -3,
        "phrase_presence_chat": -3,
        "phrase_presence_email": -5,
        "profanity_use_chat": 21,
        "profanity_use_email": 21,
        "sender_receiver_ratio_chat": 5,
        "sender_ receiver_ratio_email": 0
    },
    "professional_phrases": [
        "Action Required",
        "Please respond",
        "Meeting Invitation",
        "Update needed"
    ],
    "threshold": 8
}
```

As another example, the entity interaction classifier code shown below may be implemented to detect certain entity interaction content components, and their associated classification score, and use a corresponding threshold value to determine whether the user entity-to-user entity interaction is a personal entity interaction or an organizational entity interaction:

```
{
    "indicators": [
        "Profanity",
        "Emoji",
        "ALL CAPS - not an acronym",
        "Professional Phrase"
    ],
    "payload": "FYI Clueless jerks your time has COME🔫 _ !",
    "prediction": "personal",
    "threshold": 5,
    "weight": 16
}
```

As yet another example, the entity interaction classifier code shown below may be implemented to detect certain entity interaction content components that examples of bad grammar and spelling, and their associated classification score, and use a corresponding threshold value to determine whether the user entity-to-user entity interaction is a personal entity interaction or an organizational entity interaction:

```
{
    "indicators": [
        "High Grammar-Spelling Error Rate"
    ],
    "payload": "I can haz cheezburger",
    "prediction": "not personal",
    "threshold": 5,
    "weight": 2
{
```

In this example, some bad grammar was detected, but not enough to exceed the threshold value:

```
{
    "indicators": [ ],
    "payload": "That medicine effects my ability to sleep. Have you heard of the butterfly affect?",
    "prediction": "not personal".
    "threshold": 5,
    "weight": 0
}
```

As yet still another example, the entity interaction classifier code shown below may be implemented to detect certain entity interaction content components stored in RIM format, and their associated classification score, and use a corresponding threshold value to determine whether the user entity-to-user entity interaction is a personal entity interaction or an organizational entity interaction:

```
{
    "type": "chat",
    "timestamp": "2017-08-02T09:01:53.365040",
    "entities": [
        {
            "role": "sender",
            "entities": [
                "Emarshall"
            ]
        },
        {
            "role": "recipient",
            "entities": [
                "Chat-8817761"
            ]
        }
    ],
    "attributes": [
        [
            {
                "type": "boolean",
                "name": "Personal Communication Detected",
                "value": "True"
            },
            {
                "type": "double",
                "name": "Personal Communication Weight",
                "value": 7
            },
            {
                "type": "double",
                "name": "Personal Communication Threshold",
                "value": 5
            },
            {
                "type": "string",
                "name": "Personal Communication Indicators",
                "value": "High Grammar-Spelling Error Rate,
                1-1 Communications"
            }
        ]
    ],
    "content": "ha okay grumpy. gotta run",
    "subject": "chat-8817761"
}
```

In various embodiments, certain event data 1412 associated with a particular user entity-to-information entity interaction, described in greater detail herein, may be received by the entity interaction analysis system 126. In various embodiments, the information entity interaction classifier 1414 module may be implemented to perform an information entity interaction classifier operation. As used herein, an information entity interaction classifier operation broadly refers to any operation that may be used to classify a particular user entity-to-information entity interaction as either a sanctioned information entity interaction, or a non-sanctioned information entity interaction.

As likewise used herein, a sanctioned information entity interaction broadly refers to a user entity-to-information entity interaction between a particular user entity and an information entity sanctioned by an organization with which the user entity is associated. Conversely, as used herein, a non-sanctioned information entity interaction broadly refers to a user entity-to-information entity interaction between a particular user entity and an information entity not sanctioned by an organization with which the user entity is associated. In various embodiments, the information entity interaction classifier 1404 module may be implemented to process certain content, such as the text of a web page, or portion thereof, associated with a particular user entity-to-information entity interaction, to determine whether it contains non-sanctioned information entity interaction content 1416 or sanctioned information entity interaction content 1418.

As an example, a particular user entity may enact a user entity-to-information entity interaction by posting an inflammatory message to a social media site that promotes unsubstantiated conspiracy theories. In this example, the social media site is not sanctioned by the user entity's associated organization. Accordingly, once processed by the information entity interaction classifier 1414, the social media posting would be determined to contain non-sanctioned information entity interaction content 1416.

As another example, a particular user entity, who is a corporate employee, may enact a user entity-to-information entity interaction by accessing a marketing database to download economic growth projection information. In this example, the marketing database site is an information entity sanctioned by the user entity's corporation for providing accurate market and economic information. Accordingly, once processed by the information entity interaction classifier 1414, the downloaded economic growth projection information would be determined to contain sanctioned information entity interaction content 1418.

In certain embodiments, the information interaction classifier 141 may be implemented to use a third party information entity rating service, or a list of organization-specific list of information entities, or both, to perform an information entity interaction classifier operation. One such example of a third party information entity rating service is the Global Disinformation Index (GDI), which assesses the level of disinformation provided by certain websites and assigns a corresponding rating. Another example of a third party information entity rating service is Ad Fontes Media® that produces a Media Bias Chart®, which graphically positions various media information sources according to their respective accuracy and political alignment. In certain embodiments, an organization may decide to generate their own list of information entities whose content is sanctioned 1418 by the organization for use in an entity user-to-information, and those whose content is non-sanctioned 1416.

In various embodiments, the entity interaction analysis system 126 may be implemented to perform certain entity interaction analyses 1420 related to a particular user entity's user entity-to-user entity interactions and user entity-to-information entity interactions. In various embodiments, an entity interaction analysis 1420 may be performed by processing certain user entity-to user entity interaction event data 1402, and associated personal entity interaction content 1406, to determine which of a particular user entity's user entity-to-user entity interactions are non-sanctioned 1410. In certain of these embodiments, the entity interaction analysis 1420 may likewise be performed to identify a user entity's close relationship with other user entities, peer groups of user entities, described in greater detail herein, the frequency and duration of their interactions, and the content they typically share, or a combination thereof. In various embodiments, an entity interaction analysis 1420 may be performed by processing certain user entity-to information entity interaction event data 1412, and associated non-sanctioned information entity interaction content 1416, to determine which of a particular user entity's information entity-to-user entity interactions are non-sanctioned 1420. In certain of these embodiments, the entity interaction analysis 1420 may likewise be performed to identify a user entity's interactions with particular information entities, the frequency and duration of their interactions, and the content they typically interact with, or a combination thereof.

In various embodiments, the entity interaction analyses 1420 may include one or more pattern analyses 1422 of certain non-sanctioned entity interactions. In various embodiments, the pattern analyses 1422 of certain non-sanctioned entity interactions may include the identification of trending topics, and the top terms they contain, in non-sanctioned personal entity interaction content 1428 associated with a particular user entity. In various embodiments, the pattern analyses 1422 of certain non-sanctioned entity interactions may include the identification of trending topics, and the top terms they contain, in non-sanctioned information entity interaction content 1430 associated with a particular user entity.

In various embodiments, the entity interaction analyses 1420 may include one or more pattern analyses of the affect of certain non-sanctioned entity interactions associated with a particular user entity. As used herein, as it relates to a user entity-to-user entity interaction, affect broadly refers to an attitude or emotion expressed by a user entity enacting a particular user entity-to-user entity interaction. In certain embodiments, the affect associated with a particular user entity-to-user entity interaction may be determined by combining the sentiment expressed by the user entity when enacting one or more user entity-to-user entity interactions and the pattern analysis of their associated trending topics. As used herein, as it relates to affect, sentiment broadly refers to the strength of the feeling a user entity may have about a particular topic.

In various embodiments, the entity interaction analyses 1420 may include one or more pattern analyses of the amplification of certain non-sanctioned entity interactions associated with a particular user entity. As used herein, as it relates to an entity interaction, amplification broadly refers to an amplifying effect of a particular topic in the content associated with a particular non-sanctioned entity interaction when it has previously been identified as a trending topic in other non-sanctioned entity interactions. In certain embodiments, the amplification of a particular topic may occur as a result of overlapping user entity-to-user entity interactions. As an example, the same topic may occur in the content associated with two or more user entity-to-user entity interactions, such as email messages, even when other content respectively associated with each such interaction may relate to other topics as well. In certain embodiments, the amplification of a particular topic may occur as a result of sharing or forwarding a particular user entity-to-user entity interaction, such as a text or email message, to other user entities.

In various embodiments, the results of the previously-performed entity interaction analyses 1420 may be used to determine the risks associated with a particular entity interaction and generate an associated entity risk score 1436. In these embodiments, the method by which the risks associated with a particular entity interaction are determined, and the method by which an associated entity risk score is generated, is a matter of design choice. In various embodiments, certain factors 1438 may be used to adjust the risks associated with a particular entity interaction and its associated entity risk score 1436. In certain of these embodiments, the factors 1438 may include information obtained from a third party source, such as the Open Source Intelligence Framework®. Those of skill in the art will recognize many such embodiments and examples are possible. Accordingly, the foregoing is not intended to limit the spirit, scope, or intent of the invention.

FIGS. 15a through 15d are a simplified block diagram showing reference architecture components of an entity behavior catalog (EBC) system implemented in accordance with an embodiment of the invention for performing certain EBC operations. In various embodiments, the EBC system 120 may be implemented to generate, manage, store, or some combination thereof, information related to the behavior of an associated entity. In certain embodiments, the EBC system 120 may be implemented to provide an inventory of entity behaviors for use when performing a security operation, described in greater detail herein.

In certain embodiments, an EBC system 120 may be implemented to identify an indicator of behavior (IOB), described in greater detail herein. In certain embodiments, the IOB may be based upon an observable, likewise described in greater detail herein. In certain embodiments, the observable may include event information corresponding to electronically-observable behavior enacted by an entity. In certain embodiments, the event information corresponding to electronically-observable behavior enacted by an entity may be received from an electronic data source, such as the event data sources 1210 shown in FIGS. 12, 15c, and 15d.

In certain embodiments, as likewise described in greater detail herein, the EBC system 120 may be implemented to identify a particular event of analytic utility by analyzing an observable 1278 associated with a particular indicator of behavior (IOB) 1280, described in greater detail herein. In certain embodiments, the EBC system 120 may be implemented to generate entity behavior catalog data based upon an identified event of analytic utility. In certain embodiments, an observable 1278 may be derived, as described in greater detail herein, from an identified event of analytic utility. In various embodiments, the EBC system 120 may be implemented to associate certain entity behavior data it may generate with a predetermined abstraction level, described in greater detail herein.

In various embodiments, the EBC system 120 may be implemented to use certain entity behavior catalog data, and an associated abstraction level, to generate a hierarchical set of entity behaviors, described in greater detail herein. In certain embodiments, the hierarchical set of entity behaviors generated by the EBC system 120 may represent an associated security risk, likewise described in greater detail herein. Likewise, as described in greater detail herein, the EBC system 120 may be implemented in certain embodiments to store the hierarchical set of entity behaviors within a repository of EBC data.

In various embodiments, the EBC system 120 may be implemented to receive certain event information, described in greater detail herein, corresponding to an event associated with an entity interaction, likewise described in greater detail herein. In various embodiments, the event information may be generated by, received from, or a combination thereof, certain event data sources 1210. In certain embodiments, such event data sources 1210 may include endpoint devices 204, edge devices 304, identity and access 1504 systems familiar to those of skill in the art, as well as various software and data security 1506 applications. In various embodiments, event data sources 1210 may likewise include output from certain processes 1508, network 1510 access and traffic logs, domain 1512 registrations and associated entities, certain resources 1150, described in greater detail herein, event logs 1514 of all kinds, email 1515, text 1516, and videoconferencing 1517 platforms, websites 1519, social media platforms 1521, search engines 1523, and so forth.

In certain embodiments, EBC system 120 operations are begun with the receipt of information associated with a particular event. In certain embodiments, information associated with the event may include user entity profile attributes, user behavior factors, user entity mindset factors, entity state information, and contextual information, described in greater detail herein, or a combination thereof. In various embodiments, the event may be associated with certain entity interactions, likewise described in greater detail herein. In various embodiments, certain user entity profile data, user entity mindset profile data, non-user entity profile data, entity state data, contextual information, and temporal information stored in the repository of EBC data may be retrieved and then used to perform event enrichment operations to enrich and contextualize the information associated with the event.

Figure 15A:
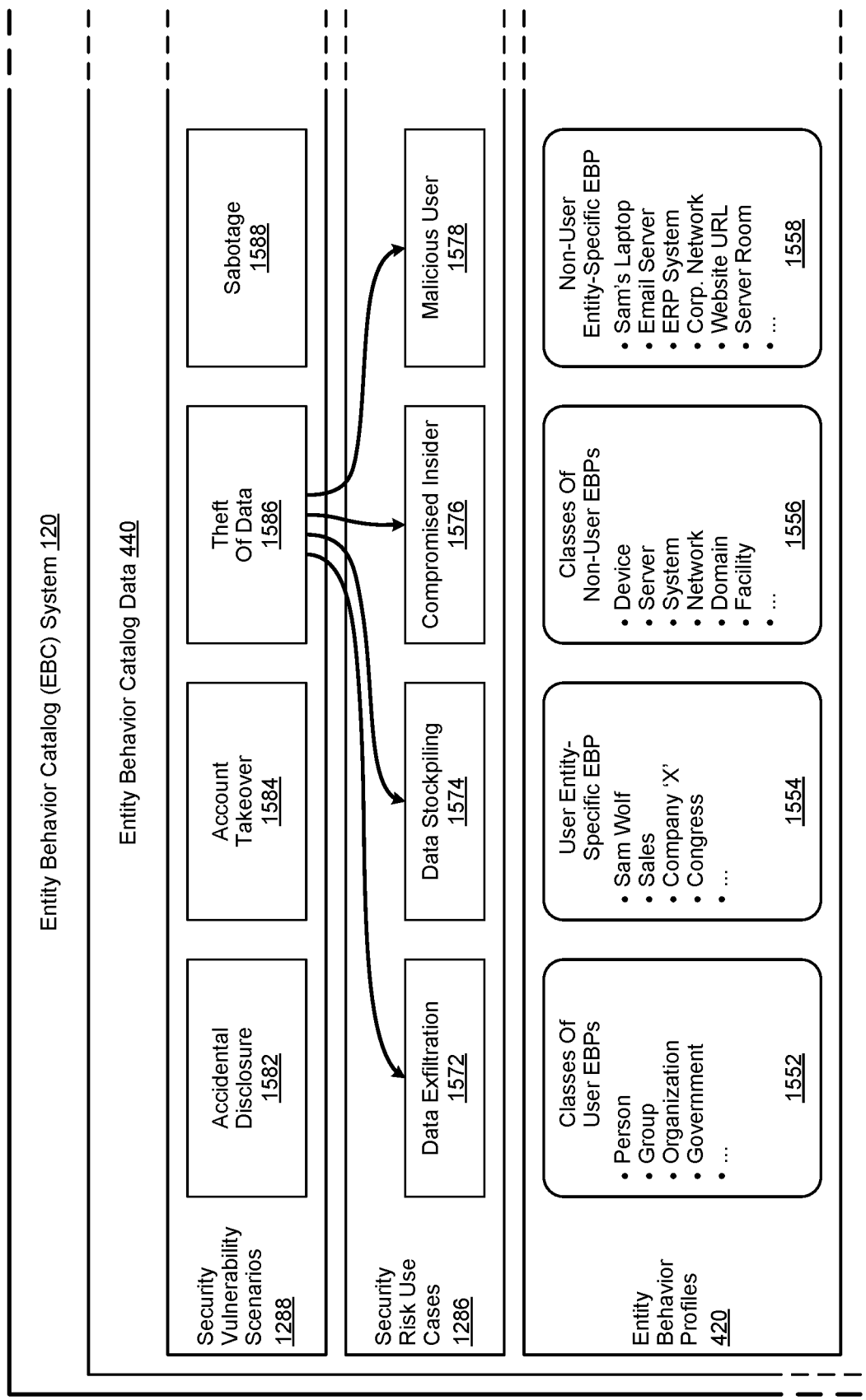
FIGS. 15a through 15d are a simplified block diagram showing reference architecture components of an entity behavior catalog (EBC) system implemented to perform certain EBC operations.
Figure 15B:
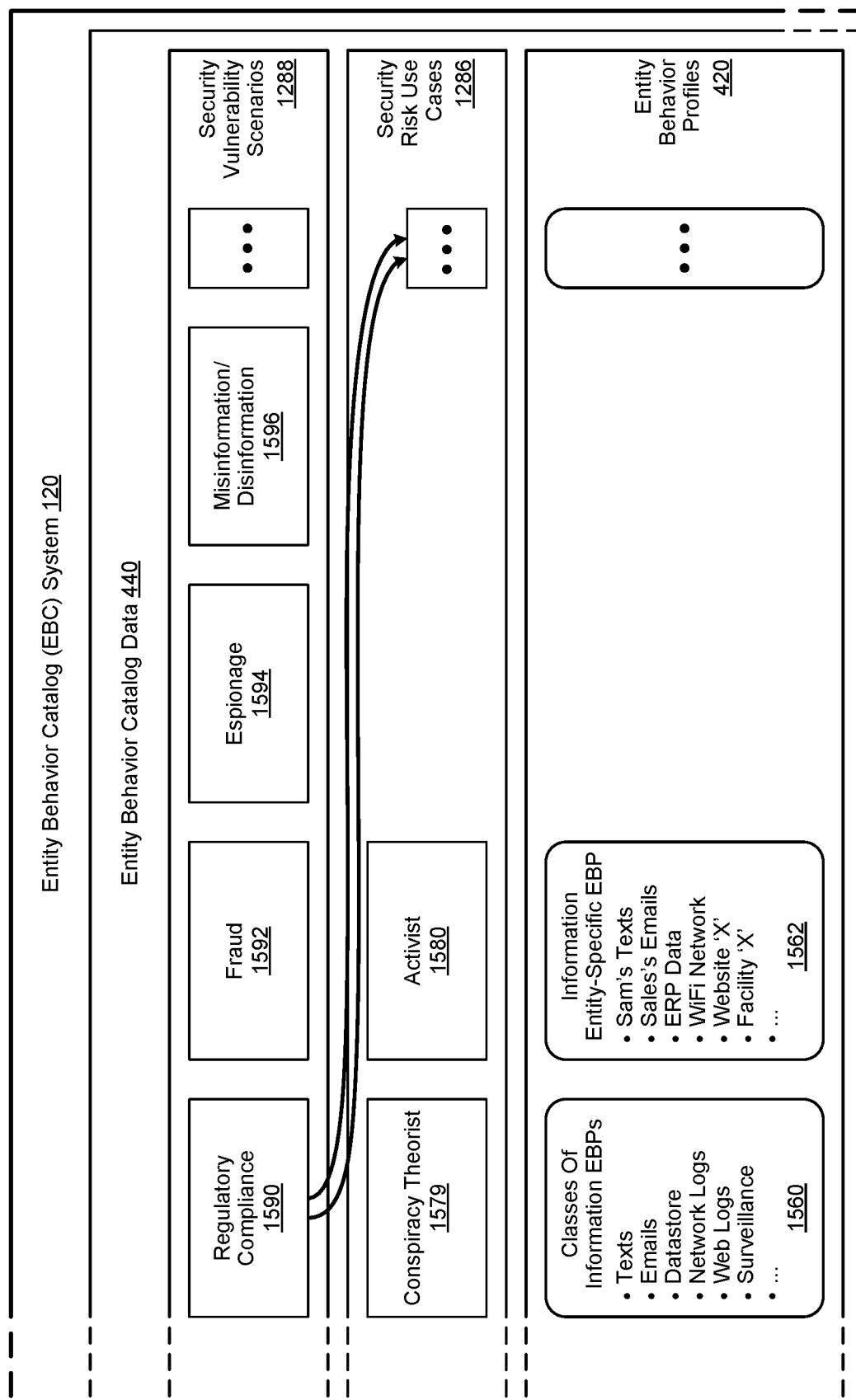
Figure 15C:
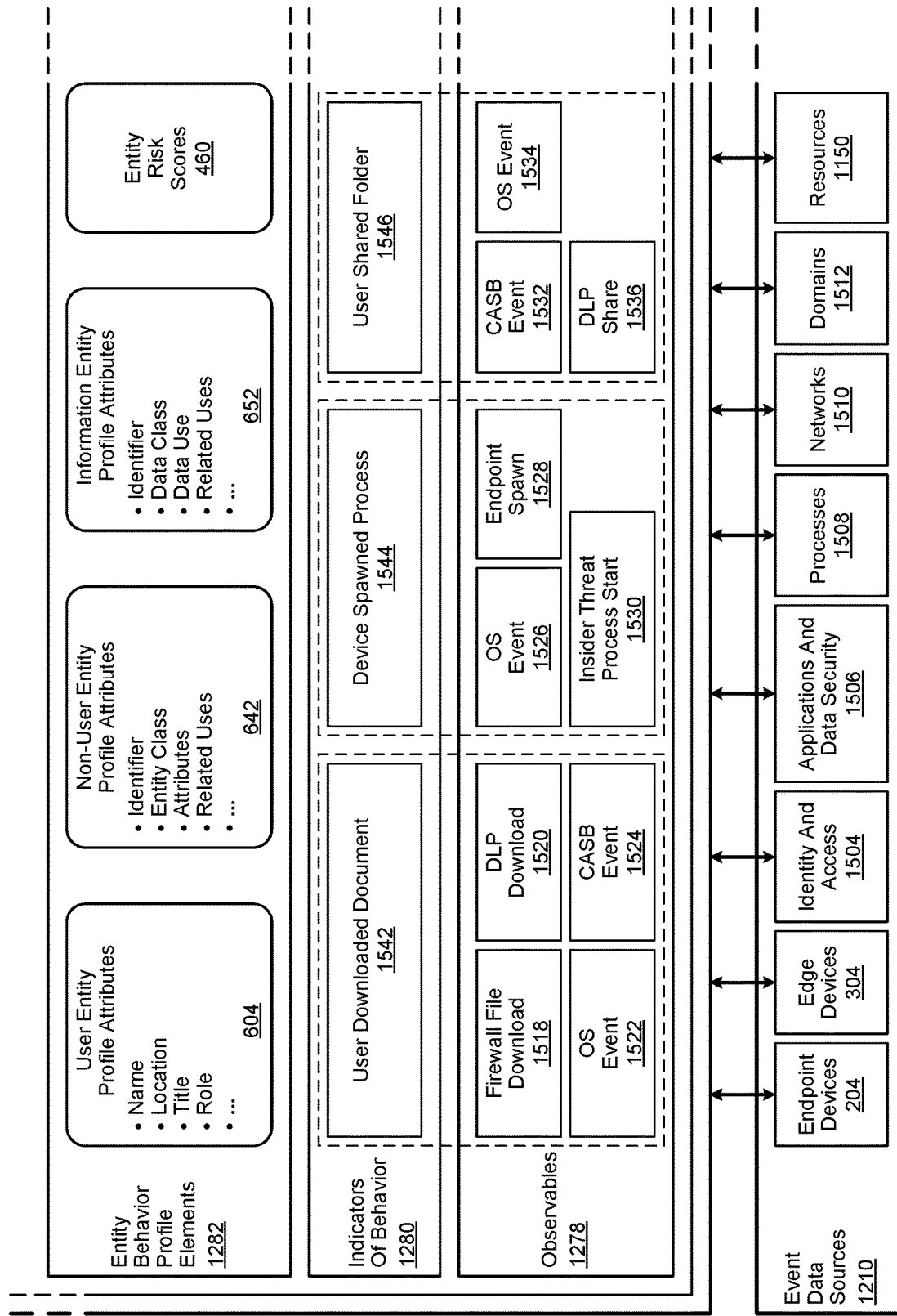
Figure 15D:
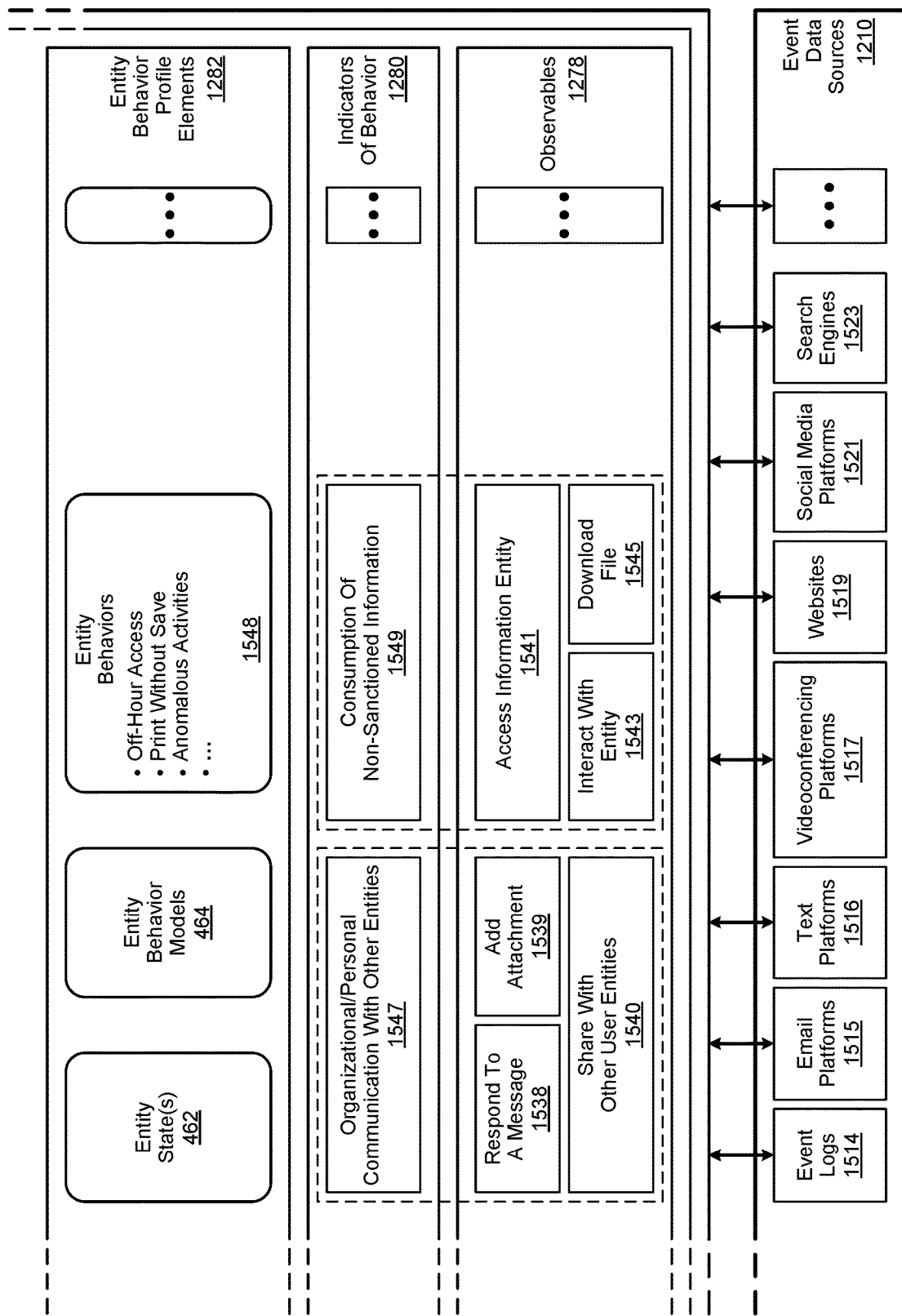

In various embodiments, an observable 1278, described in greater detail herein, may be derived from the resulting enriched, contextualized event. As shown in FIG. 15b, examples of such observables 1278 may include firewall file download 1518, data loss protection (DLP) download 1520, and various operating system (OS) events 1522, 1526, and 1534. As likewise shown in FIG. 15b, other examples of such observables 1278 may include cloud access security broker (CASB) events 1524 and 1532, endpoint spawn 1528, insider threat process start 1530, DLP share 1536, responding to a text or email message 1538, adding an attachment to the message 1539, and then sharing it with others 1540, accessing an information entity 1541, interacting with it 1543, downloading a file from it 1545, and so forth. In certain embodiments, the resulting observables 1278 may in turn be respectively associated with a corresponding observable abstraction level, described in greater detail herein.

In certain embodiments, IOB abstraction operations, described in greater detail herein, may be performed on the resulting observables 1278 to generate a corresponding IOB 1280. In various embodiments, an IOB 1280 may be expressed in a Subject Action Object format and associated with observables 1278 resulting from event information received from certain event data sources 1210. In certain embodiments, an IOB abstraction operation may be performed to abstract away event data source-specific knowledge and details when expressing an entity behavior. For example, rather than providing the details associated with a "Windows:4624" non-user entity event, the IOB 1280 may be abstracted to a "User Login To Device" OS event 1522, 1526, 1534.

As shown in FIG. 15b, examples of IOBs 1280 may include "user downloaded document" 1522, "device spawned process" 1544, "user shared folder" 1546, and so forth. To provide other examples, the IOB 1280 "user downloaded document" 1522 may be associated with observables 1278 firewall file download 1518, DLP download 1520, OS event 1222, and CASB event 1524. Likewise, the IOB 1280 "device spawned process" 1544, may be associated with observables 1278, OS event 1526, endpoint spawn 1528, and insider threat process start 1530. The IOB 1280 "user shared folder" 1546 may likewise be associated with observables 1278 CASB event 1532, OS event 1534, and DLP share 1536.

In certain embodiments, IOBs 1280 may in turn be respectively associated with a corresponding IOB abstraction level, described in greater detail herein. In various embodiments, activity sessionization operations, likewise described in greater detail herein, may be performed to respectively associate certain events and IOBs 1280 with corresponding activity sessions, likewise described in greater detail herein. Likewise, as described in greater detail herein, the resulting session information may be used in various embodiments to associate certain events of analytic utility, or their corresponding observables 1278, or their corresponding IOBs 1280, or a combination thereof, with a particular activity session.

In certain embodiments, the resulting IOBs 1280 may be processed to generate an associated EBP element 1282, as described in greater detail herein. In various embodiments, the EBP element 1282 may include user entity profile attribute 604, non-user entity profile attribute 634, information entity profile attribute 644, entity risk score 540, entity state 462, entity model 544, entity behavior 1548 information, and so forth. In certain of these embodiments, the actual information included in a particular EBP element 1282, the method by which it is selected, and the method by which it is associated with the EBP element 1282, is a matter of design choice. In certain embodiments, the EBP elements 1282 may in turn be respectively associated with a corresponding EBP element abstraction level, described in greater detail herein.

In various embodiments, certain EBP elements 1282 may in turn be associated with a particular EBP 420. In certain embodiments, the EBP 420 may be implemented as a class of user entity 1552 EBPs, an user entity-specific 1554 EBP, a class of non-user entity 1556 EBPs, a non-user entity-specific 1558 EBP, a class of information entity EBPs 1560, an information entity-specific 1562 EBP, and so forth. In various embodiments, certain entity data associated with EBP elements 1282 associated with the classes of user entity 1552, non-user entity 1556, and information entity 1560 EBPs may be anonymized. In certain embodiments, the EBP 420 may in turn be associated with an EBP abstraction level, described in greater detail herein.

In certain embodiments, security risk use case association operations may be performed to associate an EBP 420 with a particular security risk use case 1286. As shown in FIG. 15*a*, examples of such security risk use cases 1286 include "data exfiltration" 1572, "data stockpiling" 1574, "compromised insider" 1576, "malicious user" 1578, "conspiracy theorist" 1579, "activist" 1580, and so forth. In certain embodiments, identified security risk use cases 1286 may in turn be associated with a security risk use case abstraction level, described in greater detail herein.

In certain embodiments, the results of the security risk use case association operations may be used to perform security vulnerability scenario association inference operations to associate one or more security risk use cases 1286 to one or more security vulnerability scenarios 1288, described in greater detail herein. As shown in FIG. 15*a*, examples of security vulnerability scenarios 1288 include "accidental disclosure" 1582, "account takeover" 1584, "theft of data" 1586, "sabotage" 1588, "regulatory compliance" 1590, "fraud" 1592, "espionage" 1594, "receipt of misinformation and disinformation" 1596, and so forth. To continue the example, the "theft of data" 1586 security vulnerability scenario inference may be associated with the "data exfiltration" 1572, "data stockpiling" 1574, "compromised insider" 1576, "malicious user" 1578 security risk use cases 1286. Likewise the "sabotage" 1588 and "fraud" 1592 security vulnerability scenarios 1288 may be respectively associated with some other security risk case 1286. In certain embodiments, the associated security vulnerability scenarios may in turn be associated with a security vulnerability scenario abstraction level, described in greater detail herein.

Figure 16:
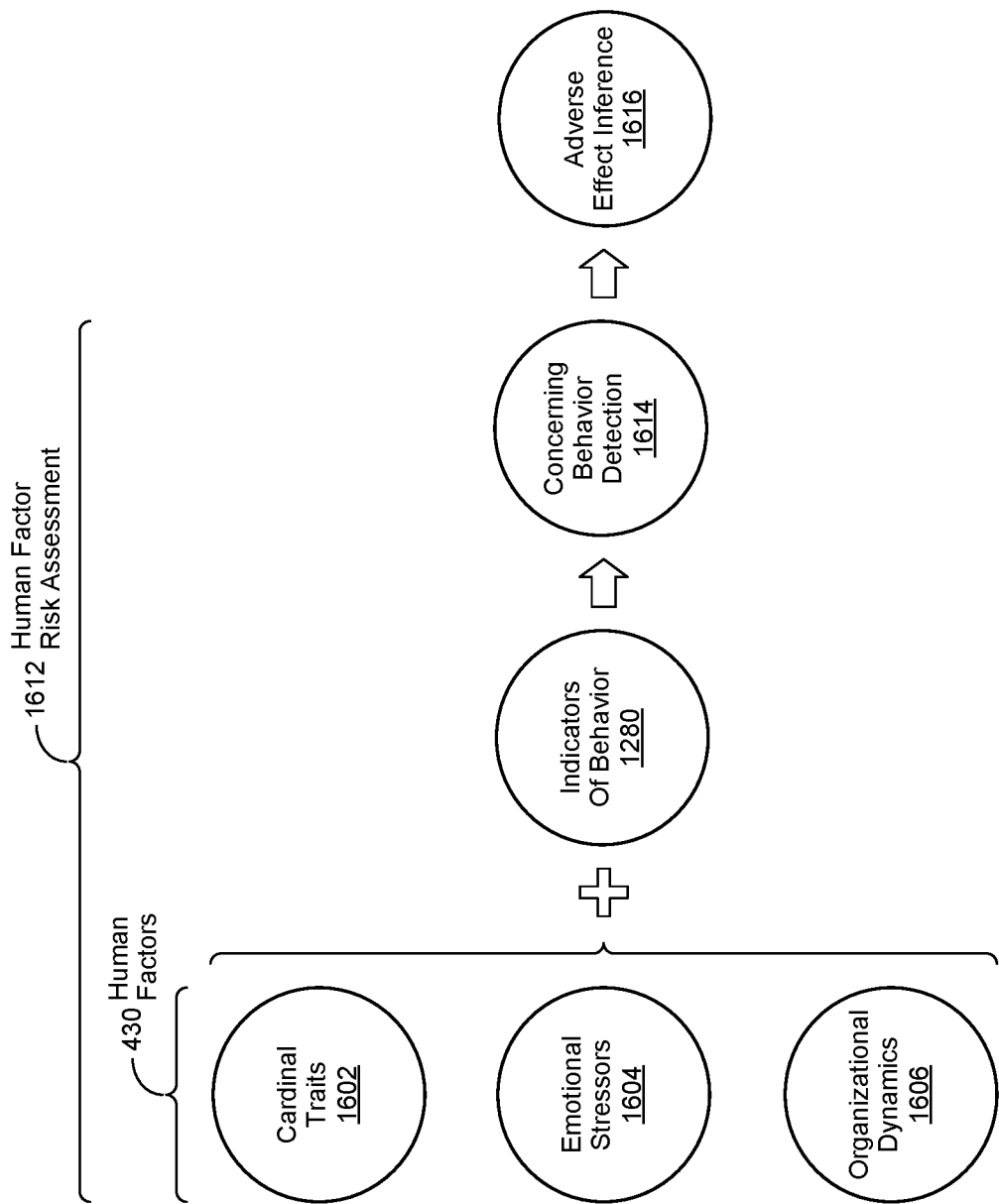
FIG. 16 is a simplified block diagram of the performance of a human factors risk operation.

FIG. 16 is a simplified block diagram of the performance of a human factors risk operation implemented in accordance with an embodiment of the invention. In various embodiments, information associated with certain human factors 430, described in greater detail herein, may be processed with information associated with certain indicators of behavior (IOBs) 1280 to detect a corresponding concerning behavior 1614. As used herein, a concerning behavior 1614 broadly refers to an IOB 1280 whose associated enactment of entity behavior may be considered a potential security risk. In certain embodiments, the entity behavior associated with an IOB 1280 may be enacted by a user entity, a non-user entity, or an information entity, or a combination thereof.

In certain embodiments, the human factors 430 may include cardinal traits 1602, emotional stressors 1604, and organizational dynamics 1606, or a combination thereof, likewise described in greater detail herein. In certain embodiments, as likewise described in greater detail herein, one or more entity behaviors associated with an IOB 1280 may be determined to be anomalous, abnormal, unexpected, suspicious, or some combination thereof. In these embodiments, the method by which a user entity behavior associated with an IOB 1280 is determined to be anomalous, abnormal, unexpected, suspicious, or some combination thereof, is a matter of design choice.

In various embodiments, certain information associated with a detected concerning behavior 1614 may be used in the performance of a human factors risk 1612 operation, described in greater detail herein, to infer an associated adverse effect 1616. As used herein, an adverse effect 1616 broadly refers to an unfavorable consequence resulting from the enactment of a concerning behavior 1614 by an entity. In certain embodiments, the enactment of a concerning behavior 1614 by a user entity may be characterized by a security risk persona, described in greater detail herein. In certain embodiments, an adverse effect 1616 may be described by a security risk use case, or a security vulnerability scenario, or a combination of the two, likewise described in greater detail herein.

Certain embodiments of the invention reflect an appreciation that the occurrence of an adverse effect 1616 may result in a corresponding adverse outcome. As an example, an employee may attempt to access certain proprietary corporate data from their home computer on a weekend. While the employee may access such data on a regular basis from their place of employment during normal work hours, it is unusual for them to do so otherwise. In this example, the employee may be experiencing certain emotional stressors 1604, described in greater detail herein.

Those emotional stressors 1604, combined with anomalous entity behavior associated with an IOB 1280 related to attempting to access proprietary data from their home computer during non-work hours, may indicate enactment of a concerning behavior 1614. To continue the example, information associated with the detected concerning behavior 1614 may be used in the performance of a human factor risk operation 1612 to infer whether the employee's concerning behavior 1614 might result in an adverse effect 1616. To complete the example, it may be inferred that the employee's concerning behavior 1614 may correspond to a data exfiltration security vulnerability scenario, described in greater detail herein, which if successfully executed may result in the adverse outcome of proprietary corporate data being exfiltrated.

Figure 17:
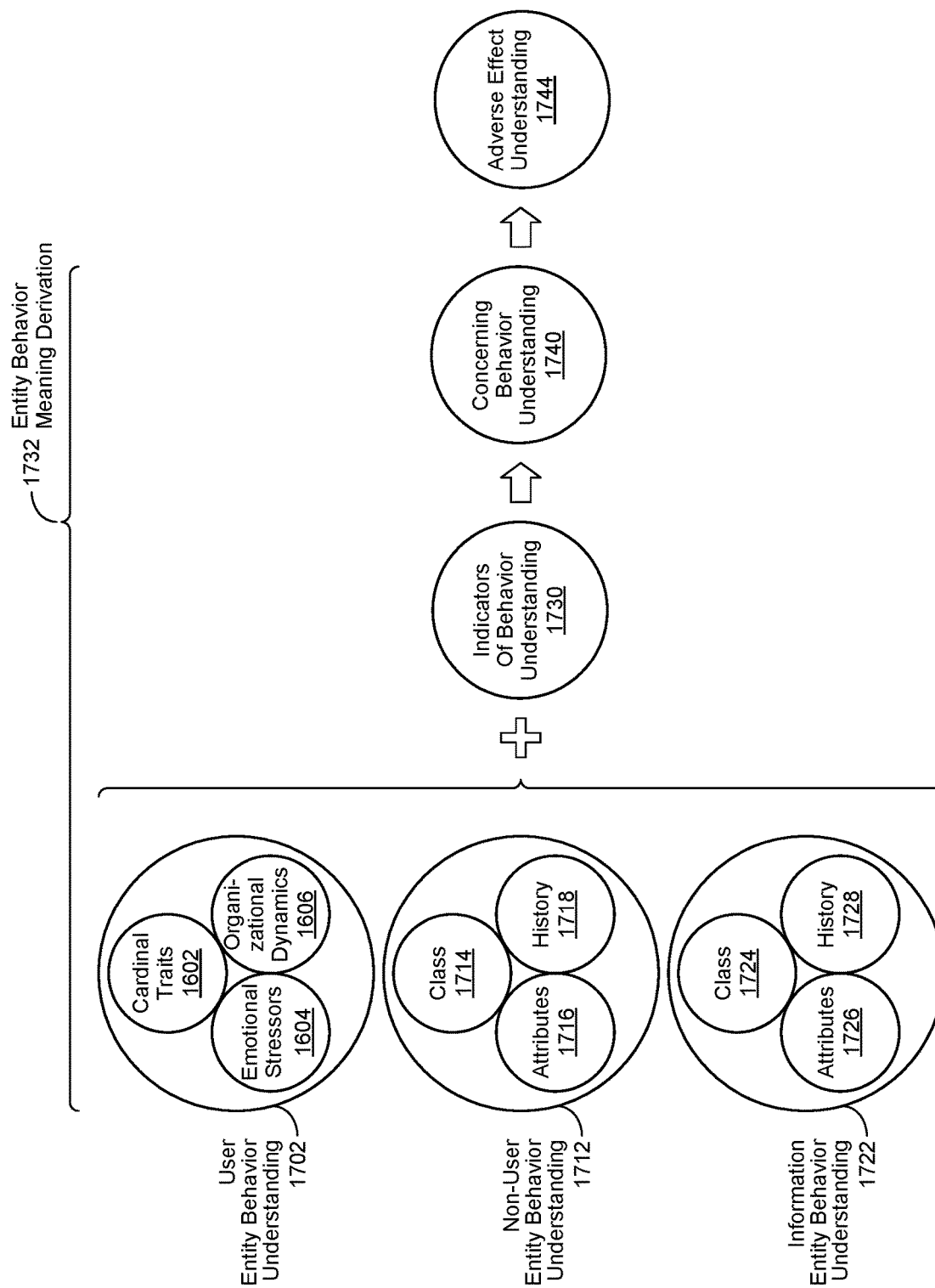
FIG. 17 is a simplified block diagram of the performance of an entity behavior meaning derivation.

FIG. 17 is a simplified block diagram of the performance of an entity behavior meaning derivation operation implemented in accordance with an embodiment of the invention. In certain embodiments, one or more entity behavior meaning derivation 1732 operations may be performed to achieve a literal, inferential, and evaluative, or a combination thereof, understanding 1702, 1712, 1722, 1730, 1740 of the meaning of a particular entity's associated entity behavior. In certain embodiments, information associated with the result of the entity behavior meaning derivation 1732 operation may be used to achieve an understanding of the risk corresponding to an associated adverse effect 1744.

In various embodiments, information associated with certain human factors, such as cardinal traits 1602, emotional stressors 1604, and organizational dynamics 1606, described in greater detail herein, or a combination thereof, may be used in an entity behavior meaning derivation 1732 operation to achieve an understanding 1702 of a user entity's behavior. In various embodiments, information associated with certain non-user entity classes 1714, attributes 1716, and entity behavior history 1718, or a combination thereof, may likewise be used in an entity behavior meaning derivation 1732 operation to achieve an understanding 1712 of a non-user entity's behavior. Likewise, in certain embodiments, information associated with certain information entity classes 1724, attributes 1726, and entity behavior history 1728, or a combination thereof, in an entity behavior meaning derivation 1732 operation to achieve an understanding 1722 of an information entity's behavior.

Figure 18:
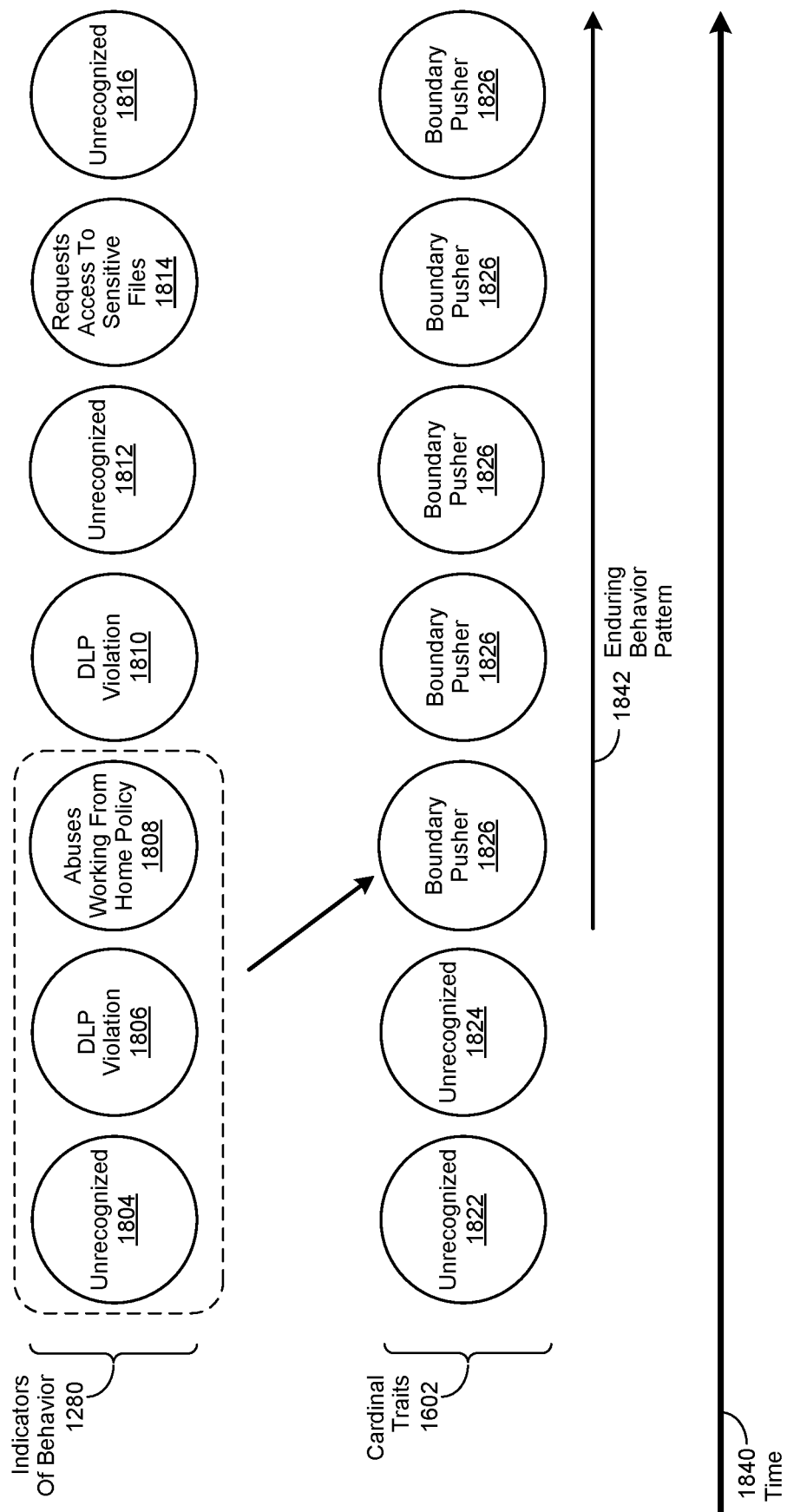
FIG. 18 is a simplified block diagram of the performance of operations to identify an enduring behavioral pattern corresponding to a particular user entity.

FIG. 18 is a simplified block diagram of the performance of operations implemented in accordance with an embodiment of the invention to identify an enduring behavioral pattern corresponding to a particular user entity. In various embodiments, a user entity may enact certain entity behaviors associated with an indicator of behavior (IOB) 1280 over a particular period of time 1840. In certain embodiments, a human factors risk association operation, described in greater detail herein, may be performed to identify a particular cardinal trait 1602 corresponding to the enactment of one or more such IOBs 1280. In certain embodiments, an identified cardinal trait 1602, such as "boundary pusher" 1826 may be persisted over time 1840 to reflect a particular enduring behavior pattern 1842 corresponding to the user entity.

For example, as shown in FIG. 18, a user entity may enact an "unrecognized" 1804 indicator of behavior (IOB) 1280 at a particular point in time 1840, which results in a corresponding "unrecognized" 1822 cardinal trait 1602. At some point in time 1840 thereafter, the same user entity may enact a "data loss prevention (DLP) violation" 1806 IOB 1280, which likewise results in a corresponding "unrecognized" 1824 cardinal trait 1602. At some later point in time 1840 thereafter, the same user entity may enact an "abuses working from home policy" 1808 IOB 1280. In this example, information associated with the enactment of the "unrecognized" 1804, "DLP violation" 1806, and "abuses working from home policy" 1808 IOBs 1280 may be used in the performance of a human factors risk association operation to determine the user entity personifies the cardinal trait 1602 of "boundary pusher" 1826.

To continue the example, the user entity may enact IOBs 1280 at later points in time 1840, including "DLP violation" 1810, "unrecognized" 1812, "requests access to sensitive files" 1814, and "unrecognized" 1816. However, the user entity's identified cardinal trait 1602 of "boundary pusher" 1828 is persisted as an enduring behavior pattern 1842. Those of skill in the art will recognize that many such embodiments and examples of cardinal traits 1602 being used to establish an enduring behavior pattern 1842 are possible. Accordingly, the foregoing is not intended to limit the spirit, scope, or intent of the invention.

Figure 19:
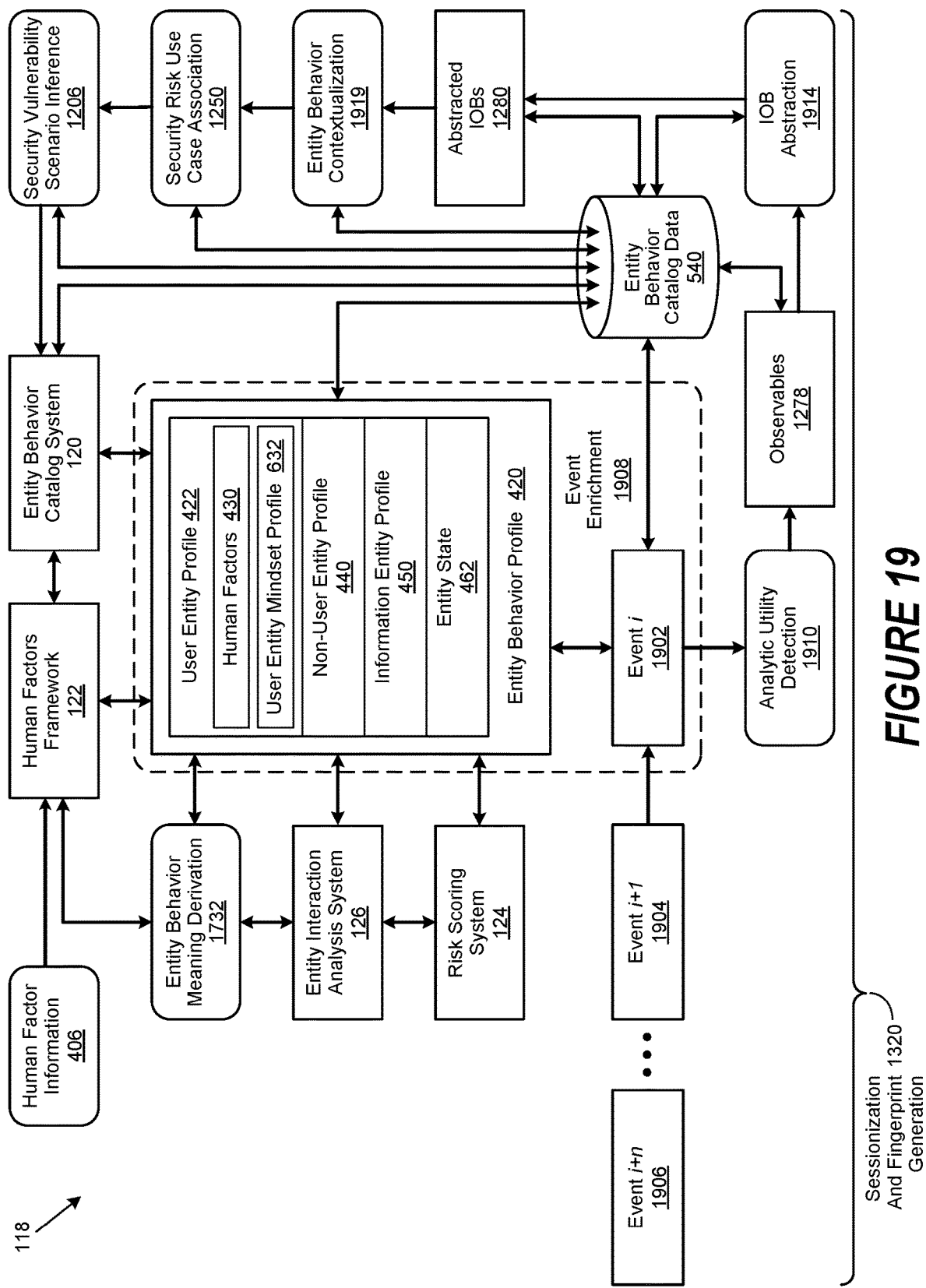
FIG. 19 shows a functional block diagram of process flows associated with the operation of a security analytics system.

FIG. 19 shows a functional block diagram of process flows associated with the operation of security analytics system implemented in accordance with an embodiment of the invention. In certain embodiments, a security analytics system 118, described in greater detail herein, may be implemented with an EBC system 120, a human factors framework 122, and a risk scoring system 124, or a combination thereof, as likewise described in greater detail herein. In certain embodiments, the EBC system 120 may be implemented to define and manage an entity behavior profile (EBP) 420, as described in greater detail herein. In certain embodiments, the EBP 420 may be implemented to include a user entity profile 422, a non-user entity profile 440, an information entity profile 450, and an entity state 462, or a combination thereof, as likewise described in greater detail herein. In certain embodiments, the user entity profile 422 may be implemented to include certain human factors 430 and user entity mindset profile 632 information, as described in greater detail herein.

In certain embodiments, EBC system 120 operations are begun with the receipt of information associated with an initial event i 1902. In various embodiments, information associated with an initial event i 1902 may include user entity profile 422 attributes, user entity behavior factor information, user entity mindset profile 632 information, entity state 462 information, certain contextual and temporal information, all described in greater detail herein, or a combination thereof. In various embodiments, certain user entity profile 422 data, user entity mindset profile 632 data, non-user entity profile 440 data, entity state 462 data, contextual information, and temporal information stored in a repository of EBC data 540 may be retrieved and then used to perform event enrichment 1908 operations to enrich the information associated with event i 1902.

Analytic utility detection 1910 operations are then performed on the resulting enriched event i 1902 to determine whether it is of analytic utility. If so, then it is derived as an observable 1278, described in greater detail herein. In certain embodiments, event i+1 1904 through event i+n 1906, may in turn be received by the EBC system 120 and be enriched 1908. Analytic utility detection 1910 operations are then performed on the resulting enriched event i+1 1904 through event i+n 1906 to determine whether they are of analytic utility. Observables 1278 are then derived from those that are.

In various embodiments, certain indicator of behavior (IOB) abstraction 1914 operations may be performed on the resulting observables 1278 corresponding to events i 1902, i+1 1904, and i+n 1906 to generate an associated IOB 1280, described in greater detail herein. In various embodiments, an IOB 1280 may be expressed in a Subject→Action→Object format and associated with observables 1278 resulting from event information provided by various received from certain EBC data sources, likewise described in greater detail herein. In certain embodiments, an IOB abstraction 1914 operation may be performed to abstract away EBC data source-specific knowledge and details when expressing an entity behavior. For example, rather than providing the details associated with a "Windows:4624" non-user entity event, its details may be abstracted to a "User Login To Device" IOB 1280.

In various embodiments, sessionization and fingerprint 1320 operations, described in greater detail herein, may be performed on event information corresponding to events i 1902, i+1 1904, i+n 1906, their corresponding observables 1278, and their associated IOBs 1280, or a combination thereof, to generate session information. In various embodiments, the resulting session information may be used to associate certain events i 1902, i+1 1904, i+n 1906, or their corresponding observables 1278, or their corresponding IOBs 1280, or a combination thereof, with a particular session.

In certain embodiments, as likewise described in greater detail herein, one or more IOBs 1280 may in turn be associated with a corresponding EBP element. In various embodiments, the previously-generated session information may be used to associate the one or more IOBs 1280 with a particular EBP element. In certain embodiments, the one or more IOBs 1280 may be associated with its corresponding EBP element through the performance of an EBP management operation performed by the EBC system 120. Likewise, in certain embodiments, one or more EBP elements may in turn be associated with the EBP 420 through the performance of an EBP management operation performed by the EBC system 120.

In various embodiments, certain contextualization information stored in the repository of EBC data 540 may be retrieved and then used to perform entity behavior contextualization 1918 operations to provide entity behavior context, based upon the entity's user entity profile 422, or a non-user entity profile 440, or an information entity profile 450, and their respectively associated entity state 462, or a combination thereof. In various embodiments, certain security risk use case association 1250 operations may be performed to associate an EBP 420 with a particular security risk use case, described in greater detail herein. In certain embodiments, the results of the previously-performed entity behavior contextualization 1918 operations may be used to perform the security risk use case association 1250 operations.

In various embodiments, security vulnerability scenario inference 1360 operations may be performed to associate a security risk use case with a particular security vulnerability scenario, described in greater detail herein. In various embodiments, certain observables 1278 derived from events of analytic utility may be used to perform the security vulnerability scenario inference 1260 operations. In various embodiments, certain entity behavior contexts resulting from the performance of the entity behavior contextualization 1918 operations may be used to perform the security vulnerability scenario inference 1260 operations.

In certain embodiments, entity behavior meaning derivation 1732 operations may be performed on the security vulnerability behavior scenario selected as a result of the performance of the security vulnerability scenario inference 1260 operations to derive meaning from the behavior of the entity. In certain embodiments, the entity behavior meaning derivation 1732 operations may be performed by the human factors framework 122. In certain embodiments, the human factors framework 122 may be implemented to receive a stream of human factors information 406, as described in greater detail herein. In certain embodiments, the human factors framework 122 may be implemented to process the stream of human factors information 406 to derive certain human factors 430, and once derived, store them in an associated user entity profile 422. In certain embodiments, the human factors framework 122 may be implemented to perform the entity behavior meaning derivation 1732 operation in combination with the EBC system 120.

In certain embodiments, the entity behavior meaning derivation 1732 operations may be performed by analyzing the contents of the EBP 420 in the context of the security vulnerability behavior scenario selected as a result of the performance of the security vulnerability scenario inference 1260 operations. In certain embodiments, the human factors framework 122 may be implemented to perform the entity behavior meaning derivation 1732 operations by analyzing certain information contained in the EBP 420. In certain embodiments, the human factors framework 122 may be implemented to perform the entity behavior meaning derivation 1732 operations by analyzing certain human factors 430 and user entity mindset profile 632 information stored in the user entity profile 422 to derive the intent of a particular user entity behavior. In certain embodiments, the derivation of entity behavior meaning may include inferring the intent of an entity associated with event i 1902 and event i+1 1904 through event i+n 1906. In certain embodiments, the entity behavior meaning derivation 1732 operations may be performed by using the results of certain entity interaction risk analysis operations, described in greater detail herein, performed by an entity interaction analysis system 126, likewise described in greater detail herein.

In various embodiments, performance of the entity behavior meaning derivation 1732 operations may result in the performance of a security risk assessment operation, described in greater detail herein. In certain embodiments, the security risk assessment operation may be performed to assess the security risk associated with the enactment of a particular user entity behavior. In certain embodiments, the security risk assessment operation may be implemented as a human factors 430 risk assessment operation, described in greater detail herein.

In various embodiments, the risk scoring system 124 may be implemented to perform the security risk assessment operation. In certain embodiments, the risk scoring system 124 may be implemented to use certain security risk assessment information resulting from the performance of a security risk assessment operation to generate a security risk score. In certain embodiments, the risk scoring system 126 may be implemented to use the results of certain entity interaction risk analysis operations performed by the entity interaction analysis system 126. In certain embodiments, a security risk score meeting certain security risk parameters may result in the performance of an associated entity interaction security risk operation described in greater detail herein.

In certain embodiments, meaning derivation information associated with event i 1902 may be used to update the user entity profile 420, non-user entity profile 440, or information entity profile 450 corresponding to the entity associated with event i 1902. In certain embodiments, the process is iteratively repeated, proceeding with meaning derivation information associated with event i+1 1904 through event i+n 1906. From the foregoing, skilled practitioners of the art will recognize that a user entity profile 420, non-user entity profile 440, or information entity profile 450, or some combination thereof, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 20B:
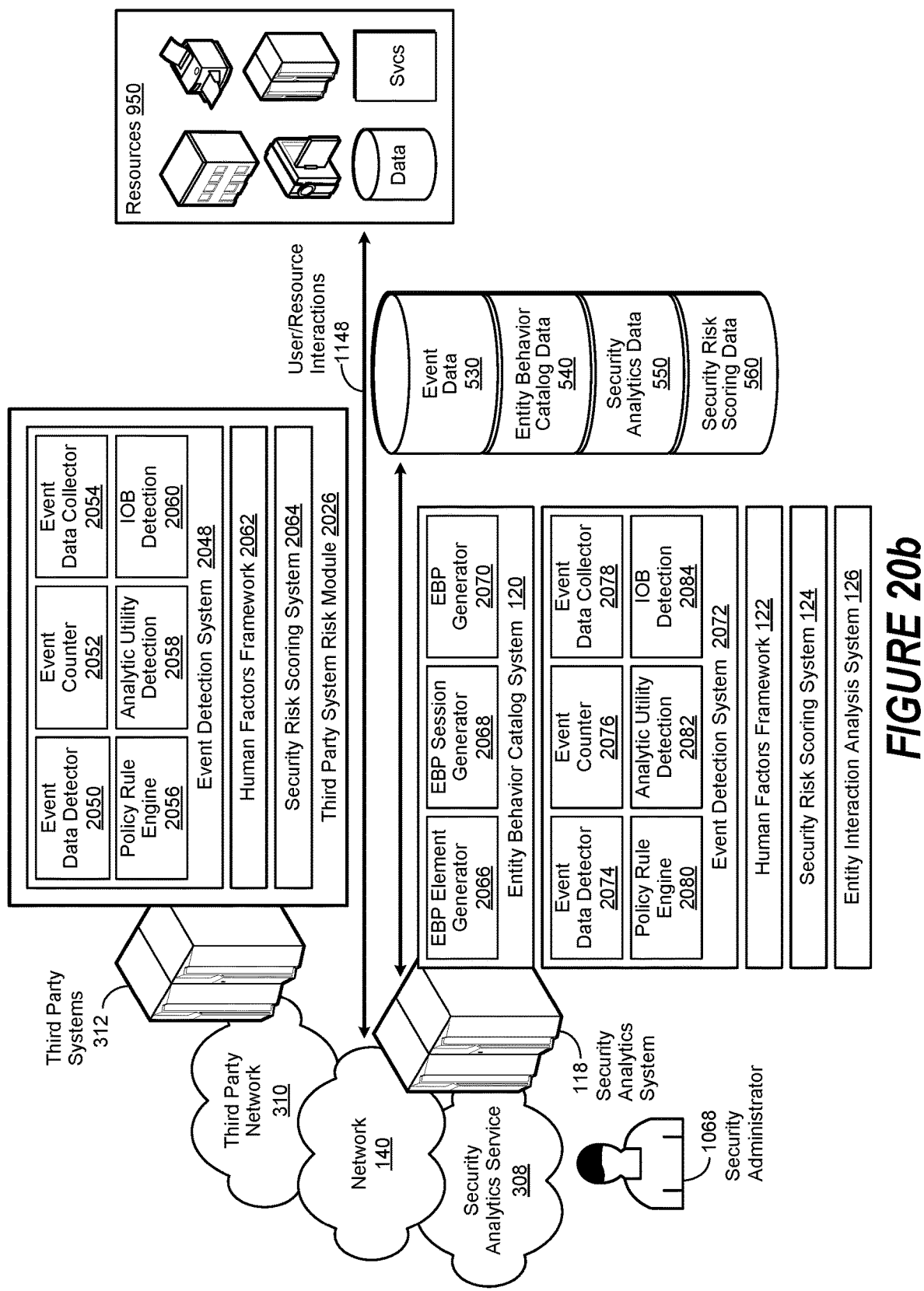

FIGS. 20*a* and 20*b* show a simplified block diagram of a distributed security analytics system environment implemented in accordance with an embodiment of the invention. In various embodiments, the distributed security analytics system environment may be implemented to perform certain human factors risk operations, as described in greater detail herein. In various embodiments, the distributed security analytics system environment may be implemented to use certain human factors information to assess the security risk corresponding to a particular indicator of behavior (JOB), as likewise described in greater detail herein. In certain embodiments, the distributed security analytics mapping system environment may be implemented to include a security analytics system 118, described in greater detail herein. In certain embodiments, the security analytics system 118 may be implemented to include an entity behavior catalog (EBC) system 120, a human factors framework 122, a security risk scoring system 124, and an entity interaction analysis system 126, or a combination thereof.

In various embodiments, the human factors framework 122 may be implemented to provide certain human factors information, described in greater detail herein, to the security analytics system 118. In various embodiments, the security analytics system 118 may be implemented to use such human factors information to perform certain human factors risk operations, likewise described in greater detail herein. In various embodiments, certain human factors risk operations performed by the security analytics system 118 may be used to assess the security risk associated with a corresponding JOB, as described in greater detail herein. In certain embodiments, the security risk corresponding to a particular IOB may be associated with one or more user entities, likewise as described in greater detail herein.

In certain embodiments, as likewise described in greater detail herein, the EBC system 120, the human factors framework 122, the security risk scoring system 124, and the entity interaction analysis system 126, or a combination thereof, may be used in combination with the security analytics system 118 to perform such entity interaction security risk operations. In various embodiments, certain data stored in a repository of event data 530, EBC data 540, security analytics 550 data, or a repository of security risk scoring data 560, or a combination thereof, may be used by the security analytics system 118, the EBC system 120, the human factors framework 122, the risk scoring system 124, and the entity interaction analysis system 126, or some combination thereof, to perform the entity interaction security risk operation.

In various embodiments, the EBC system 120, as described in greater detail herein, may be implemented to use certain entity behavior information and associated event data, to generate an entity behavior profile (EBP), as described in greater detail herein. In various embodiments, the security analytics system 118 may be implemented to use one or more session-based fingerprints to perform security analytics operations to detect certain user, non-user, or information entity behavior, as likewise described in greater detail herein. In certain embodiments, the security analytics system 118 may be implemented to monitor entity behavior associated with a user entity, such as a user entity 'A' 810 or 'B' 812. In certain embodiments, the user, non-user, or information entity behavior, or a combination thereof, may be monitored during user/device 930, user/network 942, user/resource 948, and user/user 920 interactions. In certain embodiments, the user/user 920 interactions may occur between a first user entity, such as user entity 'A' 810 and a second user entity, such as user entity 'B' 812.

In certain embodiments, the human factors framework 122 may be implemented to perform a human factors risk operation, described in greater detail herein. In various embodiments, as likewise described in greater detail herein, the human factors framework 122 may be implemented to use certain associated event information to perform the human factors risk operation. In certain embodiments, the event information may be stored in a repository of event 530 data. In various embodiments, the security risk scoring system 124 may be implemented to provide certain security risk scoring information stored in the repository of security risk scoring 560 data to the security analytics system 118 for use by the human factors framework 122.

In various embodiments, the human factors framework 122 may be implemented, as described in greater detail herein, to manage certain human factors information relevant to the occurrence of an IOB. In various embodiments, as likewise described in greater detail herein, the human factors framework 122 may be implemented to provide certain human factors information relevant to the occurrence of a particular IOB to the EBC system 120, or the risk scoring system 124, or both. In certain embodiments, the human factors information provided by the human factors framework 122 to the EBC system 120, or the security risk scoring system 124, or both, may be used to assess the security risk associated with the occurrence of a particular indicator of behavior.

In certain embodiments, as described in greater detail herein, an endpoint agent 206 may be implemented on an endpoint device 204 to perform user, non-user, or information entity behavior monitoring. In certain embodiments, the user, non-user, or information entity behavior may be monitored by the endpoint agent 206 during user/device 1130 interactions between a user entity, such as user entity 'A' 810, and an endpoint device 204. In certain embodiments, the user, non-user, or information entity behavior may be monitored by the endpoint agent 206 during user/network 1142 interactions between user entity 'A' 810 and a network 140 or third party 310 network. In certain embodiments, the user, non-user, or information entity behavior may be monitored by the endpoint agent 206 during user/resource 1148 interactions between user entity 'A' 810 and a resource 1150, such as a facility, printer, surveillance camera, system, datastore, service, and so forth.

In certain embodiments, the monitoring of user or non-user entity behavior by the endpoint agent 206 may include the monitoring of electronically-observable actions, or associated behavior, respectively enacted by a particular user, non-user, or information entity. In certain embodiments, the endpoint agent 206 may be implemented in combination with the security analytics system 118, the EBC system 120, the human factors framework 122, and the security risk scoring system 124, or a combination thereof, to detect an JOB, assess its associated risk, and perform a security operation to mitigate risk, or a combination thereof.

In certain embodiments, the endpoint agent 206 may be implemented to include an event counter feature pack 2008, an event analytics 210 module, a human factors framework 2022 module, a security risk scoring 2024 module, and an entity interaction analysis system 2026, or a combination thereof. In certain embodiments, the event counter feature pack 2008 may be further implemented to include an event data detector 2010 module, an event counter 2012 module, and an event data collector 2014 module, or a combination thereof. In certain embodiments, the event analytics 210 module may be implemented to include a security policy rule 2016 engine, an event of analytic utility 2018 module, and an IOB detection 2020 module, or a combination thereof.

In certain embodiments, the event data detector 2010 module may be implemented to detect event data associated with a particular endpoint device 204, as described in greater detail herein, resulting from user/device 1130, user/network 1142, user/resource 1148, and user/user 1120 interactions. In various embodiments, the event counter 2012 module may be implemented to collect, or otherwise track, the occurrence of certain events, or classes of events, resulting from user/device 1130, user/network 1142, user/resource 1148, and user/user 1120 interactions.

In various embodiments, the event data collector 2014 module may be implemented to collect certain event data associated with the user/device 1130, user/network 1142, user/resource 1148, and user/user 1120 interactions. In certain embodiments, the security policy rule 2016 engine may be implemented to manage security policy information relevant to determining whether a particular event is of analytic utility, anomalous, or both. In certain embodiments, the event of analytic utility detection 2018 module may be implemented to detect an event of analytic utility associated with events corresponding to the user/device 1130, user/network 1142, user/resource 1148, and user/user 1120 interactions.

In various embodiments, the event of analytic utility detection 2018 module may be implemented to use certain security policy information provided by the security policy rule 2016 engine to determine whether a particular event associated with an endpoint device 204 is of analytic utility. In certain embodiments, the security policy rule 2016 engine may be implemented to determine whether a particular event of analytic utility associated with an endpoint device 204 is anomalous.

In various embodiments, the IOB detection 2020 module may be implemented to perform certain IOB detection operations associated with events of analytic utility corresponding to the user/device 1130, user/network 1142, user/resource 1148, and user/user 1120 interactions. In various embodiments, the event of analytic utility detection 2018 module may be implemented to provide certain information associated with one or more events of analytic utility to the IOB 2020 module. In certain embodiments, the event of analytic utility detection 2018 module may be implemented to determine whether the one or more events of analytic utility are associated with one another.

In various embodiments, the IOB detection 2020 module may be implemented to use such information in the performance of certain IOB detection operations, which in turn may result in the detection of an JOB. In certain embodiments, the endpoint agent 206 may be implemented to communicate the event and associated event counter data collected by the event data collector 2014 module, data associated with the events of analytic utility detected by the event of analytic utility detection 2018 module, and information associated with the IOBs detected by the IOB detection 2020 module, or a combination thereof, to the security analytics 118 system or another component of the distributed security analytics system environment.

In certain embodiments, the human factors framework 2022 module may be implemented to perform a human factors risk operation, as described in greater detail herein. In various embodiments, the human factors framework 2022 module may be implemented to provide certain human factors information to one or more other components of the distributed security analytics system environment. In certain embodiments, the security risk scoring system 2024 may be implemented to generate a security risk score, likewise described in greater detail, for an IOB corresponding to one or more events detected by the IOB detection 2020 module.

In certain embodiments, the security risk scoring system 2024 may be implemented to generate a security risk score corresponding to a particular IOB when it is first detected. In certain embodiments, the event risk severity score corresponding to a particular IOB may be used as a component in the generation of a security risk score for an associated user entity. In certain embodiments, the entity interaction analysis system 2026 may be implemented to perform certain entity interaction risk analysis operations, described in greater detail herein. In certain embodiments, the results if the entity interaction risk analysis operations may be used by the security risk scoring system 2024 to generate a security risk score. In certain embodiments, the endpoint agent 206 may be implemented to provide one or more security risk scores to one or more other components of the distributed security analytics system environment.

In certain embodiments, an edge device 304 may be implemented to include an edge device risk module 2006. In certain embodiments, the edge device risk module 2006 may be implemented to include an event detection 2048 system, a human factors framework 2042 module, a security risk scoring system 2044, or a combination thereof. In certain embodiments, the event detection 2048 system may be implemented to include an event data detector 2030 module, an event counter 2032 module, an event data collector 2034 module, a security policy rule 2036 engine, an event of analytic utility 2038 module, and an IOB detection 2040 module, or a combination thereof.

In certain embodiments, the event data detector 2030 module may be implemented to detect event data associated with a particular edge device 204, as described in greater detail herein, resulting from user/device 1130, user/network 1142, user/resource 1148, and user/user 1120 interactions. In various embodiments, the event counter 2032 module may be implemented to collect, or otherwise track, the occurrence of certain events, or classes of events, resulting from user/device 1130, user/network 1142, user/resource 1148, and user/user 1120 interactions.

In various embodiments, the event data collector 2030 module may be implemented to collect certain event data associated with the user/device 1130, user/network 1142, user/resource 1148, and user/user 1120 interactions. In certain embodiments, the security policy 2036 engine may be implemented to manage security policy information relevant to determining whether a particular event is of analytic utility, anomalous, or both. In certain embodiments, the event of analytic utility detection 2038 module may be implemented to detect an event of analytic utility associated with events corresponding to the user/device 1130, user/network 1142, user/resource 1148, and user/user 1120 interactions.

In various embodiments, the event of analytic utility detection 2038 module may be implemented to use certain security policy information provided by the security policy rule 2036 engine to determine whether a particular event associated with an edge device 304 is of analytic utility. In certain embodiments, the security policy rule 2036 engine may be implemented to determine whether a particular event of analytic utility associated with an edge device 304 is anomalous.

In various embodiments, the IOB detection 2040 module may be implemented to perform certain IOB detection operations, described in greater detail herein, associated with events of analytic utility corresponding to the user/device 1130, user/network 1142, user/resource 1148, and user/user 1120 interactions. In various embodiments, the event of analytic utility detection 2038 module may be implemented to provide certain information associated with one or more events of analytic utility to the IOB detection 2040 module. In certain embodiments, the event of analytic utility detection 2038 module may be implemented to determine whether the one or more events of analytic utility are associated with one another.

In various embodiments, the IOB detection 2040 module may be implemented to use such information in the performance of certain IOB detection operations, which in turn may result in the detection of an JOB. In certain embodiments, the edge device risk module 2006 may be implemented to communicate the event and associated event counter data collected by the event data collector 2034 module, data associated with the events of analytic utility detected by the event of analytic utility detection 2038 module, and information associated with the IOBs detected by the IOB detection 2040 module, or a combination thereof, to the security analytics 118 system or another component of the distributed security analytics system environment.

In certain embodiments, the human factors framework 2042 module may be implemented to perform a human factors risk operation, as described in greater detail herein. In various embodiments, the human factors framework 2042 may be implemented to provide certain human factors information to one or more other components of the distributed security analytics system environment. In certain embodiments, the entity interaction analysis system 2046 may be implemented to perform certain entity interaction risk analysis operations, described in greater detail herein. In certain embodiments, the results if the entity interaction risk analysis operations may be used by the security risk scoring system 2044 to generate a security risk score. In certain embodiments, the security risk scoring system 2044 may be implemented to generate a security risk score, likewise described in greater detail, for an IOB corresponding to one or more events detected by the IOB detection 2044 module.

In certain embodiments, the security risk scoring system 2044 may be implemented to generate a security risk score corresponding to a particular IOB when it is first detected. In certain embodiments, the event risk severity score corresponding to a particular IOB may be used as a component in the generation of a security risk score for an associated user entity. In certain embodiments, the edge device risk module 2006 may be implemented to provide one or more security risk scores to one or more other components of the distributed security analytics system environment.

In certain embodiments, a third party system 312 may be implemented to include a third party system risk module 2026. In certain embodiments, the third party system risk module 2026 may be implemented to include an event detection 2048 system, a human factors framework 2062 module, and a security risk scoring system 2064, or a combination thereof. In certain embodiments, the event detection 2048 system may be implemented to include an event data detector 2050 module, an event counter 2052 module, an event data collector 2054 module, a security policy rule 2056 engine, an event of analytic utility 2058 module, and an IOB detection 2060 module, or a combination thereof.

In certain embodiments, the event data detector 2050 module may be implemented to detect event data associated with a particular third party system 312 resulting from user/device 1130, user/network 1142, user/resource 1148, and user/user 1120 interactions. In various embodiments, the event counter 2052 module may be implemented to collect, or otherwise track, the occurrence of certain events, or classes of events, as described in greater detail herein, resulting from user/device 1130, user/network 1142, user/resource 1148, and user/user 1120 interactions.

In various embodiments, the event data collector 2050 module may be implemented to collect certain event data associated with the user/device 1130, user/network 1142, user/resource 1148, and user/user 1120 interactions. In certain embodiments, the security policy rule 2056 engine may be implemented to manage security policy information relevant to determining whether a particular event is of analytic utility, anomalous, or both. In certain embodiments, the event of analytic utility detection 2058 module may be implemented to detect an event of analytic utility associated with events corresponding to the user/device 1130, user/network 1142, user/resource 1148, and user/user 1120 interactions.

In various embodiments, the event of analytic utility detection 2058 module may be implemented to use certain security policy information provided by the security policy rule 2056 engine to determine whether a particular event associated with a third party system 312 is of analytic utility. In certain embodiments, the security policy rule 2056 engine may be implemented to determine whether a particular event of analytic utility associated with a third party system 312 is anomalous.

In various embodiments, the IOB detection 2060 module may be implemented to perform certain IOB detection operations associated with events of analytic utility corresponding to the user/device 1130, user/network 1142, user/resource 1148, and user/user 1120 interactions. In various embodiments, the event of analytic utility detection 2058 module may be implemented to provide certain information associated with one or more events of analytic utility to the IOB detection 2060 module. In certain embodiments, the event of analytic utility detection 2058 module may be implemented to determine whether the one or more events of analytic utility are associated with one another.

In various embodiments, the IOB detection 2060 module may be implemented to use such information in the performance of certain IOB detection operations, which in turn may result in the detection of an JOB. In certain embodiments, the third party system risk module 2026 may be implemented to communicate the event and associated event counter data collected by the event data collector 2054 module, data associated with the events of analytic utility detected by the event of analytic utility detection 2058 module, and information associated with the IOBs detected by the IOB detection 2060 module, or a combination thereof, to the security analytics 118 system or another component of the distributed security analytics mapping system environment.

In certain embodiments, the human factors framework 2062 module may be implemented to perform a human factors risk operation, as described in greater detail herein. In various embodiments, human factors framework 2062 module may be implemented to provide certain human factors information to one or more other components of the distributed security analytics system environment. In certain embodiments, the security risk scoring system 2064 may be implemented to generate a security risk score, likewise described in greater detail, for an IOB corresponding to one or more events detected by the IOB detection 2064 module.

In certain embodiments, the security risk scoring system 2064 may be implemented to generate a security risk score corresponding to a particular IOB when it is first detected, as likewise described in greater detail herein. In certain embodiments, the event risk severity score corresponding to a particular IOB may be used as a component in the generation of a security risk score for an associated user entity. In certain embodiments, the third party system risk module 2026 may be implemented to provide one or more security risk scores to one or more other components of the distributed security analytics environment.

In certain embodiments, the security analytics system 118 may be implemented to receive the event data, the event counter data, the data associated with the detected events of analytic utility and IOBs, or a combination thereof, provided by the endpoint agent 206, the edge device risk module 2006, and the third party system risk module 2006, or a combination thereof. In certain embodiments, the security analytics system 118 may be implemented to provide the event data and event counter data, the data associated with the detected endpoint events of analytic utility and events, or a combination thereof, to the EBC system 120, the human factors framework 122, the security risk scoring system 124, and the entity interaction analysis system 126, or a combination thereof, for processing.

In certain embodiments, the EBC system 120 may be implemented to include an EBP element generator 2066 module, an EBP session generator 2068 module, an EBP generator 2070 module, or a combination thereof. In various embodiments, the EBP element generator 2066 module may be implemented to process event and event counter data, along with data associated with events of analytic utility and anomalous events, provided by the endpoint agent 206 to generate EBP elements, described in greater detail herein. In certain embodiments, the EBP session generator 2068 may be implemented to use the event and endpoint event counter, data associated with events of analytic utility and anomalous events provided by the endpoint agent 206, to generate session information. In certain embodiments, the EBP session generator 2068 may be implemented to use the resulting session information to generate an activity session, described in greater detail herein. In various embodiments, as likewise described in greater detail herein, certain EBP management operations may be performed to associate EBP elements generated by the EBP element generator 2068 module with a corresponding EBP. Likewise, certain EBP management operations may be performed to use the session information generated by the EBP session generator 2070 module to associate a particular EBP element with a particular EBP.

In certain embodiments, the event detection system 2072 may be implemented to include an event data detector 2074 module, an event counter 2076 module, an event data collector 2078 module, a security policy rule 2080 engine, an event of analytic utility 2084 module, and an IOB detection 2084 module, or a combination thereof. In certain embodiments, the event data detector 2074 module may be implemented to detect event data associated with a particular endpoint device 204, edge device 304, or third party system 312, as described in greater detail herein, resulting from user/device 1130, user/network 1142, user/resource 1148, and user/user 1120 interactions. In various embodiments, the event counter 2076 module may be implemented to collect, or otherwise track, the occurrence of certain events, or classes of events, as described in greater detail herein, resulting from user/device 1130, user/network 1142, user/resource 1148, and user/user 1120 interactions.

In various embodiments, the event data collector 2074 module may be implemented to collect certain event data associated with the user/device 1130, user/network 1142, user/resource 1148, and user/user 1120 interactions. In certain embodiments, the security policy rule 2080 engine may be implemented to manage security policy information relevant to determining whether a particular event is of analytic utility, anomalous, or both. In certain embodiments, the event of analytic utility detection 2082 module may be implemented to detect an event of analytic utility associated with events corresponding to the user/device 1130, user/network 1142, user/resource 1148, and user/user 1120 interactions.

In various embodiments, the event of analytic utility detection 2082 module may be implemented to use certain security policy information provided by the security policy rule 2080 engine to determine whether a particular event associated with a particular endpoint device 204, edge device 304, or third party system 312 is of analytic utility. In certain embodiments, the security policy rule 2080 engine may be implemented to determine whether a particular event of analytic utility associated with an endpoint device 204, edge device 304, or third party system 312 is anomalous.

In various embodiments, the IOB detection 2084 module may be implemented to perform certain IOB detection operations associated with events of analytic utility corresponding to the user/device 1130, user/network 1142, user/resource 1148, and user/user 1120 interactions. In various embodiments, the event of analytic utility detection 2082 module may be implemented to provide certain information associated with one or more events of analytic utility to the IOB detection 2084 module. In certain embodiments, the event of analytic utility detection 2082 module may be implemented to determine whether the one or more events of analytic utility are associated with one another.

In various embodiments, the IOB detection 2084 module may be implemented to use such information in the performance of certain IOB detection operations, which in turn may result in the detection of an JOB. In certain embodiments, the event detection system 2072 may be implemented to communicate the event and associated event counter data collected by the event data collector 2078 module, data associated with the events of analytic utility detected by the event of analytic utility detection 2082 module, and information associated with the IOBs detected by the IOB detection 2084 module, or a combination thereof, to another component of the distributed security analytics system environment.

In certain embodiments, the human factors framework 122 may be implemented to perform a human factors risk operation, as described in greater detail herein. In various embodiments, the human factors framework 122 may be implemented to provide certain human factors information to one or more other components of the distributed security analytics mapping system environment. In certain embodiments, the entity interaction analysis system 126 may be implemented to perform certain entity interaction risk analysis operations, described in greater detail herein. In certain embodiments, the results if the entity interaction risk analysis operations may be used by the security risk scoring system 124 to generate a security risk score. In certain embodiments, the security risk scoring system 124 may be implemented to generate a security risk score, likewise described in greater detail, for an IOB corresponding to one or more events detected by the IOB detection 2084 module.

In certain embodiments, the security risk scoring system 124 may be implemented to generate a security risk score corresponding to a particular IOB when it is first detected, as likewise described in greater detail herein. In certain embodiments, the event risk severity score corresponding to a particular IOB may be used as a component in the generation of a security risk score for an associated user entity. In certain embodiments, the security risk scoring system 124 may be implemented to provide one or more security risk scores to one or more other components of the distributed security analytics system environment. Those of skill in the art will recognize that many such implementations are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an entity interaction risk analysis operation, comprising:
    monitoring an entity, the monitoring observing an electronically-observable data source;
    identifying a security related activity associated with the entity, the security related activity comprising a concerning behavior, the concerning behavior comprising a corresponding concerning behavior score,
    identifying an interaction between the entity and another entity based upon the monitoring;
    analyzing the interaction between the entity and the another entity;

generating a user behavior score based upon the corresponding concerning behavior score and the analyzing the interaction between the entity and the another entity; and, performing a security operation via a security analytics system based upon the user behavior score, the security operation being performed by at least one of an endpoint device and the security analytics system, the endpoint device executing the security operation on a hardware processor associated with the endpoint device, the security analytics system executing the security operation on a hardware processor associated with the security analytics system.

2. The method of claim 1, wherein:
the analyzing includes generating an interaction factor based upon the interaction between the entity and the another entity and the security related activity.

3. The method of claim 1, wherein:
the analyzing includes generating an amplification factor based upon the interaction between the entity and the another entity and the security related activity.

4. The method of claim 1, wherein:
the analyzing includes generating a social interaction factor based upon the interaction between the entity and the another entity and the security related activity.

5. The method of claim 1, wherein:
the interaction between the entity and the another entity is identified based upon a type of interaction between the entity and the another entity.

6. The method of claim 5, wherein:
the type of interaction includes at least one of a collaboration interaction, a team interaction, a parallel peer interaction and a geographic interaction.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
monitoring an entity, the monitoring observing an electronically-observable data source;
identifying a security related activity associated with the entity, the security related activity comprising a concerning behavior, the concerning behavior comprising a corresponding concerning behavior score,
identifying an interaction between the entity and another entity based upon the monitoring;
analyzing the interaction between the entity and the another entity;
generating a user behavior score based upon the corresponding concerning behavior score and the analyzing the interaction between the entity and the another entity; and,
performing a security operation via a security analytics system based upon the user behavior score, the security operation being performed by at least one of an endpoint device and the security analytics system, the endpoint device executing the security operation on a hardware processor associated with the endpoint device, the security analytics system executing the security operation on a hardware processor associated with the security analytics system.

8. The system of claim 7, wherein:
the analyzing includes generating an interaction factor based upon the interaction between the entity and the another entity and the security related activity.

9. The system of claim 7, wherein:
the analyzing includes generating an amplification factor based upon the interaction between the entity and the another entity and the security related activity.

10. The system of claim 7, wherein:
the analyzing includes generating a social interaction factor based upon the interaction between the entity and the another entity and the security related activity.

11. The system of claim 10, wherein:
the interaction between the entity and the another entity is identified based upon a type of interaction between the entity and the another entity.

12. The system of claim 11, wherein:
the type of interaction includes at least one of a collaboration interaction, a team interaction, a parallel peer interaction and a geographic interaction.

13. A non-transitory, computer-readable storage medium embodying computer program code, the computer program code comprising computer executable instructions configured for:
monitoring an entity, the monitoring observing an electronically-observable data source;
identifying a security related activity associated with the entity, the security related activity comprising a concerning behavior, the concerning behavior comprising a corresponding concerning behavior score,
identifying an interaction between the entity and another entity based upon the monitoring;
analyzing the interaction between the entity and the another entity;
generating a user behavior score based upon the corresponding concerning behavior score and the analyzing the interaction between the entity and the another entity; and,
performing a security operation via a security analytics system based upon the user behavior score, the security operation being performed by at least one of an endpoint device and the security analytics system, the endpoint device executing the security operation on a hardware processor associated with the endpoint device, the security analytics system executing the security operation on a hardware processor associated with the security analytics system.

14. The non-transitory, computer-readable storage medium of claim 13, wherein:
the analyzing includes generating an interaction factor based upon the interaction between the entity and the another entity and the security related activity.

15. The non-transitory, computer-readable storage medium of claim 13, wherein:
the analyzing includes generating an amplification factor based upon the interaction between the entity and the another entity and the security related activity.

16. The non-transitory, computer-readable storage medium of claim 13, wherein:
the analyzing includes generating a social interaction factor based upon the interaction between the entity and the another entity and the security related activity.

17. The non-transitory, computer-readable storage medium of claim 13, wherein:
the interaction between the entity and the another entity is identified based upon a type of interaction between the entity and the another entity.

18. The non-transitory, computer-readable storage medium of claim 17, wherein:
    the type of interaction includes at least one of a collaboration interaction, a team interaction, a parallel peer interaction and a geographic interaction.

19. The non-transitory, computer-readable storage medium of claim 13, wherein:
    the computer executable instructions are deployable to a client system from a server system at a remote location.

20. The non-transitory, computer-readable storage medium of claim 13, wherein:
    the computer executable instructions are provided by a service provider to a user on an on-demand basis.

\* \* \* \* \*